US008015261B2

(12) United States Patent
Kohno et al.

(10) Patent No.: US 8,015,261 B2
(45) Date of Patent: Sep. 6, 2011

(54) INFORMATION PROCESSING APPARATUS WITH FIRST AND SECOND SENDING/RECEIVING UNITS

(75) Inventors: Tetsuya Kohno, Kanagawa (JP); Shinichi Iriya, Kanagawa (JP); Junichiro Sakata, Tokyo (JP); Takatoshi Nakamura, Ibaraki (JP)

(73) Assignee: Sony Corporation, Tokyo (JP)

( * ) Notice: Subject to any disclaimer, the term of this patent is extended or adjusted under 35 U.S.C. 154(b) by 1537 days.

(21) Appl. No.: 10/495,981

(22) PCT Filed: Nov. 27, 2002

(86) PCT No.: PCT/JP02/12355
§ 371 (c)(1),
(2), (4) Date: Jan. 5, 2005

(87) PCT Pub. No.: WO03/046884
PCT Pub. Date: Jun. 5, 2003

(65) Prior Publication Data
US 2005/0108319 A1    May 19, 2005

(30) Foreign Application Priority Data
Nov. 27, 2001 (JP) ................................ 2001-360371

(51) Int. Cl.
*G06F 15/16* (2006.01)
(52) U.S. Cl. ......... 709/219; 709/218; 709/217; 709/220
(58) Field of Classification Search .................. 709/219, 709/201, 217, 218
See application file for complete search history.

(56) References Cited

U.S. PATENT DOCUMENTS

| 6,933,433 B1* | 8/2005 | Porteus et al. ................. 84/615 |
| 2002/0067909 A1* | 6/2002 | Iivonen ........................... 386/88 |
| 2002/0092019 A1* | 7/2002 | Marcus ........................... 725/37 |
| 2004/0167857 A1* | 8/2004 | Baker et al. ..................... 705/51 |
| 2005/0177853 A1* | 8/2005 | Williams et al. ................ 725/81 |
| 2006/0168147 A1* | 7/2006 | Inoue et al. .................... 709/219 |
| 2007/0013671 A1* | 1/2007 | Zadesky et al. ................ 345/173 |

FOREIGN PATENT DOCUMENTS

| JP | 1-217785 | 8/1989 |
| JP | 7-176175 | 7/1995 |
| JP | 09-128868 | 5/1997 |

(Continued)

OTHER PUBLICATIONS

U.S. Appl. No. 12/794,484, filed Jun. 4, 2010, Iriya, et al.

*Primary Examiner* — Jeffrey Pwu
*Assistant Examiner* — Abdelnabi O Musa
(74) *Attorney, Agent, or Firm* — Oblon, Spivak, McClelland, Maier & Neustadt, L.L.P.

(57) ABSTRACT

An information processing apparatus comprising a first sending/receiving means for a first information processing apparatus; a second sending/receiving means for a second information processing apparatus; a first recording means for recording normal content data and restricted content data; a second recording means for recording information required for selecting data; an updating means for updating the information recorded; and a selection means for selecting data to be sent to said first information processing apparatus from the first content data and the second content data recorded by said first recording means based on the information recorded by said second recording means in response to a request signal from said first information processing apparatus received by said first sending/receiving means.

17 Claims, 50 Drawing Sheets

FOREIGN PATENT DOCUMENTS

| | | |
|---|---|---|
| JP | 9-163343 | 6/1997 |
| JP | 10-275186 | 10/1998 |
| JP | 2001-216766 | 8/2001 |
| JP | 2001-256151 | 9/2001 |
| JP | 2001-265795 | 9/2001 |
| JP | 2001-282258 | 10/2001 |
| JP | 2001-297093 | 10/2001 |
| JP | 2001-306610 | 11/2001 |
| JP | 2001-312601 | 11/2001 |
| JP | 2002-49626 | 2/2002 |
| JP | 2002-074911 | 3/2002 |
| JP | 2002-108351 | 4/2002 |
| JP | 2002-258874 | 9/2002 |
| JP | 2003-16093 | 1/2003 |

* cited by examiner

FIG. 27

| MUSIC PIECE ID | ADDRESS | PLAYBACK START POSITION |
|---|---|---|
| ID0001 | x x x x x x x | △△△△△△△ |
| ID0002 | x x x x x x x | △△△△△△△ |
| ID0003 | x x x x x x x | △△△△△△△ |
| ID0004 | x x x x x x x | △△△△△△△ |
| ID0005 | x x x x x x x | △△△△△△△ |
| ID0006 | x x x x x x x | △△△△△△△ |
| ⋮ | ⋮ | ⋮ |

FIG. 28

| USER A'S FAVORITES | DRIVE | | ID0098 |
| | | | ID0076 |
| | | | ID0008 |
| | | | ⋮ |
| | CLASSIC | COMPOSER A | ID0032 |
| | | | ID0101 |
| | | | ⋮ |
| | | COMPOSER B | ID0025 |
| | | | ID0119 |
| | | | ⋮ |
| | | C ORCHESTRA | ID0004 |
| | | | ID0111 |
| | | | ⋮ |
| | | D ORCHESTRA | ID0028 |
| | | | ID0100 |
| | | | ⋮ |
| | | OTHERS | ID0066 |
| | | | ID0088 |
| | | | ⋮ |
| | FAVORITES | | ID0081 |
| | | | ID0044 |
| | | | ID0098 |
| | | | ⋮ |
| USER B'S FAVORITES | HAPPY SONGS | | ID0034 |
| | | | ID0131 |
| | | | ID0044 |
| | | | ⋮ |
| | MELANCHOLIC SONGS | | ID0081 |
| | | | ID0077 |
| | | | ID0101 |
| | | | ⋮ |
| | FAVORITES | | ID0098 |
| | | | ID0113 |
| | | | ID0111 |
| | | | ⋮ |
| USER C'S FAVORITES | FAVORITES | | ID0028 |
| | | | ID0111 |
| | | | ID0034 |
| | | | ⋮ |
| MORNING SONGS | | | ID0034 |
| | | | ID0098 |
| | | | ID0003 |
| | | | ⋮ |
| NIGHT SONGS | | | ID0032 |
| | | | ID0081 |
| | | | ID0099 |
| | | | ⋮ |

FIG. 29

| STATION NAME | USER A'S FAVORITES | USER B'S FAVORITES | USER C'S FAVORITES | MORNING SONGS | NIGHT SONGS |
|---|---|---|---|---|---|
| 1 | ID0081 FAVORITES | ID0077 MELANCHOLIC SONGS | ID0028 FAVORITES | ID0098 - | ID0064 - |
| 2 | ID0111 CLASSIC/C... | ID0034 HAPPY SONGS | ID0034 FAVORITES | ID0076 - | ID0099 - |
| 3 | ID0076 FOR DRIVING | ID0111 FAVORITES | ID0055 FAVORITES | ID0003 - | ID0031 - |
| 4 | ID0008 FOR DRIVING | ID0044 HAPPY SONGS | ID0111 FAVORITES | ID0009 - | ID0032 - |
| 5 | ID0088 CLASSIC/OTHERS | ID0098 FAVORITES | ID0044 FAVORITES | ID0034 - | ID0081 - |
| 6 | ID0044 FAVORITES | ID0113 FAVORITES | | ID0025 | |
| 7 | ID0098 FOR DRIVING | ID0044 HAPPY SONGS | | | |
| 8 | ID0032 CLASSIC/A... | ID0131 HAPPY SONGS | | | |
| 9 | ID0100 CLASSIC/D... | ID0077 MELANCHOLIC SONGS | | | |
| 10 | ID0066 CLASSIC/OTHERS | ID0081 MELANCHOLIC SONGS | | | |
| 11 | ID0025 CLASSIC/COMPOSITION... | ID0122 FAVORITES | | | |
| 12 | ID0101 CLASSIC/COMPOSITION... | ID0101 HAPPY SONGS | | | |
| 13 | ID0119 CLASSIC/COMPOSITION... | ID0131 HAPPY SONGS | | | |
| ... | ... | ... | ... | ... | ... |

FIG. 38

| MUSIC PIECE ID | ADDRESS | PLAYBACK START POSITION |
|---|---|---|
| ID0001 | x x x x x x x | △△△△△△△ |
| ID0002 | x x x x x x x | △△△△△△△ |
| ID0003 | x x x x x x x | △△△△△△△ |
| ID0004 | x x x x x x x | △△△△△△△ |
| ID0005 | x x x x x x x | △△△△△△△ |
| ID0006 | x x x x x x x | △△△△△△△ |
| ⋮ | ⋮ | ⋮ |
| ID9003 | x x x x x x x | x x x x x x x x |
| ID9008 | x x x x x x x | x x x x x x x x |
| ID9021 | x x x x x x x | x x x x x x x x |
| ⋮ | ⋮ | ⋮ |

FIG. 39

| | | | |
|---|---|---|---|
| RECOMMENDED MUSIC | | | ID9016 |
| | | | ID9008 |
| | | | ID9054 |
| | | | ⋮ |
| USER A'S FAVORITES | DRIVE | | ID0098 |
| | | | ID0076 |
| | | | ID0008 |
| | | | ⋮ |
| | CLASSIC | COMPOSER A | ID0032 |
| | | | ID0101 |
| | | | ⋮ |
| | | COMPOSER B | ID0025 |
| | | | ID0119 |
| | | | ⋮ |
| | | C ORCHESTRA | ID0004 |
| | | | ID0111 |
| | | | ⋮ |
| | | D ORCHESTRA | ID0028 |
| | | | ID0100 |
| | | | ⋮ |
| | | OTHERS | ID0066 |
| | | | ID0088 |
| | | | ⋮ |
| | FAVORITES | | ID0081 |
| | | | ID0044 |
| | | | ID0098 |
| | | | ⋮ |
| USER B'S FAVORITES | HAPPY SONGS | | ID0034 |
| | | | ID0131 |
| | | | ID0044 |
| | | | ⋮ |
| | MELANCHOLIC SONGS | | ID0081 |
| | | | ID0077 |
| | | | ID0101 |
| | | | ⋮ |
| | FAVORITES | | ID0098 |
| | | | ID0113 |
| | | | ID0111 |
| | | | ⋮ |
| USER C'S FAVORITES | FAVORITES | | ID0028 |
| | | | ID0111 |
| | | | ID0034 |
| | | | ⋮ |
| MORNING SONGS | | | ID0034 |
| | | | ID0098 |
| | | | ID0003 |
| | | | ⋮ |
| NIGHT SONGS | | | ID0032 |
| | | | ID0081 |
| | | | ID0099 |
| | | | ⋮ |

FIG. 40

| STATION NAME | USER A'S FAVORITES | | USER B'S FAVORITES | | USER C'S FAVORITES | | MORNING SONGS | NIGHT SONGS | RECOMMENDED MUSIC |
|---|---|---|---|---|---|---|---|---|---|
| 1 | ID0081 | FAVORITES | ID0077 | MELANCHOLIC SONGS | ID0028 | FAVORITES | ID0098 | ID0064 | ID9016 |
| 2 | ID0111 | CLASSIC/C... | ID0034 | HAPPY SONGS | ID0034 | FAVORITES | ID0076 | ID0099 | ID9008 |
| 3 | ID0076 | FOR DRIVING | ID0111 | FAVORITES | ID0055 | FAVORITES | ID0003 | ID0031 | ID9054 |
| 4 | ID0008 | FOR DRIVING | ID0044 | HAPPY SONGS | ID0111 | FAVORITES | ID0009 | ID0032 | ID9001 |
| 5 | ID0088 | CLASSIC/OTHERS | ID0098 | FAVORITES | ID0044 | FAVORITES | ID0034 | ID0081 | ID9033 |
| 6 | ID0044 | FAVORITES | ID0113 | FAVORITES | | | ID0025 | | |
| 7 | ID0098 | FOR DRIVING | ID0044 | HAPPY SONGS | | | | | |
| 8 | ID0032 | CLASSIC/A... | ID0131 | HAPPY SONGS | | | | | |
| 9 | ID0100 | CLASSIC/D... | ID0077 | MELANCHOLIC SONGS | | | | | |
| 10 | ID0066 | CLASSIC/OTHERS | ID0081 | MELANCHOLIC SONGS | | | | | |
| 11 | ID0025 | CLASSIC/COMPOSITION... | ID0122 | FAVORITES | | | | | |
| 12 | ID0101 | CLASSIC/COMPOSITION... | ID0101 | HAPPY SONGS | | | | | |
| 13 | ID0119 | CLASSIC/COMPOSITION... | ID0131 | HAPPY SONGS | | | | | |
| ... | ... | | ... | | ... | | ... | ... | ... |

INFORMATION PROCESSING APPARATUS WITH FIRST AND SECOND SENDING/RECEIVING UNITS

TECHNICAL FIELD

The present invention relates to information processing apparatuses, information processing methods, and information processing systems, and in particular, to an information processing apparatus, an information processing method, and an information processing system that are suitable for sending push distribution data, for example, sample content data, via the Internet.

BACKGROUND ART

Along with an increased storage capacity of personal computers and an improved audio playback technique, the number of users who record music data in personal computers and play it back is increasing.

When many pieces of music data are recorded, they are classified into a plurality of folders, as shown in FIG. 1, according to, for example, the category, the artist, or the album, and a plurality of levels of classification are further provided so as to construct a hierarchical structure. This enables the user to search for a desired piece of music.

If a plurality of pieces of music data are not classified in a hierarchical structure by using folders unlike the example shown in FIG. 1, it is very difficult for the user to select a desired piece from all the pieces of music data. If, for example, the user remembers the file name (such as the name of the song) of a music data file and desires to listen to it, the user can search for the file name. However, if the user does not know the name of a song even if the user remembers the name of a composer, or if the user desires to listen to the performance of a certain orchestra, the user is unable to find the desired piece of music data unless a plurality of pieces of music data are classified in a hierarchical structure, as shown in FIG. 1, that is, a roughly classified folder, i.e., "classic", is further classified into intermediate folders, such as "by composer" and "by orchestra", and folders by composer and folders by orchestra are further provided for the intermediate folders "by composer" and "by orchestra".

When the user has found the desired piece of music data by tracing the hierarchical structure, the user is able to play it back to enjoy it by performing, for example, a click operation on an icon indicating the desired piece of music data.

If the music data is copy-protected, it can be copied to a removable disk, such as a CD-R, within a preset number of copies. The user is able to search a folder structure, such as that shown in FIG. 1, for a desired piece of music data, and copy it to a removable disk so as to enjoy it in a room away from a personal computer.

Such music data can be downloaded via the Internet from a web site run by an entity which provides distribution services for music data (content distribution services). Not only the user downloads a desired piece of music data (content), but also an entity for providing distribution services for music data may voluntarily distribute part of recommended music data to the user as sample data, i.e., the entity may perform so-called "push distribution services".

The entity sends, for example, part of recommended music data or music data that can be played back only for a predetermined times, to a user's personal computer via the Internet. The user then plays back the received music data, and purchases the content data (music data) corresponding to the received music data if he/she likes it.

However, when music data is sorted out in a hierarchical structure shown in FIG. 1, if, for example, the user desires to play back a music piece A, a complicated operation is required, i.e., the "by composer" folder is selected from the "classic" folder, then, a "composer B" folder is opened from the "by composer" folder, and finally, the music piece A is selected.

Also, new music data downloaded via the Internet must be registered in one of the folders. For example, if the music piece A by the "composer B" is performed by "C orchestra", the user is unable to search for the music piece A by using the "by orchestra" folder unless data of the music piece A is also contained in the "C orchestra" folder, which is a category different from the "composer B". Accordingly, it is necessary to record the same data in a plurality of folders, thereby wasting a limited storage capacity.

In a complicated hierarchical structure, it is very difficult for the user to know the level of the structure to which a folder currently referred by the user belongs. For example, if the user traces an incorrect level to search for a certain piece of music, it is sometimes necessary to return to the previous level depending on the file system.

When a data file of a certain piece of music is selected and a playback operation is performed after tracing such a complicated hierarchical structure, the music is played back from the beginning. Even if the user listens to only the first portion of music (i.e., the introduction in many pieces of pop music), it is difficult to determine whether the music which is currently played back is the music desired by the user. If the music played back is not the music desired by the user, the user has to trace the complicated hierarchical structure again to search for the desired piece of music.

From another point of view, since music data is precisely classified into folders, the user has to trace the folders in a hierarchical structure to reach the bottommost level in order to play back the music data. That is, it is necessary that the user understands the database structure to a certain degree, and consciously selects a music data file to perform a playback operation. Accordingly, when the user desires to casually listen to music as BGM (BackGround Music), for example, when the user listens to radio broadcasting, the user may feel it is a nuisance to trace a hierarchical structure.

In radio broadcasting, it is possible to listen to a program to one's taste of a broadcast station to one's taste, and it is also possible to find a new piece of music to one's taste while unknown music is on. When the user has to select a piece of music to be played back, even if unknown music data (push-distributed music data) is recorded in a user's personal computer, it is difficult to select only unknown pieces from many pieces of music data.

Accordingly, the user cannot listen to a push-distributed music piece unless the user consciously accesses the corresponding data. If the user fails to listen to the push-distributed music piece, the user has to lose the chance to know the new music piece, and also, the entity has to lose the chance to sell the content.

If the user desires to enjoy music in a room away from the personal computer, it is necessary to copy music data on a removable disk. Then, if a home network is constructed in a household to record music data in a server and to allow a client to play it back, it is difficult for the user to easily perform the operation unless the user understands the configuration of a client-server system to a certain degree and also understands the hierarchical structure of the music data recorded in the server to a certain degree.

DISCLOSURE OF INVENTION

The present invention has been made in view of the above-described background. It is an object of the present invention to enable an entity providing distribution services for music data (content distribution services) to send push-distribution music data (content) to a server owned by a user (client) and to allow the client to preferentially play back the push-distributed music data sent to the server when playing back the music data recorded in the server.

A first information processing apparatus of the present invention includes: first sending/receiving means for sending and receiving information to and from a first external information processing apparatus; second sending/receiving means for sending and receiving information to and from a second external information processing apparatus; first recording means for recording first content data, which is normal content data, and second content data, which is restricted content data received by the second sending/receiving means; second recording means for recording information required for selecting data to be sent to the first external information processing apparatus from the first content data and the second content data recorded by the first recording means; updating means for updating the information recorded by the second recording means; and selection means for selecting data to be sent to the first external information processing apparatus from the first content data and the second content data recorded by the first recording means based on the information recorded by the second recording means in response to a request signal from the first external information processing apparatus received by the first sending/receiving means.

The selection means may select the entirety of the first content data or part of the first content data in response to the request signal.

The updating means may update the information so that the second content data is preferentially selected by the selection means.

The first sending/receiving means may receive a purchase request signal for the first content data corresponding to the second content data from the first external information processing apparatus. The second sending/receiving means may send the purchase request signal for the first content data to the second external information processing apparatus and may receive the first content data from the second external information processing apparatus. The first recording means may further record the first content data received by the second sending/receiving means.

The second content data may be data corresponding to part of normal content data.

The number of playback operations of the second content data in the first external information processing apparatus may be restricted.

The first sending/receiving means may receive review information concerning the second content data from the first external information processing apparatus. The second sending/receiving means may send the review information received by the first information receiving means to the second external information processing apparatus.

A first information processing method of the present invention includes: a first sending/receiving control step of controlling information to be sent and received to and from a first external information processing apparatus; a second sending/receiving control step of controlling information to be sent and received to and from a second external information processing apparatus; a first recording control step of controlling the recording of first content data, which is normal content data, and second content data, which is restricted content data received under the control of processing of the second sending/receiving control step; a second recording control step of controlling the recording of information required for selecting data to be sent to the first external information processing apparatus from the first content data and the second content data recorded under the control of processing of the first recording control step; an updating step of updating the information recorded under the control of processing of the second recording control step; and a selection step of selecting data to be sent to the first external information processing apparatus from the first content data and the second content data recorded under the control of processing of the first recording control step based on the information recorded under the control of processing of the second recording control step in response to a request signal from the first external information processing apparatus received under the control of processing of the first sending/receiving control step.

A first program of the present invention allows a computer to execute: a first sending/receiving control step of controlling information to be sent and received to and from a first external information processing apparatus; a second sending/receiving control step of controlling information to be sent and received to and from a second external information processing apparatus; a first recording control step of controlling the recording of first content data, which is normal content data, and second content data, which is restricted content data received under the control of processing of the second sending/receiving control step; a second recording control step of controlling the recording of information required for selecting data to be sent to the first external information processing apparatus from the first content data and the second content data recorded under the control of processing of the first recording control step; an updating step of updating the information recorded under the control of processing of the second recording control step; and a selection step of selecting data to be sent to the first external information processing apparatus from the first content data and the second content data recorded under the control of processing of the first recording control step based on the information recorded under the control of processing of the second recording control step in response to a request signal from the first external information processing apparatus received under the control of processing of the first sending/receiving control step.

A second information processing apparatus of the present invention includes: input means for receiving an input of an operation from a user; first generating means for generating a request signal for requesting a first external information processing apparatus to send first content data, which is normal content data, or second content data, which is restricted content data, based on the operation input into the input means by the user; first sending means for sending the request signal generated by the first generating means to the first external information processing apparatus; receiving means for receiving the first content data or the second content data from the first external information processing apparatus; playback means for playing back the first content data or the second content data received by the receiving means; second generating means for generating a purchase request signal for the first content data corresponding to the second content data based on the operation input into the input means by the user; and second sending means for sending the purchase request signal generated by the second generating means to the first external information processing apparatus.

The second information processing apparatus may further include display control means for controlling the display of a display screen for assisting the user to input the operation. The display control means may control the display of the display screen so that the user inputs the operation to preferentially play back the second content data by the playback means.

The second content data may be data corresponding to part of normal content data.

The number of playback operations of the second content data by the playback means may be restricted.

The second information processing apparatus may further include: third generating means for generating review information concerning the second content data based on the operation input into the input means by the user; and third sending means for sending the review information generated by the third generating means to the first external information processing apparatus.

A second information processing method of the present invention includes: an input control step of controlling an input of an operation from a user; a first generating step of generating a request signal for requesting a first external information processing apparatus to send first content data, which is normal content data, or second content data, which is restricted content data, based on the operation input under the control of processing of the input control step; a first sending control step of controlling the request signal generated by processing of the first generating step to be sent to the first information processing apparatus; a receiving control step of controlling the first content data or the second content data to be received from the first external information processing apparatus; a playback step of playing back the first content data or the second content data received under the control of processing of the receiving control step; a second generating step of generating a purchase request signal for the first content data corresponding to the second content data based on the operation input under the control of processing of the input control step; and a second sending control step of controlling the purchase request signal generated by processing of the second generating step to be sent to the first external information processing apparatus.

A second program of the present invention allows a computer to execute: an input control step of controlling an input of an operation from a user; a first generating step of generating a request signal for requesting a first external information processing apparatus to send first content data, which is normal content data, or second content data, which is restricted content data, based on the operation input under the control of processing of the input control step; a first sending control step of controlling the request signal generated by processing of the first generating step to be sent to the first external information processing apparatus; a receiving control step of controlling the first content data or the second content data to be received from the first external information processing apparatus; a playback step of playing back the first content data or the second content data received under the control of processing of the receiving control step; a second generating step of generating a purchase request signal for the first content data corresponding to the second content data based on the operation input under the control of processing of the input control step; and a second sending control step of controlling the purchase request signal generated by processing of the second generating step to be sent to the first external information processing apparatus.

In an information processing system of the present invention, a first information processing apparatus includes: first recording means for recording first content data, which is normal content data, and second content data, which is restricted content data; second recording means for recording information concerning a user administrating a second information processing apparatus; first sending/receiving means for sending and receiving information to and from the second information processing apparatus; first selection means for selecting data to be sent to the second information processing apparatus from the second content data recorded by the first recording means based on the information concerning the user recorded by the second recording means; and second selection means for selecting the first content data recorded by the first recording means based on a purchase request signal for the first content data corresponding to the second content data received by the first receiving means. The second information processing apparatus includes: second sending/receiving means for sending and receiving information to and from the first information processing apparatus; third sending/receiving means for sending and receiving information to and from a third information processing apparatus; third recording means for recording the first content data and the second content data received by the second sending/receiving means; fourth recording means for recording information required for selecting data to be sent to the third information processing apparatus from the first content data and the second content data recorded by the third recording means; updating means for updating the information recorded by the fourth recording means; and third selection means for selecting data to be sent to the third information processing apparatus from the first content data and the second content data recorded by the third recording means based on the information recorded by the fourth recording means in response to a request signal from the third information processing apparatus received by the third sending/receiving means. The third sending/receiving means receives the purchase request signal from the third information processing apparatus. The second sending/receiving means sends the purchase request signal to the first information processing apparatus and receives the first content data from the first information processing apparatus. The third recording means further records the first content data received by the second sending/receiving means. The third information processing apparatus includes: input means for receiving an input of an operation from a user; first generating means for generating a request signal for requesting the second information processing apparatus to send the first content data or the second content data based on the operation input into the input means by the user; first sending means for sending the request signal generated by the first generating means to the second information processing apparatus; receiving means for receiving the first content data or the second content data from the second information processing apparatus; playback means for playing back the first content data or the second content data received by the receiving means; second generating means for generating the purchase request signal based on the operation input into the input means by the user; and second sending means for sending the purchase request signal generated by the second generating means to the second information processing apparatus.

According to the first information processing apparatus, the first information processing method, and the first program of the present invention, information is sent and received to and from the first external information apparatus, and information is sent and received to and from the second external information processing apparatus. First content data, which is normal content data, and second content data, which is restricted content data, are recorded. Information required for selecting data to be sent to the first external information processing apparatus from the first content data and the second content data is recorded and updated. In response to a received request signal from the first external information processing apparatus, data to be sent to the first external information processing apparatus is selected from the first content data and the second content data based on the recorded information.

According to the second information processing apparatus, the second information processing method, and the second program of the present invention, an input of an operation from a user is received, and based on the input operation from the user, a request signal for requesting an first external information processing apparatus to send first content data, which is normal data, or second content data, which is restricted content data, is generated. The generated request signal is sent to the first external information processing apparatus. The first content data or the second content data is received from the first external information processing apparatus, and the received first content data or second content data is played back. Based on the operation input from the user, a purchase request signal for the first content data corresponding to the second content data is generated, and the generated purchase request signal is sent to the first external information processing apparatus.

According to the information processing system, in the first information processing apparatus, first content data, which is normal data, and second content data, which is restricted content data, are recorded. Information concerning a user administrating the second information processing apparatus is recorded, and information is sent and received to and from the second information processing apparatus. Based on the information concerning the user, data to be sent to the second information processing apparatus is selected from the second content data. Based on a purchase request signal for the first content data corresponding to the second content data, the first content data is selected. In the second information processing apparatus, information is sent and received to and from the first information processing apparatus, and information is sent and received to and from the third information processing apparatus. The first content data and the second content data are recorded. Information required for selecting data to be sent to the third information processing apparatus from the first content data and the second content data is recorded and updated. In response to a request signal from the third information processing apparatus, data to be sent to the third information processing apparatus is selected from the first content data and the second content data based on the recorded information. A purchase request signal is received from the third information processing apparatus, and is sent to the first information processing apparatus. The first content data is received from the first information processing apparatus, and the received first content data is recorded. In the third information processing apparatus, an input of an operation from a user is received. Based on the input operation from the user, a request signal for requesting the second information processing apparatus to send the first content data or the second content data is generated. The generated request signal is sent to the second information processing apparatus. The first content data or the second content data is received from the second information processing apparatus. The received first content data or the second content data is played back. Based on the operation from the user, a purchase request signal is generated and is sent to the second information processing apparatus.

BRIEF DESCRIPTION OF THE DRAWINGS

FIG. 27 illustrates a music data list recorded in a music database.

FIG. 28 illustrates a link information list recorded in a link information database.

FIG. 29 illustrates a ranking list recorded in a ranking information database.

FIG. 38 illustrates a music data list recorded in the music database.

FIG. 39 illustrates a link information list recorded in the link information database.

FIG. 40 illustrates a ranking list recorded in the ranking information database.

BEST MODE FOR CARRYING OUT THE INVENTION

Embodiments of the present invention are described below with reference to the drawings.

Figure 1:
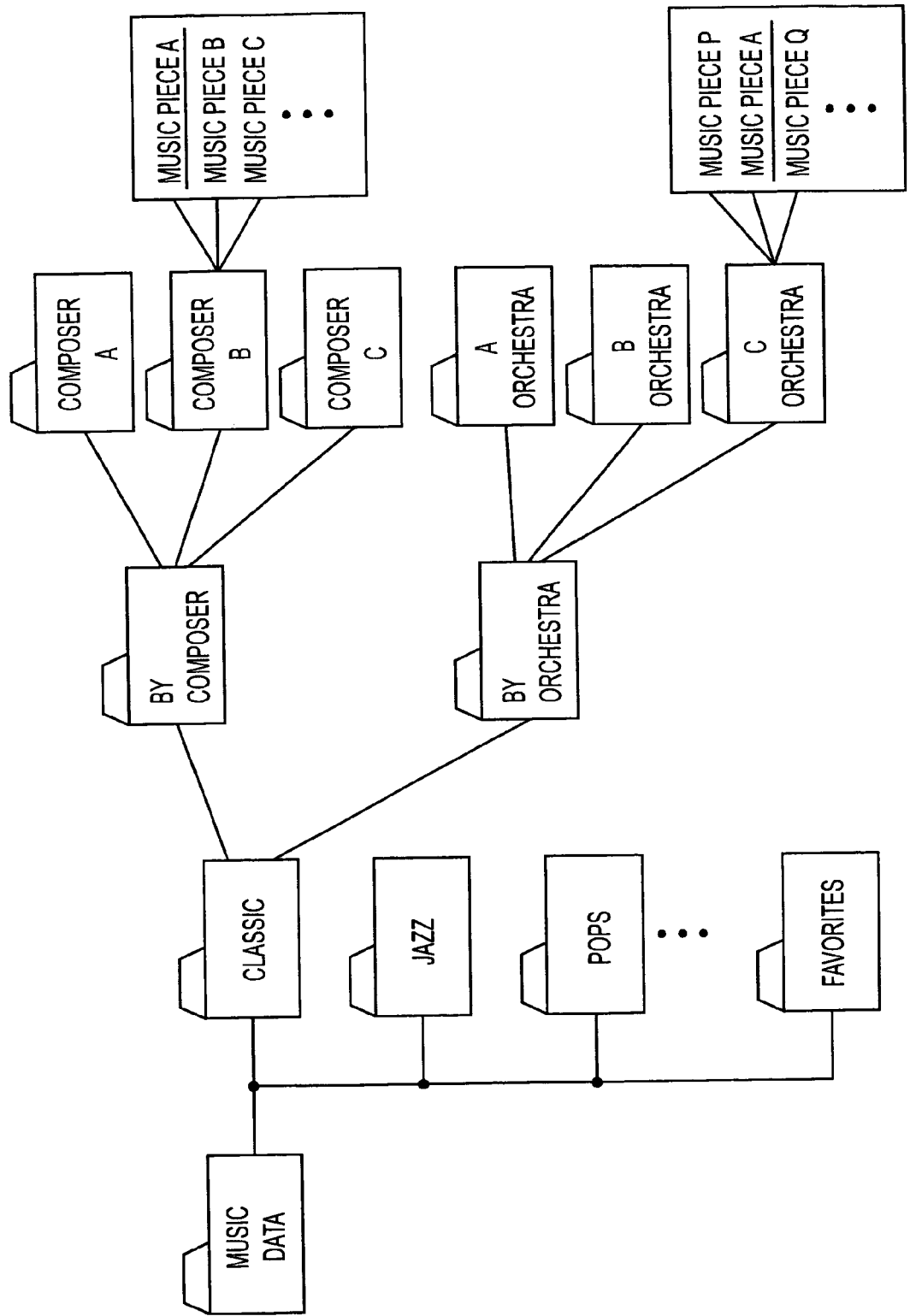
FIG. 1 illustrates a known recording method for music data.
Figure 2:
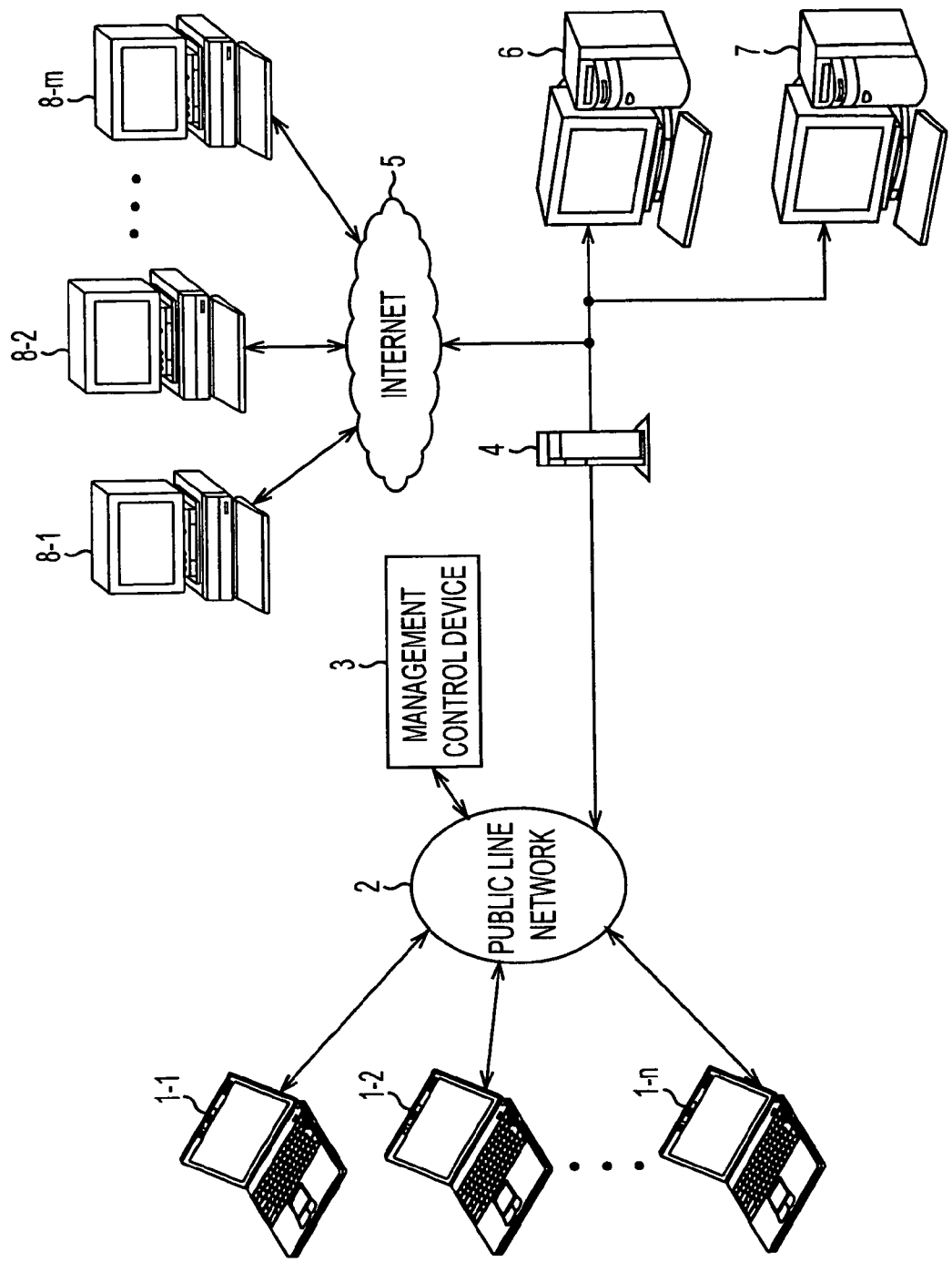
FIG. 2 illustrates an example of a network for content distribution.

A network system for receiving content-data distribution services, sending/receiving e-mail, or browsing web pages is described below with reference to FIG. 2.

Personal computers 1-1 through 1-$n$ are connected to a public line network (including subscriber telephone lines, cables for distributing cable television programs, and communication optical fibers) 2. The personal computers 1-1 through 1-$n$ are sometimes used as a home network server, which is described below with reference to FIG. 3.

The personal computers 1-1 through 1-$n$ are hereinafter simply referred to as the "personal computer 1" unless they have to be individually distinguished.

The public line network 2 is connected to the Internet 5, base stations (not shown) for allowing subscriber wired terminals and subscriber wireless terminals (for example, cellular telephones, which are described below) (none of them is shown) to send and receive information, computer networks, in-house networks (none of them is shown).

A management control device 3 is connected to subscriber wired terminals (not shown), base stations (not shown), and the personal computer 1 via the public line network 2 so as to perform authentication processing or billing processing for the corresponding elements.

An access server 4 of an Internet service provider is connected to the public line network 2, and is also connected to a content server 6 and an e-mail server 7 owned by the Internet service provider.

The content server 6 provides content, for example, simplified homepages, in an HTML (Hypertext Markup Language) format or compact HTML file in response to the personal computer 1.

The e-mail server 7 is a server for managing the sending and receiving of e-mail. The e-mail server 7 includes a sending SMTP server and a receiving POP server. Mail sent from the SMTP server is not directly distributed to the POP server of the receiver, but is distributed to the POP server of the receiver via several servers on the Internet 5. The POP server of the receiver temporarily stores the received e-mail in the mail box. The user occasionally accesses the e-mail server 7 used by the user by using the personal computer 1 to receive the e-mail.

Many WWW (World Wide Web) servers 8-1 through 8-$m$ are connected to the Internet 5. The personal computer 1 accesses the WWW servers 8-1 through 8-$m$ according to the TCP (Transmission Control Protocol)/IP (Internet Protocol) protocols. The WWW servers 8-1 through 8-$m$ releases various web sites to the users to provide various services (for example, services for distributing content, such as music data, image data, or video data) to the users.

It is now assumed that the WWW server 8-1 is a server managed by an entity which provides distribution services for music data (music-data distribution service provider) to the user owning the personal computer 1. The WWW server 8-1 allows the registered users to download desired music data, or sends push-distribution sample data of recommended music via the Internet 5 (content is distributed from the service provider even if the user does not request the provider to send it).

Figure 3:
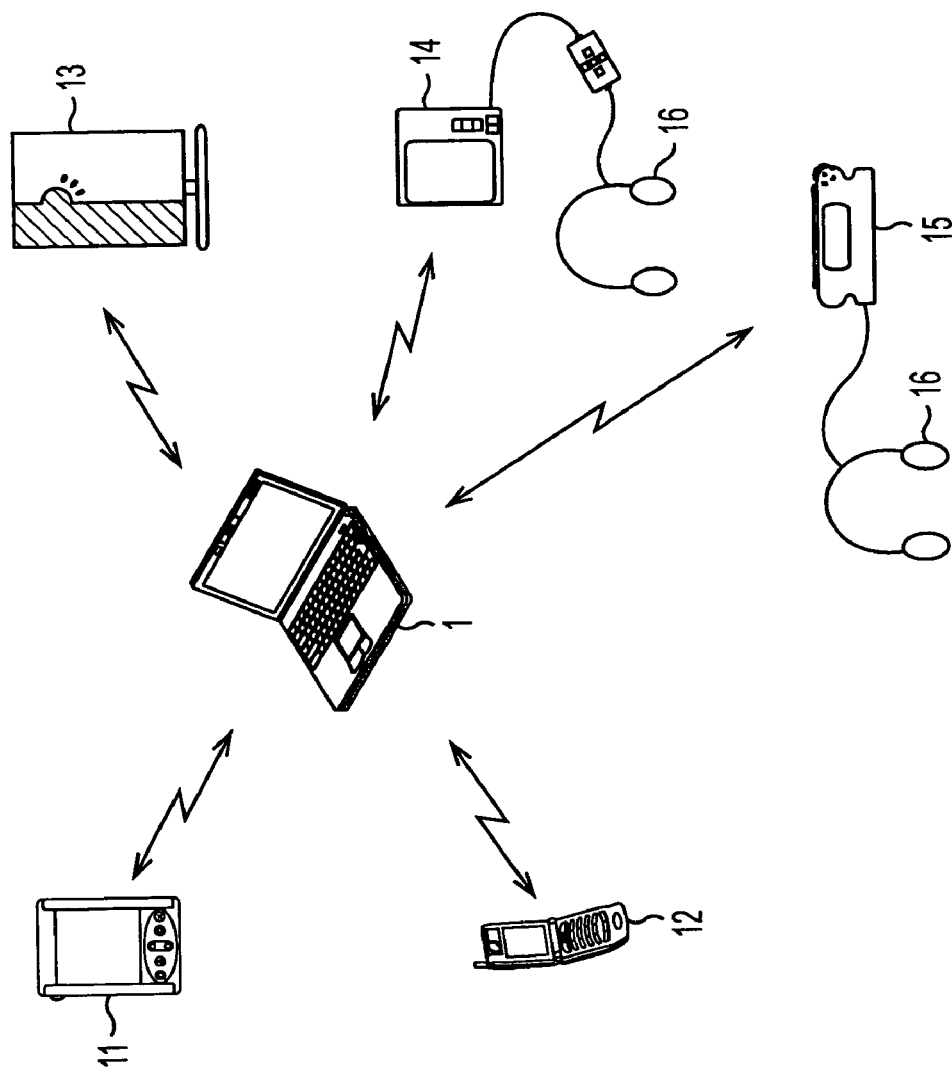
FIG. 3 illustrates an example of a household network.

FIG. 3 illustrates the configuration of a home network to which the present invention is applied.

The personal computer 1 has a plurality of databases for recording music data and information for managing the music data. The personal computer 1 is able to send and receive information to and from a PDA (Personal Digital (Data) Assistants) 11, a cellular telephone 12, a desk-top playback device 13, a portable playback device 14, and a simplified playback device 15 by performing wireless communication (any method, for example, IEEE (Institute of Electrical and Electronics Engineers) 802.11a, infrared communication, or Bluetooth®, may be used).

The PDA 11, the cellular telephone 12, the desk-top playback device 13, the portable playback device. 14, and the simplified playback device 15 make a request to the personal computer 1 for the music data based on a user's operation, and receive and play back the music data sent from the personal computer 1. For example, the PDA 11, the cellular telephone 12, the desk-top playback device 13, the portable playback device 14, and the simplified playback device 15 are possessed by a plurality of users in a household, and the users can receive the music data from the personal computer 1 to enjoy music in a place away from the personal computer 1.

FIGS. 4 through 7 are external views of the personal computer 1.

Figure 4:
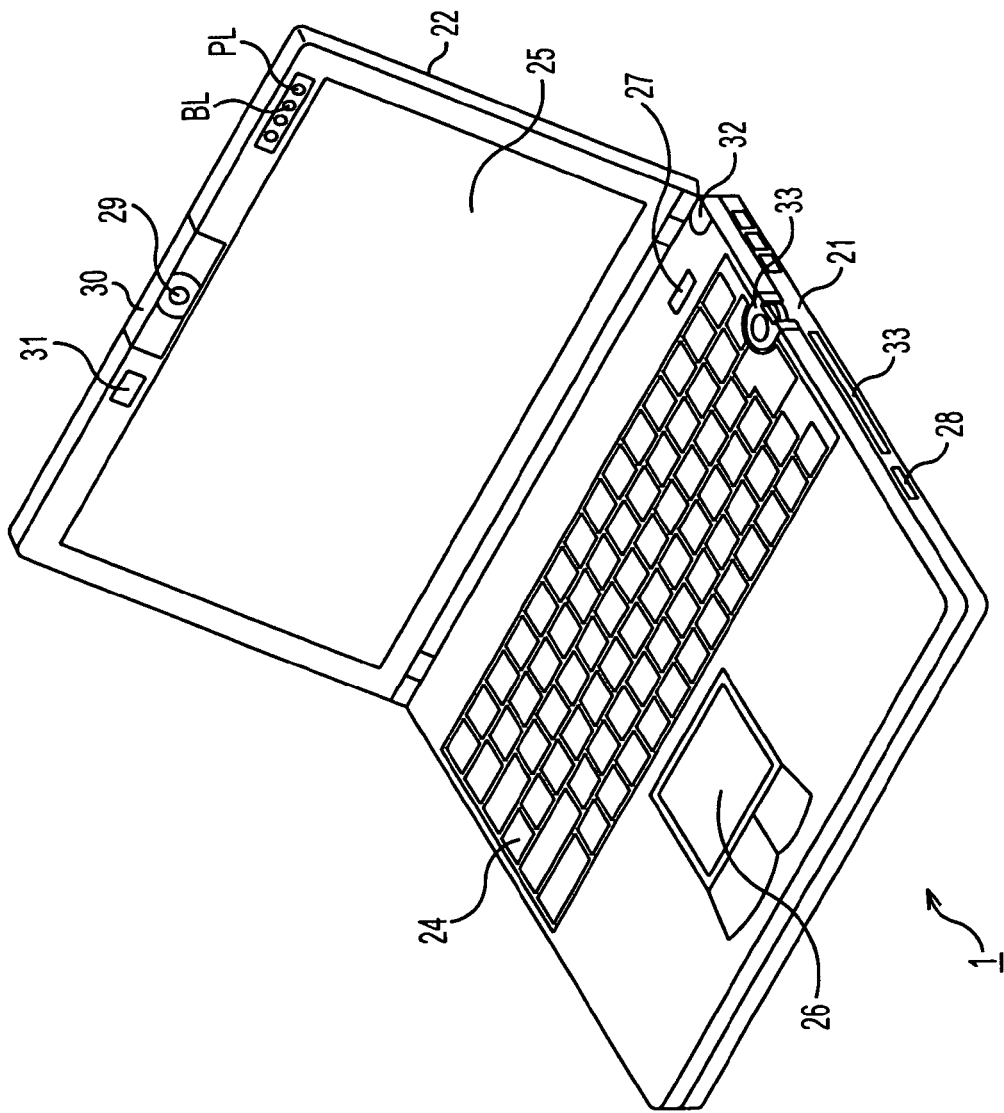
FIG. 4 is an external perspective view of a personal computer shown in FIG. 3.
Figure 5:
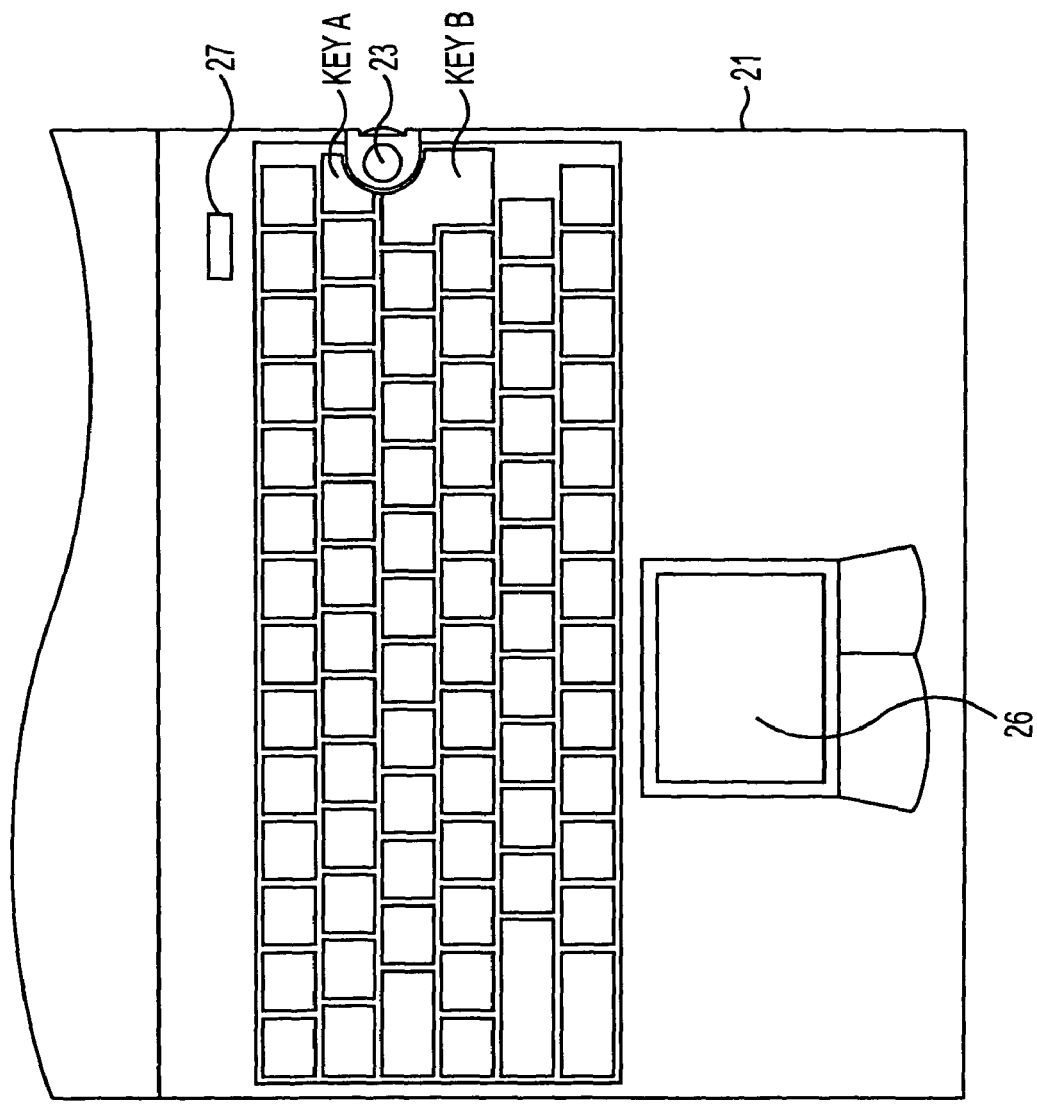
FIG. 5 is a plan view of the main unit of the personal computer shown in FIG. 3.
Figure 6:
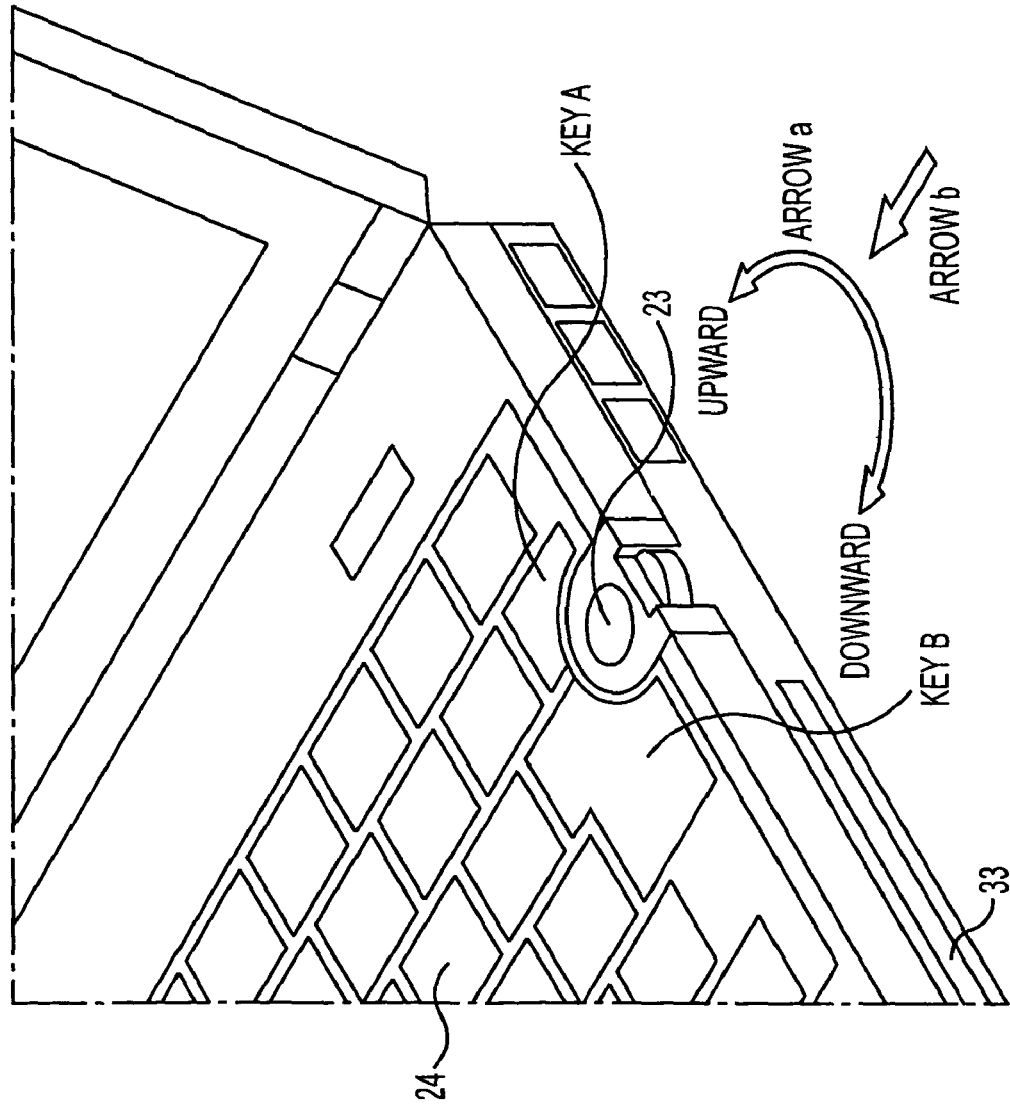
FIG. 6 is an enlarged view illustrating of the portion near a jog dial of the personal computer shown in FIG. 3.
Figure 7:
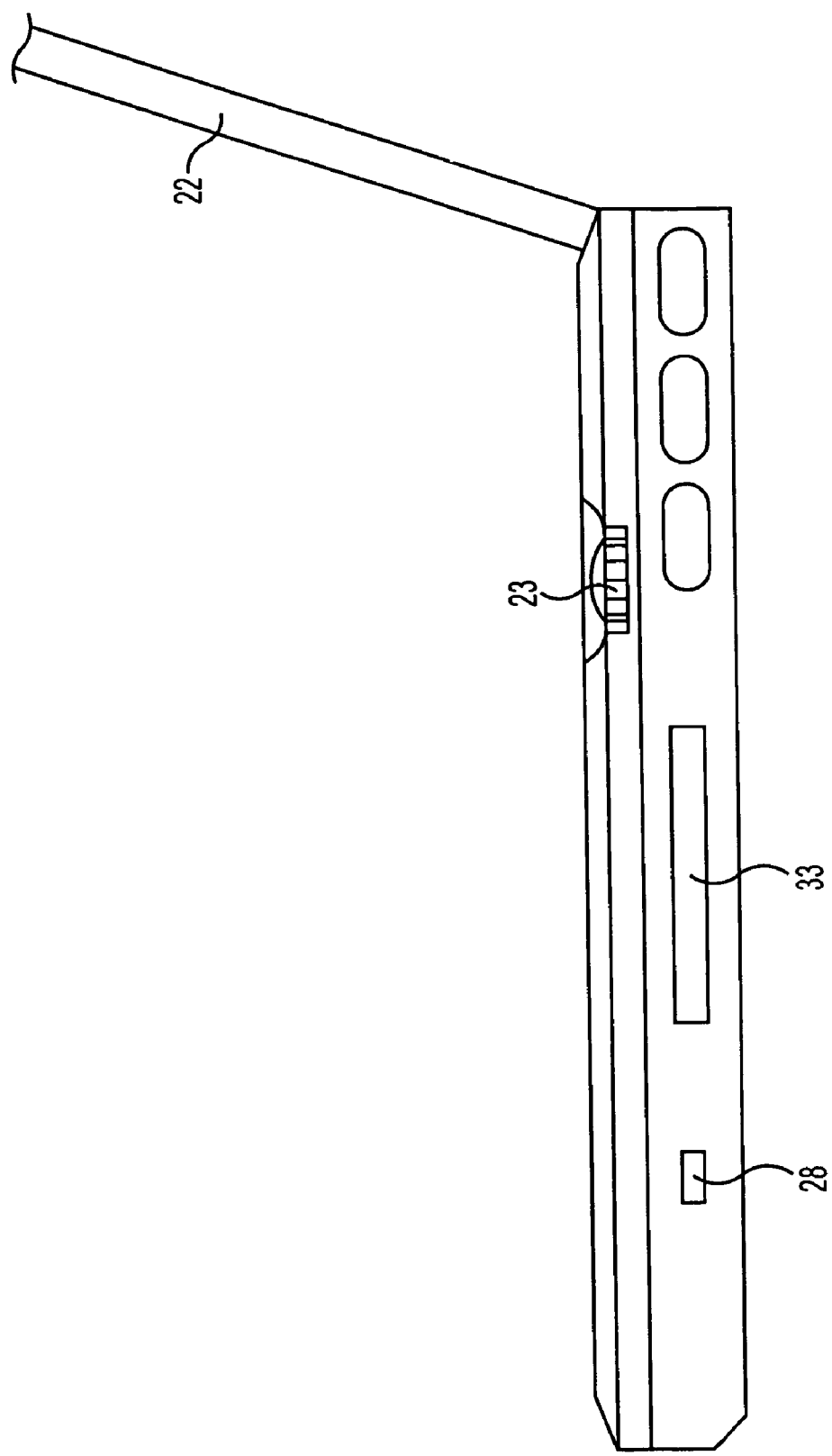
FIG. 7 is a side view illustrating the configuration of the right side of the personal computer shown in FIG. 3.

The personal computer 1 is basically formed of a main unit 21 and a display unit 22, which is pivotable on the main unit 21. FIG. 4 is an external perspective view illustrating the display unit 22 opened from the main unit 21. FIG. 5 is a plan view of the main unit 21. FIG. 6 is an enlarged view illustrating a jog dial 23, which is described below, provided for the main unit 21. FIG. 7 is a side view illustrating the jog dial 23 provided for the main unit 21.

A keyboard 24, which is operated when various characters and symbols are input, a touch pad 26, which serves as a pointing device to be operated for moving a pointer (mouse cursor) displayed on an LCD 25, and a power switch 27 are disposed on the top surface of the main unit 21. The jog dial 23 and an IEEE1394 port 28 are disposed on a side surface of the main unit 21. Instead of the touch pad 26, a stick pointing device may be provided.

The LCD (Liquid Crystal Display) 25 is provided on the front surface of the display unit 22, and a power lamp PL, a battery lamp BL, a message lamp ML (not shown), and other LEDs are disposed at the top right of the display unit 22. The message lamp ML and the other LEDs are provided if necessary. Moreover, an image capturing unit 30 provided with a CCD video camera 29 having CCDs (charge coupled devices), and a microphone 31 are disposed at the top center of the display unit 22. A shutter button 32 for operating the CCD video camera 29 is provided at the top right of the main unit 21 shown in FIG. 4.

The image capturing unit 30 is rotatably fixed at the display unit 22. For example, by a user's operation, the image capturing unit 30 can be rotated from a position at which the CCD video camera 29 is able to capture an image of the user operating the personal computer 1 to a position at which the CCD video camera 29 is able to capture images in the same direction as the viewpoint of the user operating the personal computer 1.

The jog dial 23 is fixed between a key A and a key B disposed at the right side of the keyboard 24 in FIG. 5 on the main unit 21 such that the top surface of the jog dial 23 is almost flush with the key A and the key B. The jog dial 23 performs predetermined processing (for example, scrolling the screen) in response to a rotating operation of the dial 23 indicated by the arrows a in FIG. 6, and performs predetermined processing (for example, setting the selection of the icon) in response to a shifting operation of the jog dial 23 indicated by the arrow b in FIG. 6.

The IEEE1394 port 28 has a structure based on the standard defined in IEEE1394, and a cable based on the standard defined in IEEE1394 is connected to the IEEE1394 port 28.

Figure 8:
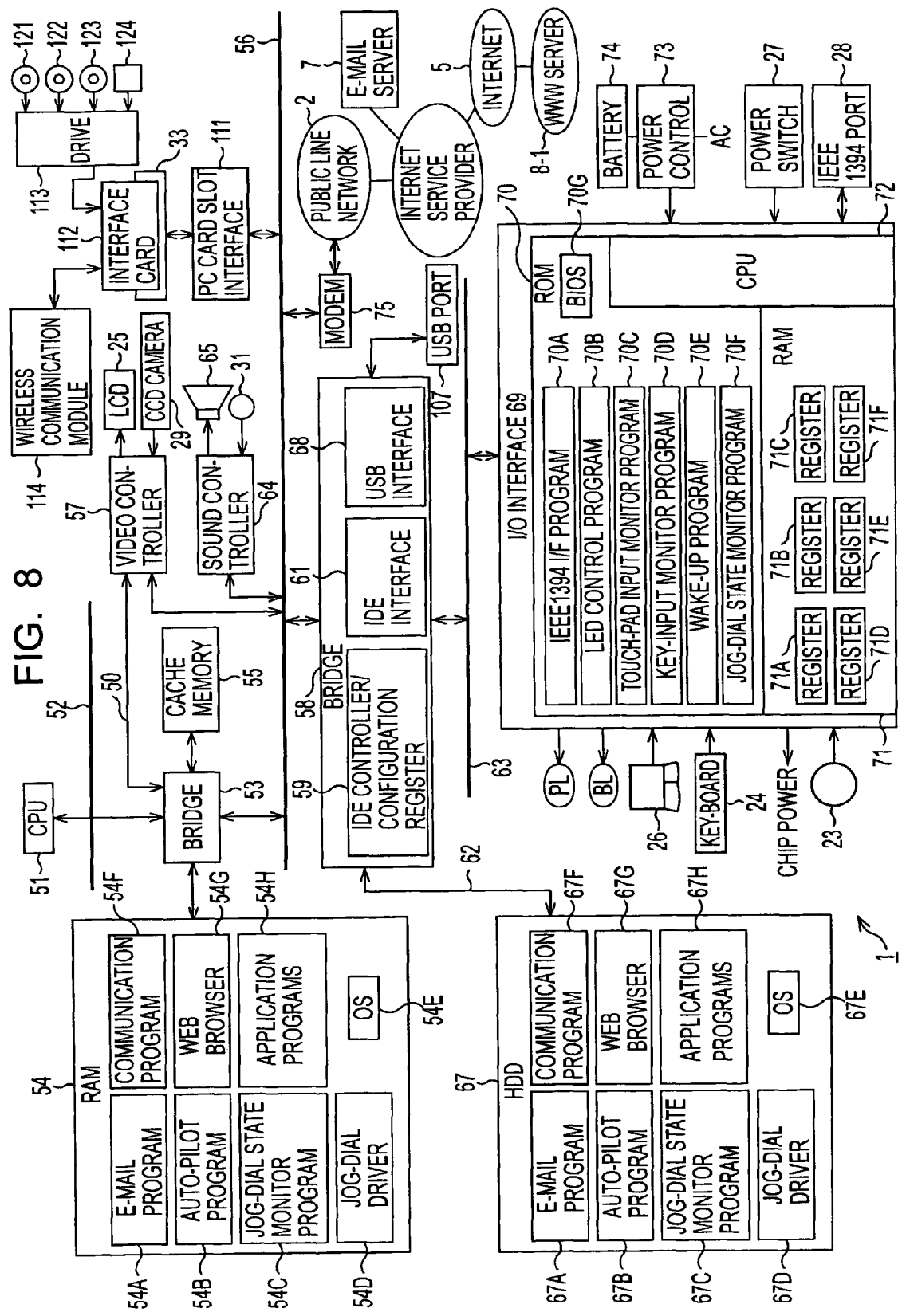
FIG. 8 is a block diagram illustrating an example of the internal configuration of the personal computer shown in FIG. 3.

An example of the internal configuration of the personal computer 1 is described below with reference to FIG. 8.

A central processing unit (CPU) 51 is formed of, for example, a Pentium® processor produced by Intel Corporation, and is connected to a host bus 52. A bridge 53 (so-called "north bridge") is also connected to the host bus 52. The bridge 53 has an AGP (Accelerated Graphics Port) 50, and is also connected to a PCI (Peripheral Component Interconnect/Interface) bus 56.

The bridge 53 is formed of, for example, 440BX, which is AGP Host Bridge Controller manufactured by Intel Corporation, and controls the CPU 51, a RAM (Random Access Memory) 54 (so-called "main memory"), etc. The bridge 53 also controls a video controller 57 via the AGP 50. The bridge 53 and a bridge (so-called "south bridge (PCI-ISA Bridge)") 58 form a so-called "chip set".

The bridge 53 is also connected to a cache memory 55. The cache memory 55 is formed of a memory, such as an SRAM (Static RAM), which is able to perform a reading or writing operation faster than the RAM 54, and caches (temporarily stores) programs or data used by the CPU 51.

The CPU 51 has a built-in primary cache, which is operated faster than the cache memory 55, and is controlled by the CPU 51.

The RAM 54 is formed of, for example, a DRAM (Dynamic RAM), and stores programs run by the CPU 51 or data required for the operation of the CPU 51. More specifically, the RAM 54 stores, for example, an e-mail program 54A, an auto-pilot program 54B, a jog-dial state monitor program 54C, a jog-dial driver 54D, an operating program (OS) 54E, a communication program 54F, a web browser 54G, and other application programs 54H (including a server program, which is discussed below), these programs being loaded from an HDD 67 with a predetermined timing.

The e-mail program 54A is a program for sending and receiving messages (e-mail) via a modem 75, the public line network 2, the Internet service provider, the e-mail server 7, and the Internet 5.

The auto-pilot program 54B is a program for sequentially starting a plurality of preset processes (or programs) in a preset order so as to process them.

The jog-dial state monitor program 54C receives from the above-described application programs messages indicating whether the programs are associated with the jog dial 23, and if the programs are associated with the jog dial 23, the jog-dial state monitor program 54C causes the LCD 25 to display the types of operations to be performed by the jog dial 23.

The jog-dial state monitor program 54C also detects an event of the jog dial 23 (for example, the rotation of the jog dial 23 in the direction indicated by the arrows a in FIG. 6 or the pressing of the jog dial 23 in the direction indicated by the arrow b in FIG. 6), and performs processing according to the detected event. The jog-dial driver 54D implements various functions in accordance with the operations of the jog dial 23.

The OS (Operating System) 54E is a program for controlling the basic operation of the computer, for example, Windows® 95 or Windows® 98 by Microsoft Corporation, or Mac® OS by Apple Computer, Inc.

The communication program 54F performs processing for peer-to-peer communication, and, in order to establish peer-to-peer communication connection, the communication program 54F also controls the e-mail program 54A to send e-mail having the attached IP address of the personal computer 1 to a communicating party, and to obtain the IP address of predetermined e-mail sent from a communicating party.

The communication program 54F controls the web browser 54G to perform communication based on the function of the web browser 54G.

The web browser 54G browses the data of a predetermined web page (displays the data on the display unit 22) under the control of the communication program 54F.

The application programs 54H are formed of various application programs, such as a server program, which is described below.

The video controller 57, which is connected to the bridge 53 via the AGP 50, receives data (such as image data or text data) supplied from the CPU 51 via the AGP 50 and the bridge 53, generates image data corresponding to the received data, and stores the generated image data, or the received data in a built-in video memory. The video controller 57 causes the LCD 25 of the display unit 22 to display an image corresponding to the image data stored in the video memory.

The video controller 57 also supplies the video data from the CCD video camera 29 to the RAM 54 via the PCI bus 56.

A sound controller 64 is connected to the PCI bus 56. The sound controller 64 receives sound from the microphone 31, generates data corresponding to the sound, and outputs the data to the RAM 54. The sound controller 64 drives a speaker 65 to output the sound.

The modem 75 is also connected to the PCI bus 56. The modem 75 is connected to the public line network 2, and performs communication processing (for example, sending various items of information to the WWW server 8-1 managed by a content distribution service provider or receiving content data from the WWW server 8-1) via the public line network 2 or the Internet 5.

A PC-card slot interface 111, which is connected to the PCI bus 56, supplies data from an interface card 112 installed in a slot 33 to the CPU 51 or the RAM 54, and also outputs data from the CPU 51 to the interface card 112. A drive 113 and a wireless communication module 114 are connected to the interface card 112.

The drive 113 is connected to the PCI bus 56 via the PC-card slot interface 111 and the interface card 112. The drive 113 reads data recorded in a magnetic disk 121, an optical disc 122, a magneto-optical disk 123, or a semiconductor memory 124 (including a memory stick® 131, which is described below with reference to FIG. 9) loaded in the drive 113, and supplies the read data to the RAM 54 via the interface card 112, the PC-card slot interface 111, and the PCI bus 56. The drive 113 is also able to store data generated by the processing of the CPU 51 (for example, audio data generated by the processing, which is described below) in the magnetic disk 121, the optical disc 122, the magneto-optical disk 123, or the semiconductor memory 124 (memory stick 131) loaded in the drive 113.

A memory stick slot may be separately provided, and the memory stick 131 may be connected without the interface card 112 or the drive 113.

The wireless communication module 114 is a module for wirelessly communicating with the PDA 11, the cellular telephone 12, the desk-top playback device 13, the portable playback device 14, and the simplified playback device 15, which have been described with reference to FIG. 3, based on the standard of, for example, IEEE802.11a. The wireless communication module 114 is connected to the PCI bus 56 via the PC-card slot interface 111 and the interface card 112.

If the wireless communication module 114 is connectable to a USB port 107 or the IEEE1394 port 28, it may wirelessly communicate with the PDA 11, the cellular telephone 12, the desk-top playback device 13, the portable playback device 14, and the simplified playback device 15, which have been described with reference to FIG. 3.

The bridge 58 (so-called "south bridge") is also connected to the PCI bus 56. The bridge 58 is formed of, for example, PIIX4E by Intel Corporation, and has a built-in IDE (Integrated Drive Electronics) controller/configuration register 59, an IDE interface 61, and a USB interface 68. The bridge 58 controls various I/O (Input/Output) devices, such as devices connected to an IDE bus 62, and devices connected via an ISA/EIO (Industry Standard Architecture/Extended Input Output) bus 63 or an I/O interface 69.

The IDE controller/configuration register 59 is formed of two IDE controllers, i.e., a so-called "primary IDE controller" and a so-called "secondary IDE controller", and a configuration register (neither of them is shown).

The HDD 67 is connected to the primary IDE controller via the IDE bus 62. When a so-called "IDE device", such as a CD ROM drive or an HDD (not shown), is connected to another IDE bus, the connected IDE device is electrically connected to the secondary IDE controller.

The HDD 67 records therein an e-mail program 67A, an auto-pilot program 67B, a jog-dial state monitor program 67C, a jog-dial driver 67D, an OS 117E, a communication program 67F, a web browser 67G, and other application programs 67H (including a server program, which is described below).

The e-mail program 67A, the auto-pilot program 67B, the jog-dial state monitor program 67C, the jog-dial driver 67D, the OS 67E, the communication program 67F, the web browser 67G, and the other application programs 67H recorded in the HDD 67 are loaded in the RAM 54.

The I/O interface 69 is also connected to the ISA/EIO bus 63. The I/O interface 69 is formed of an embedded controller, in which a ROM 70, a RAM 71, and a CPU 72 are interconnected to each other.

The ROM 70 stores an IEEE1394 interface program 70A, an LED control program 70B, a touch-pad input monitor program 70C, a key-input monitor program 70D, a wake-up program 70E, and a jog-dial state monitor program 70F.

The IEEE1394 interface program 70A sends and receives data (data stored in a packet) compliant with the IEEE1394 standard via the IEEE1394 port 28. The LED control program 70B controls the power lamp PL, the battery lamp BL, the message lamp ML, and other LEDs to be turned ON or OFF, the message lamp ML and other LEDs being provided if necessary. The touch-pad input monitor program 70C is a program for monitoring an input from the touch pad 26 in response to a user's operation.

The key-input monitor program 70D is a program for monitoring an input from the keyboard 24 or another key switch. The wake-up program 70E is a program for checking whether a preset time is reached based on current time data supplied from a timer circuit (not shown) of the bridge 58, and when the preset time is reached, the wake-up program 70E controls the power source of each chip forming the personal computer 1 so as to start predetermined processing (or program). The jog-dial state monitor program 70F is a program for constantly monitoring whether a rotation encoder of the jog dial 23 is rotated or whether the jog dial 23 is pressed.

A BIOS (Basic Input/Output System) 70G is also written in the ROM 70. The BIOS 70G controls the delivering (input/output) of data between the OS or an application program and peripheral devices (touch pad 26, keyboard 24, or HDD 67).

The RAM 71 contains an LED control register, a touch-pad input status register, a key-input status register, a time setting register, a jog-dial state monitor I/O register, an IEEE1394 I/F register, etc. as registers 71A through 71F. For example, when the jog dial 23 is pressed to start the e-mail program 54A, a predetermined value is stored in the LED control register, and the switching of the message lamp ML is controlled in accordance with the stored value. When the jog dial 23 is pressed, a predetermined operation key flag is stored in the key-input status register. A predetermined time is set in the time setting register in response to the operation performed on the keyboard 24 by the user.

The I/O interface 69 is connected to the jog dial 23, the touch pad 26, the keyboard 24, the IEEE1394 port 28, and the shutter button 32 via a connector (not shown), and outputs a signal corresponding to the operation on the jog dial 23, the touch pad 26, the keyboard 24, or the shutter button 32 to the ISA/EIO bus 63. The I/O interface 69 also controls the sending and receiving of data with devices connected via the IEEE1394 port 28. The I/O interface 69 is also connected to the power lamp PL, the battery lamp BL, the message lamp ML, a power control circuit 73, and other LEDs.

The power control circuit 73 is connected to a built-in battery 74 or an AC power source, and supplies required power to each block and also controls the recharging of the built-in battery 74 or the second battery of a peripheral device. The I/O interface 69 also monitors the power switch 27 operated when the power is turned ON or OFF.

The I/O interface 69 starts the IEEE1394 interface program 70A, the LED control program 70B, the touch-pad input monitor program 70C, the key-input monitor program 70D, the wake-up program 70E, and the jog-dial state monitor program 70F by a built-in power source even when the power is OFF. That is, these programs are constantly operated.

Accordingly, even when the OS 54E is not run by the CPU 51 since the power switch 27 is OFF, the I/O interface 69 runs the jog-dial state monitor program 70F. Accordingly, when the jog dial 23 is pressed, for example, in a power-saving state or while the power is OFF, the personal computer 1 starts predetermined software processing or script file processing.

Thus, in the personal computer 1, since the jog dial 23 is provided with a programmable power key (PPK) function, a dedicated key is not required.

Although a description has been given above, assuming that the personal computer 1 has the image capturing unit 30, the provision of the image capturing unit 30 is not essential.

The personal computer 1 does not have to be a notebook personal computer, such as that described with reference to FIGS. 4 through 7, and may be a desk-top personal computer.

Figure 9:
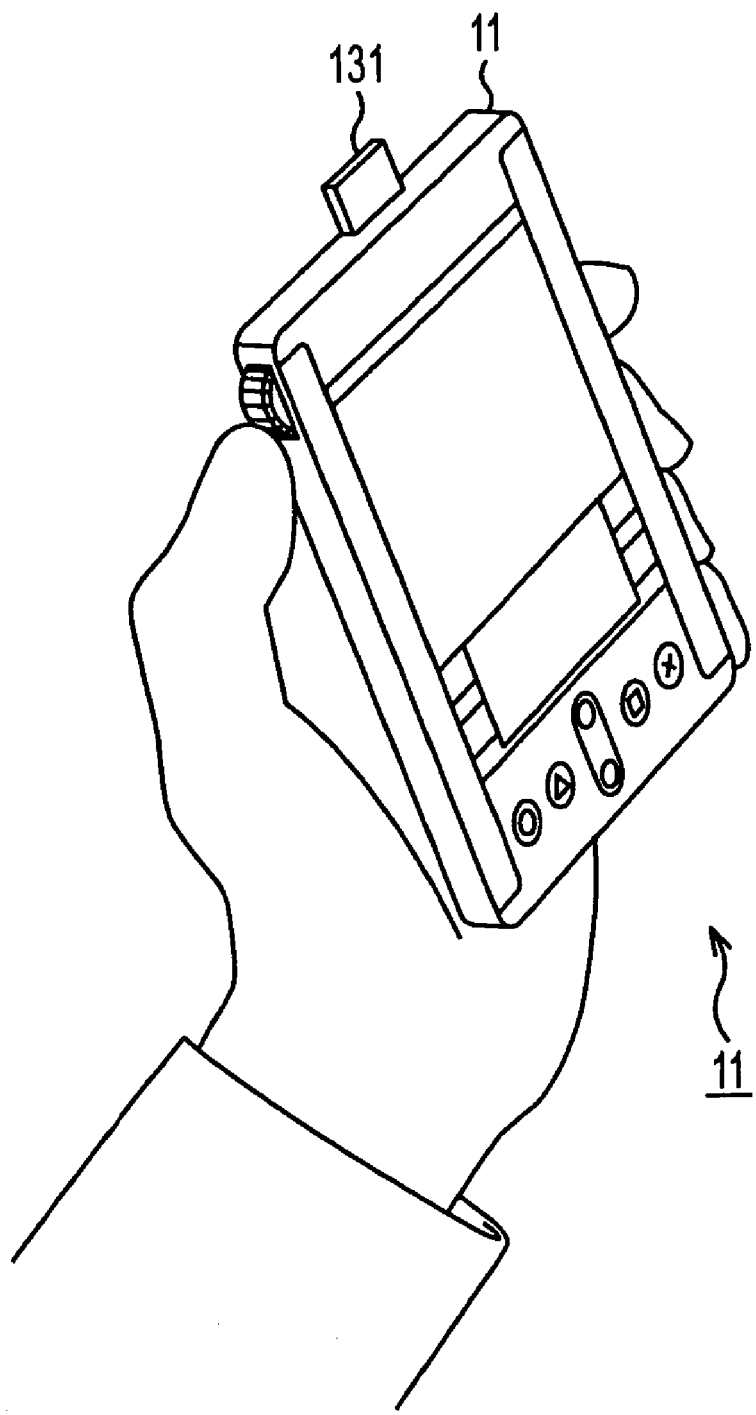
FIG. 9 is an external view of a PDA shown in FIG. 3.
Figure 10:
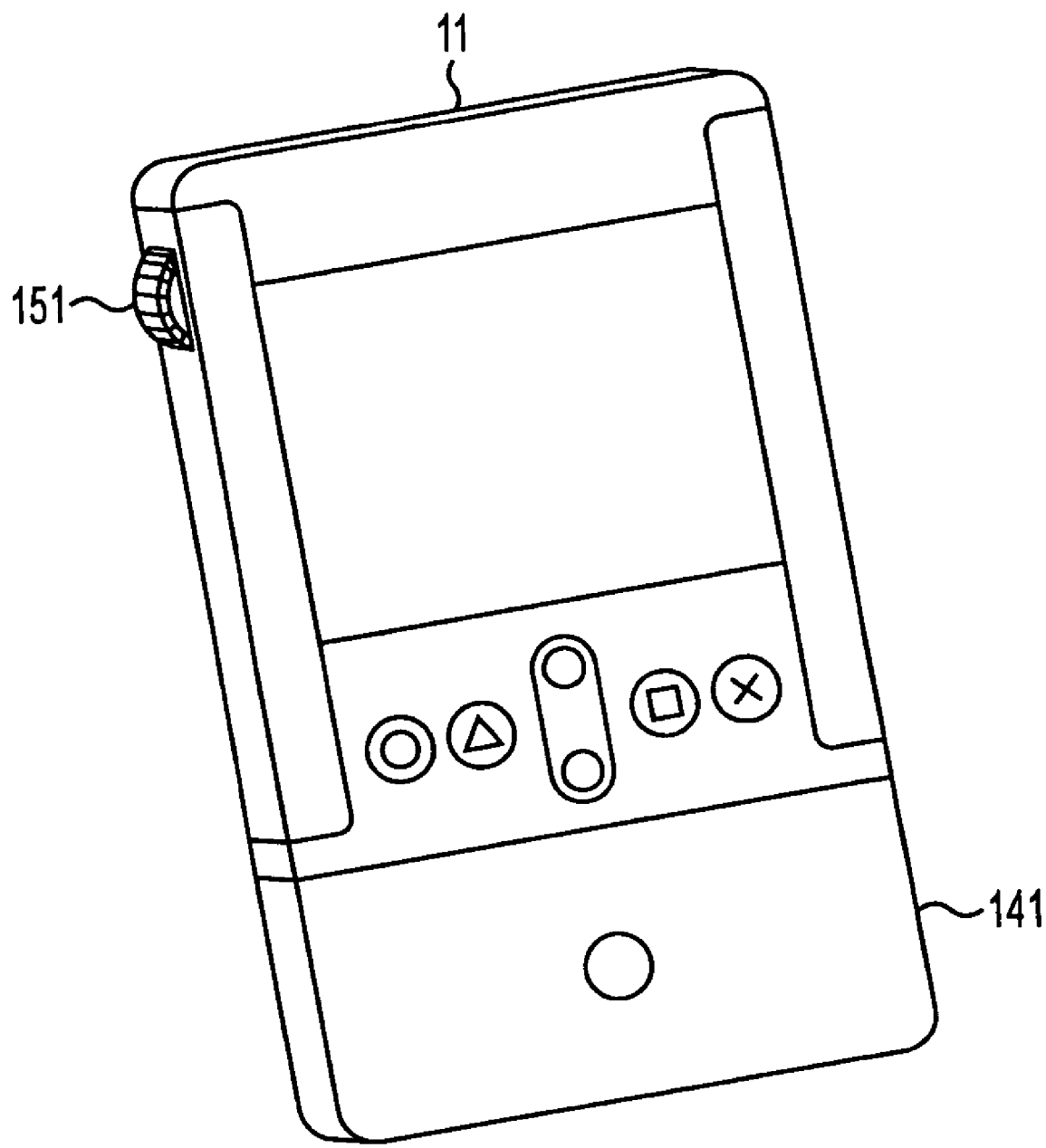
FIG. 10 is an external view of the PDA installed in a cradle.
Figure 11:
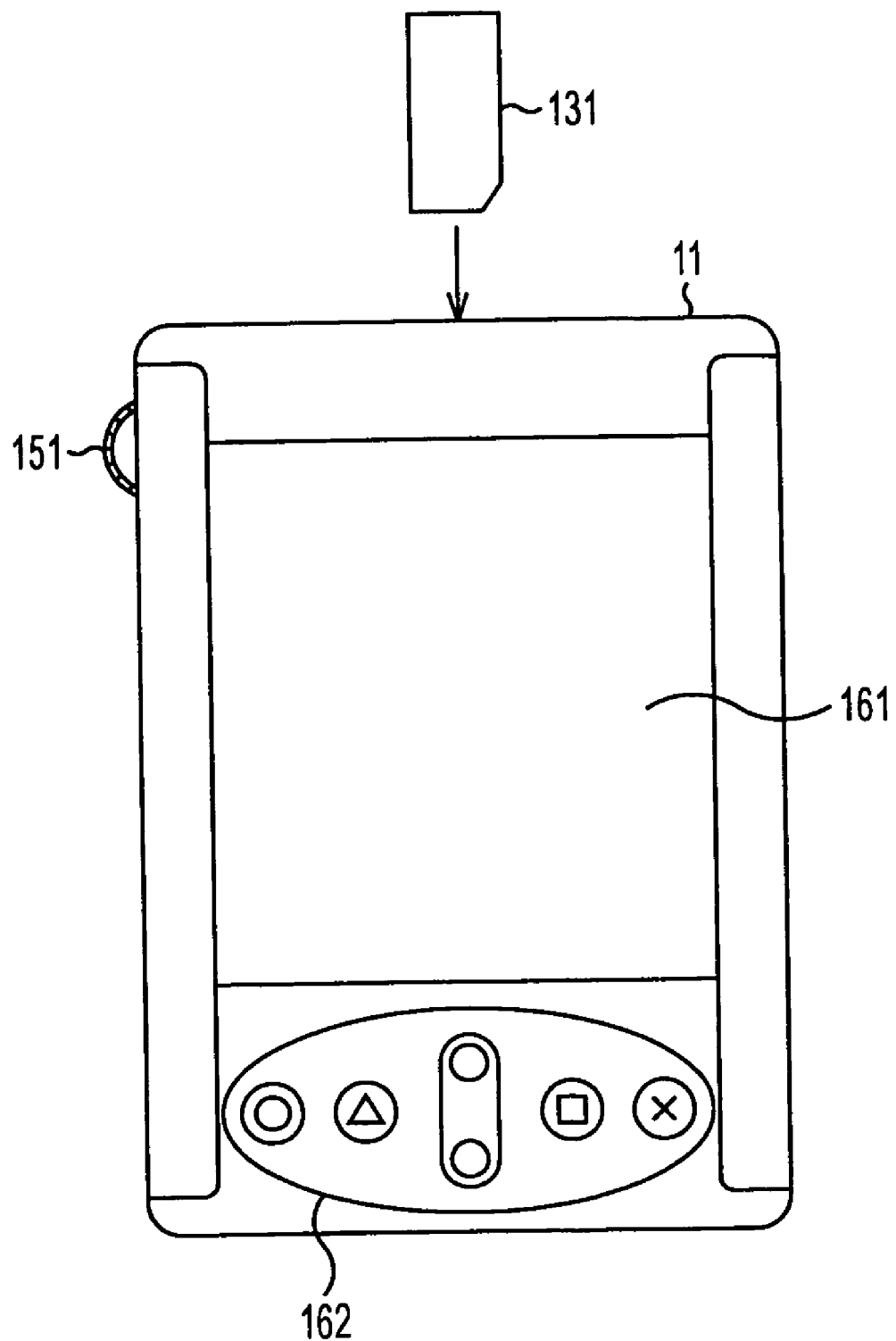
FIG. 11 is an external view of the PDA.

FIGS. 9 through 11 are external views of the PDA 11. FIG. 9 is a perspective view of the PDA 11 which is being held in a hand. FIG. 10 is a perspective view of the PDA 11 installed in a cradle 141. FIG. 11 is a front view of the PDA 11.

The housing of the PDA 11 is formed such that it can be held and operated by one hand. A slot for receiving the memory stick 131 containing a built-in semiconductor memory is provided at the top of the PDA 11.

The memory stick 131 is one type of flash memory card developed by Sony Corporation, which is the applicant of the present application. The memory stick 131 stores therein a non-volatile flash memory device, which is one type of EEPROM (Electrically Erasable and Programmable Read Only Memory), in a 21.5 (width)×50 (length)×2.8 (thickness) [mm] small and thin plastic casing. The memory stick 131 is able to read and write various data, such as images, audio, and music, via 10 pin terminals.

The memory stick 131 employs a unique serial protocol that ensures the compatibility in a device in which the memory stick 131 is used even if the specifications of the built-in flash memory are changed in response to an increased capacity. High-speed performance, such as the maximum writing speed of 1.5 [MB/S] and the maximum reading speed 2.45 [MB/S], is implemented, and high reliability is guaranteed by the provision of an erroneous-erasing preventing switch.

The PDA 11 is connected to the cradle 141, as shown in FIG. 10, so that the bottom surface of the PDA 11 is in contact with the top surface of the cradle 141. A USB (Universal Serial Bus) port (not shown), which is connected to the cradle 141, is provided on the bottom surface of the PDA 11. The cradle 141 is a docking station for allowing the PDA 11 to send and receive information to and from the personal computer 1 by being connected to the personal computer 1 by wired connection so as to update the data of the PDA 11 and the personal computer 1 (to synchronize data by hot sync).

The PDA 11 is provided with a display unit 161, keys 162, and a jog dial 151.

The display unit 161 is formed of a thin display portion, such as a liquid crystal display device, and displays images, such as icons, thumbnails, and text (for example, a predetermined GUI (Graphic User Interface) for assisting user's operations when a client program, which is described below, is run). A touch pad is provided at the upper portion of the display unit 161. By pressing the touch pad with a finger or a pen, predetermined data or an operation instruction is input into the PDA 11.

The keys 162 are formed of input keys, which are used for selecting an icon or a thumbnail displayed on the display unit 161.

The jog dial 151 is operated for selecting an icon or a thumbnail displayed on the display unit 161 in accordance with a rotation operation of the jog dial 151 or a pressing operation toward the main unit.

Figure 12:
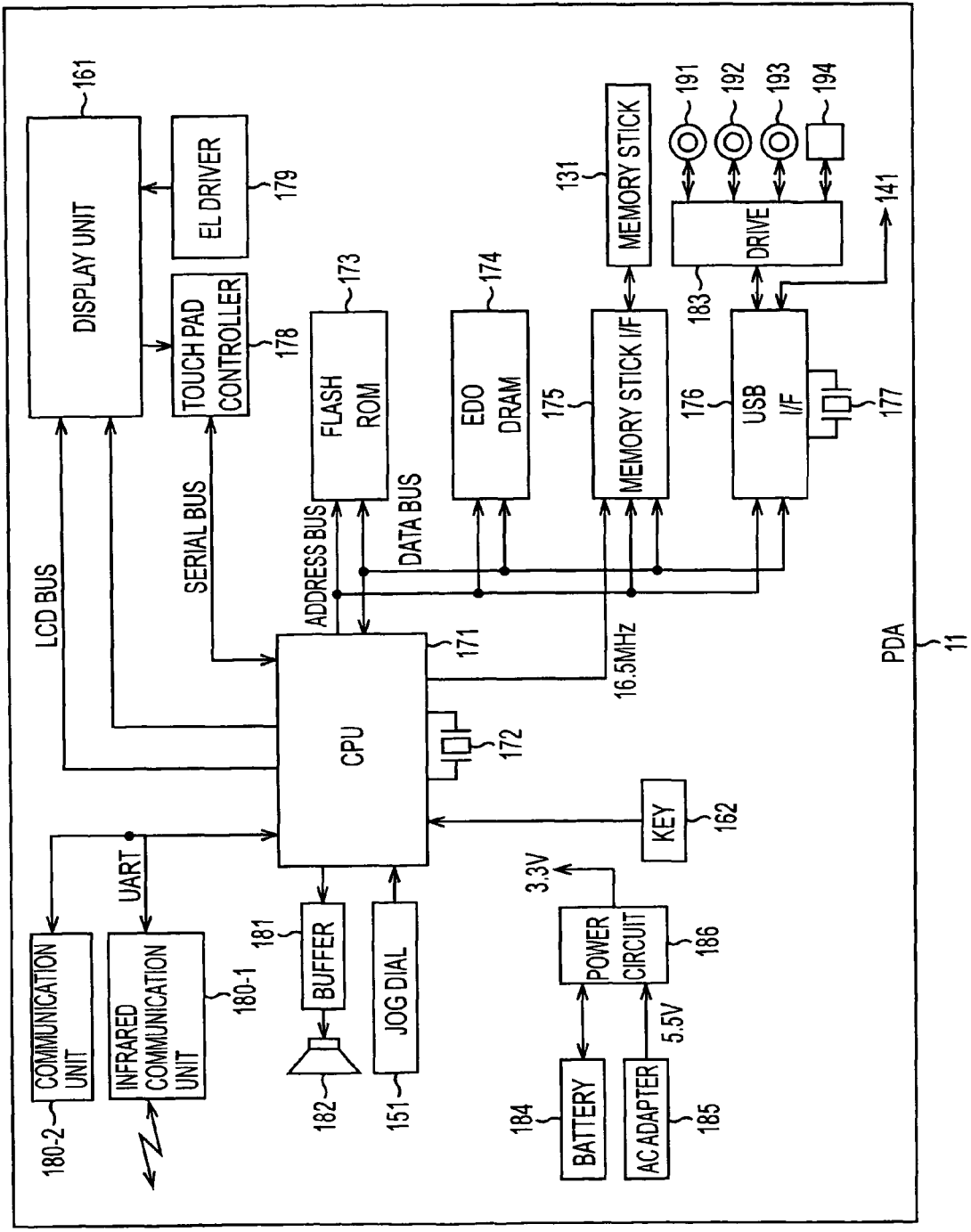
FIG. 12 is a block diagram illustrating the internal configuration of the PDA.

The internal configuration of the PDA 11 is described below with reference to FIG. 12.

A CPU (Central Processing Unit) 171 runs an operating system or various programs, such as developed application programs (for example, the client program, which is discussed below) stored in a Flash ROM (Read Only Memory) 173 or an EDO DRAM (Extended Data Out Dynamic Random Access Memory) 174 in synchronization with a clock signal supplied from an oscillator 172.

The Flash ROM 173 is formed of a flash memory, which is one type of EEPROM (Electrically Erasable Programmable Read Only Memory), and basically stores programs used by the CPU 171 and fixed data of computation parameters. The EDO DRAM 174 stores programs used by the CPU 171 and variable parameters used during the execution of the programs.

A memory stick interface 175 reads data from the memory stick 131 loaded in the PDA 11, and also writes data supplied from the PDA 171 to the memory stick 131.

A USB (Universal Serial Bus) interface 176 receives data or programs from a drive 183, which is a USB device connected to the PDA 11, and also supplies data from the CPU 171 to the drive 183 in synchronization with a clock signal supplied from an oscillator 177. The USB interface 176 receives data or programs from the cradle 141, which is a USB device connected to the PDA 11, and also supplies data from the CPU 171 to the cradle 141 in synchronization with a clock signal supplied from the oscillator 177.

The drive 183 is also connected to the USB interface 176. The drive 183 reads data or a program recorded in a magnetic disk 191, an optical disc 192, a magneto-optical disk 193, or a semiconductor memory 194 loaded in the drive 183, and supplies the data or the program to the CPU 171 or the EDO DRAM 174 via the USB interface 176. The drive 183 also records data or a program supplied from the CPU 171 to the magnetic disk 191, the optical disc 192, the magneto-optical disk 193, or the semiconductor memory 194 loaded in the drive 183.

The Flash ROM 173, the EDO DRAM 174, the memory stick interface 175, and the USB interface 176 are connected to the CPU 171 via an address bus and a data bus.

The display unit 161 receives data from the CPU 171 via an LCD bus, and displays images or characters corresponding to the received data. The display unit 161 displays a predetermined GUI for assisting the user's operation when the client program, which is discussed below, is run. When the touch pad disposed at the upper portion of the display unit 161 is operated, a touch pad controller 178 receives data (indicating, for example, touched coordinates) corresponding to the operation from the display unit 161, and supplies a signal corresponding to the received data to the CPU 171 via a serial bus.

An EL (Electro Luminescence) driver 179 operates electric-field emitting devices disposed at the rear side of the liquid crystal display of the display unit 161 so as to control the brightness of the display unit 161.

An infrared communication unit 180-1 sends data received from the CPU 171 to another device (for example, a different PDA) via a UART (Universal asynchronous receiver transmitter) by means of an infrared, and also receives data sent from another device by means of an infrared and supplies the data to the CPU 171.

A communication unit 180-2 sends data received from the CPU 171 to another device (for example, the personal computer 1) according to a predetermined communication method, such as IEEE802.11a, infrared communication, or Bluetooth, and also receives data of a predetermined communication method sent from another device and supplies the data to the CPU 171.

That is, the PDA 11 is able to communicate with other devices via the UART by means of an infrared, or by using a different wireless communication method.

The communication unit 180-1 and the communication unit 180-2 are hereinafter simply referred to as the "communication unit 180" unless it is necessary to distinguish them.

An audio playback unit 182 is formed of, for example, a speaker and a decoder circuit for audio data. When prestored audio data, audio data received via the Internet 5, or the client program, which is discussed below, is started, the audio playback unit 182 decodes music data received from the personal computer 1 and plays it back to output the sound. For example, the audio playback unit 182 plays back audio data supplied from the CPU 171 via a buffer 181, and outputs the sound corresponding to the data.

The keys 162 are formed of, for example, input keys, and are operated by the user when inputting various instructions into the CPU 171.

The jog dial 151 supplies data in accordance with a rotation operation or a pressing operation toward the main unit to the CPU 171.

A power source circuit 186 converts the voltage of power supplied from a battery 184 loaded in the power source circuit 186 or an AC (Alternating current) adapter 185 connected to the power source circuit 186, and supplies power to the CPU 171, the oscillator 172, the Flash ROM 173, the EDO DRAM 174, the memory stick interface 175, the USB interface 176, the oscillator 177, the touch pad controller 178, the EL driver 179, the communication unit 180, the buffer 181, and the speaker 182.

Figure 13:
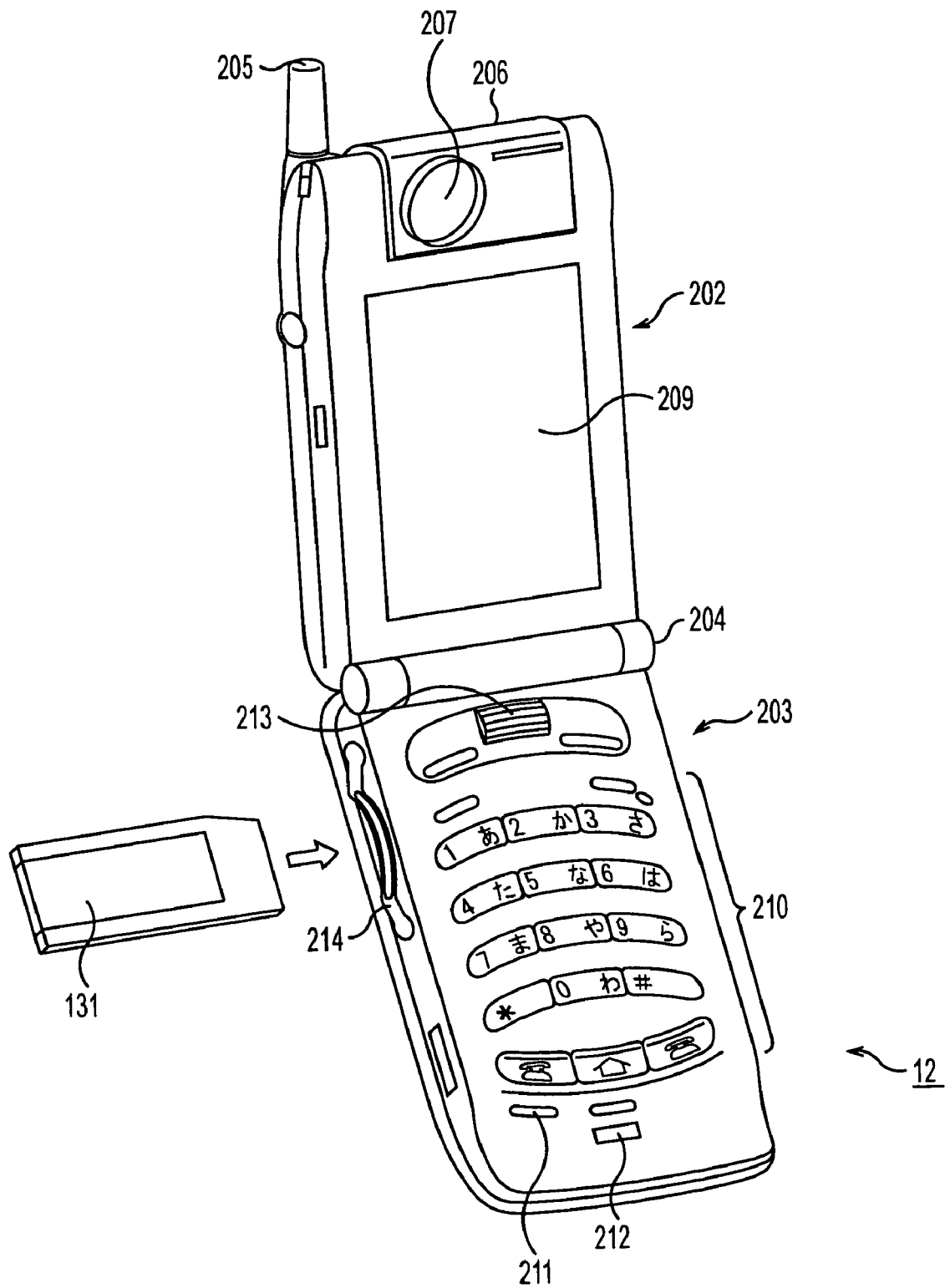
FIG. 13 is an external view of a cellular telephone shown in FIG. 3.

The external configuration of the cellular telephone 12 is now described. The cellular telephone 12 is formed of, as shown in FIG. 13, a display unit 202 and a main unit 203, which are foldable by a hinge 204 disposed at the center of the cellular telephone 12.

The display unit 202 includes a transceiver antenna 205, disposed at the upper left of the display unit 202, which can be pulled and pushed from and into the display unit 202. The cellular telephone 12 sends and receives radio waves via the antenna 205 to and from one of the base stations, which are fixed wireless stations.

A liquid crystal display 209 is provided on the front surface of the display unit 202. The liquid crystal display 209 displays the radio reception state, the remaining amount of battery, the names and telephone numbers of communicating parties, which are registered in a telephone directory, the transmission log, e-mail messages, simplified homepages, images captured by a CCD camera 207 of a camera unit 206, which are discussed below, and predetermined GUIs for assisting the user's operation when the client program, which is discussed below, is started.

The main unit 203 is provided with operation keys 210, such as numeric keys from "0" to "9", a calling key, a redial key, a hang-up/power key, a clear key, and an e-mail key, on the surface of the main unit 203. Various instructions in accordance with the operations on the operation keys 210 are input into the cellular telephone 12.

A memo button 211 and a microphone 212 are provided below the operation keys 210 of the main unit 203. When the memo button 211 is operated, the cellular telephone 12 records the voice of a communicating party. The cellular telephone 12 collects user's voice by using the microphone 212.

A rotatable jog dial 213 is disposed above the operation keys 210 of the main unit 203 such that it slightly projects from the surface of the main unit 203. In accordance with the rotation operation of the jog dial 213, the cellular telephone 12 performs various operations, such as scrolling a telephone directory list or an e-mail message displayed on the liquid crystal display 209, page changing of homepages, or moving the cursor line on the GUI screen displayed when the client program, which is discussed below, is started.

For example, the main unit 203 selects a desired telephone number from a plurality of telephone numbers of a telephone directory list displayed on the liquid crystal display 209 in accordance with the rotation operation of the jog dial 213 by the user, and when the jog dial 213 is pressed toward the main unit 203, the main unit 203 sets the selected telephone number and automatically calls the set telephone number.

A battery pack (not shown) is attached to the rear side of the main unit 203, and when the hang-up/power key is turned ON, power is supplied to the circuits from the battery pack so that the cellular telephone 12 becomes operable.

A memory stick slot 214 into and from which the memory stick 131 can be inserted and removed is provided at the top left surface of the main unit 203. When the memo button 211 is pressed, the cellular telephone 12 records the voice of a communicating party in the memory stick 131. The cellular telephone 12 also records an e-mail message or a simplified homepage in the memory stick 131 according to the user's operation.

The display unit 202 may also be provided with the camera unit 206 that is rotatable within the angle of almost 180 degrees at the top center of the display unit 202 (the provision of the camera unit 206 is not essential). The cellular telephone 12 is able to capture a desired subject by using the CCD camera 207 of the camera unit 206.

Figure 14:
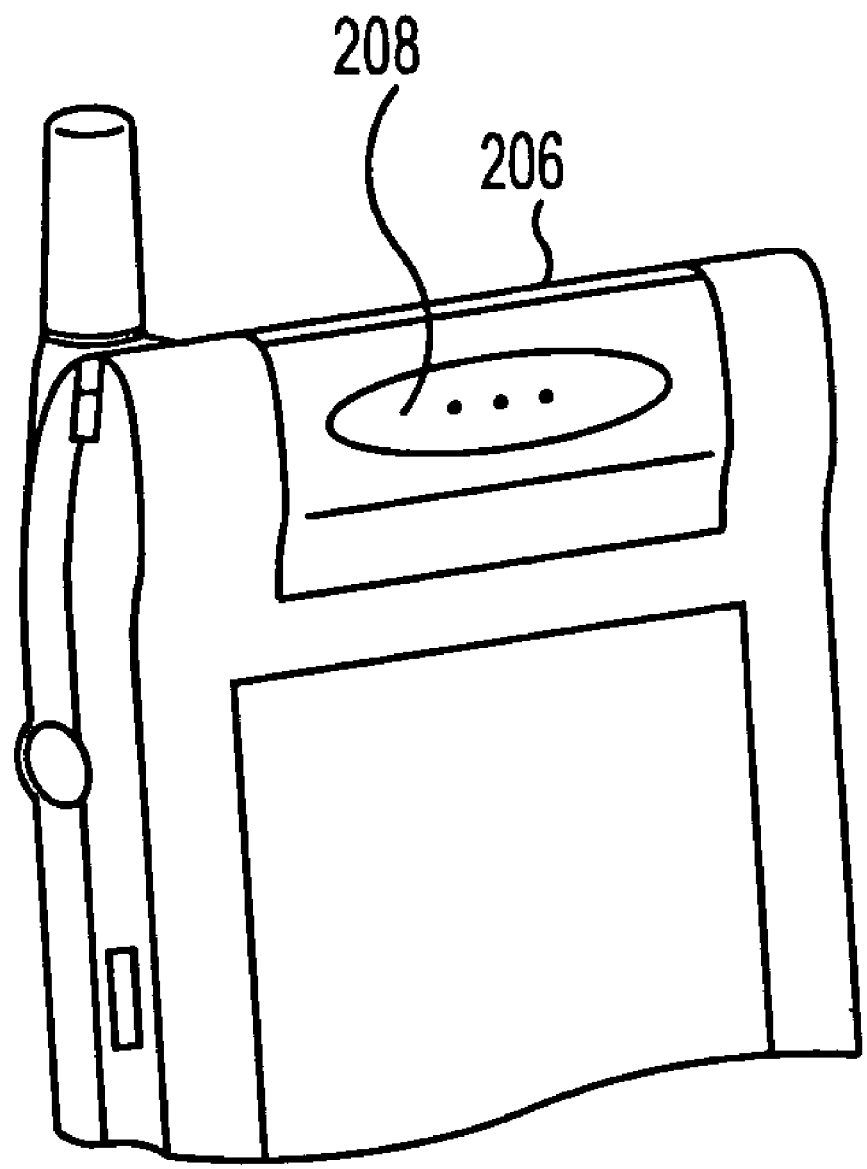
FIG. 14 is an external view of a camera unit of the cellular telephone.

When the camera unit 206 is positioned by being rotated almost by 180 degrees by the user, a speaker 208 disposed at the rear center of the camera unit 206 faces the user, as shown in FIG. 14. Then, the cellular telephone 12 is switched to the normal audio communication mode.

Figure 15:
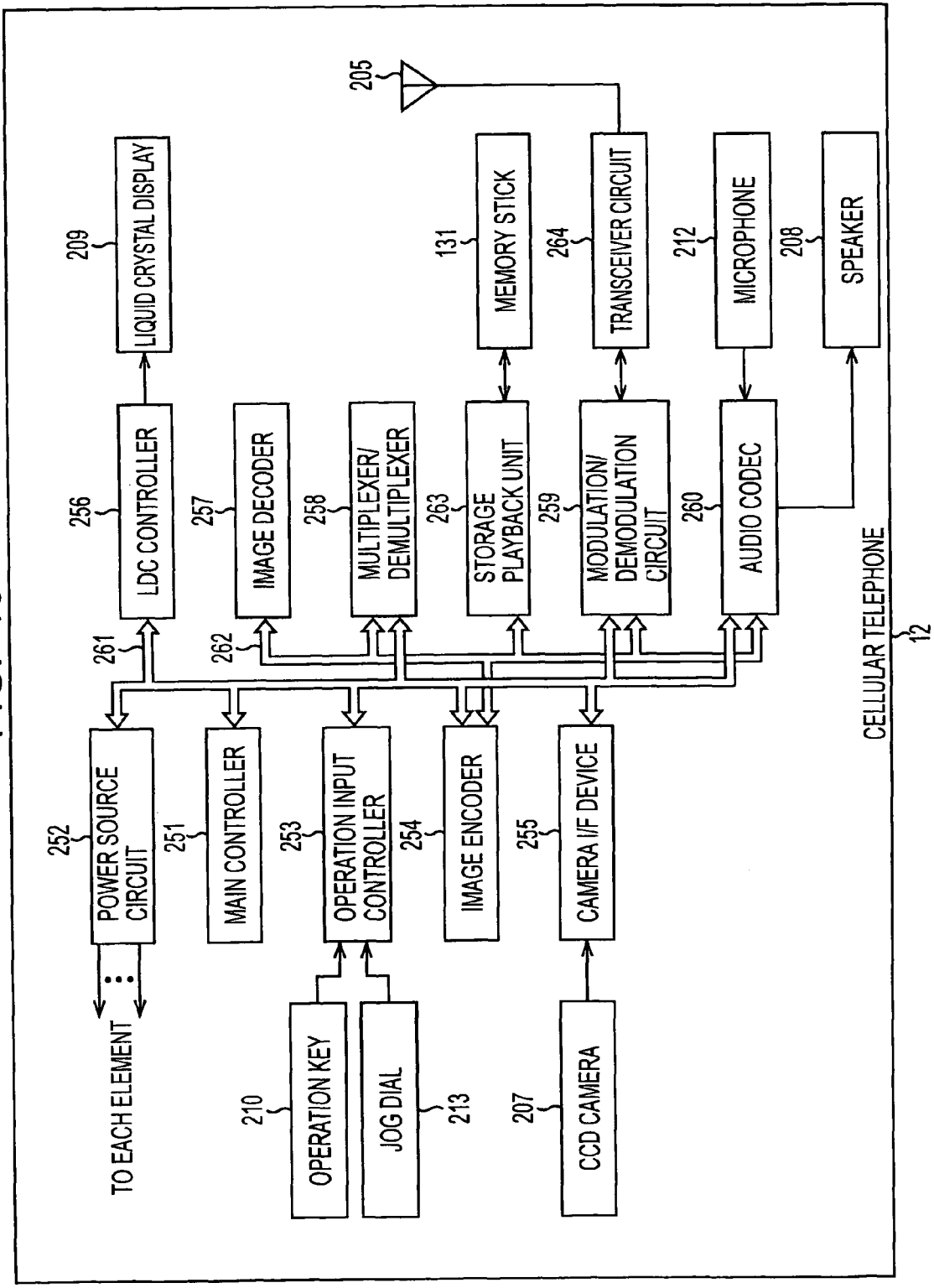
FIG. 15 is a block diagram illustrating the configuration of the cellular telephone.

FIG. 15 is a block diagram illustrating the internal configuration of the cellular telephone 12. A description is given below, assuming that the cellular telephone 12 is provided with the camera unit 206. However, the provision of the camera unit 206 is not essential.

In the cellular telephone 12, as shown in FIG. 15, a main controller 251 for centrally controlling the display unit 202 and the main unit 203 is connected via a main bus 261 to a power source circuit 252, an operation input controller 253, an image encoder 254, a camera I/F (interface) 255, an LCD (Liquid Crystal Display) controller 256, a multiplexer/demultiplexer 258, a modulation/demodulation circuit 259, and an audio codec 260. The main controller 251 is also connected via a synchronous bus 262 to the image encoder 254, an image decoder 257, the multiplexer/demultiplexer 258, a storage playback unit 263, the modulation/demodulation circuit 259, and the audio codec 260.

When the hang-up/power key is turned ON by the user, the power source circuit 252 supplies power to the individual elements from the battery pack so as to start the cellular telephone 12.

In the audio communication mode, under the control of the main controller 251, which is formed of a CPU, a ROM, and a RAM, the cellular telephone 12 converts an audio signal collected by the microphone 212 into digital audio data by using the audio codec 260. After performing spread spectrum on the digital audio data by using the modulation/demodulation circuit 259, and also performing digital-to-analog conversion and frequency conversion on the digital audio data by using a transceiver circuit 264, the cellular telephone 12 transmits the digital audio data via the antenna 205.

In the audio communication mode, the cellular telephone 12 also amplifies a signal received by the antenna 205 in the transceiver circuit 264 so as to perform frequency conversion and analog-to-digital conversion on the received signal. The cellular telephone 12 then performs de-spread spectrum on the digital signal in the modulation/demodulation circuit 259, and converts the digital signal into an analog audio signal in the audio codec 260. The cellular telephone 12 then controls the speaker 208 to output the sound corresponding to the analog audio signal.

When sending e-mail in the data communication mode, the cellular telephone 12 sends e-mail text data input by the operation performed on the operation keys 210 or the jog dial 213 to the main controller 251 via the operation input controller 253.

The main controller 251 performs spread spectrum on the text data by using the modulation/demodulation circuit 259, performs digital-to-analog conversion and frequency conversion on the text data by using the transceiver circuit 264, and then, transmits the text data to a base station via the antenna 205.

When receiving e-mail in the data communication mode, the cellular telephone 12 performs de-spread spectrum on a signal received from a base station via the antenna 205 by using the modulation/demodulation circuit 259 so as to reproduce the original text data, and outputs it to the LCD controller 256. The LCD controller 256 controls the liquid crystal display 209 to display the received e-mail message.

In the cellular telephone 12, it is possible to record data corresponding to received e-mail into the memory stick 131 via the storage playback unit 263 according to the user's operation.

In the cellular telephone 12, when sending image data in the data communication mode, image data captured by the CCD camera 207 is supplied to the image encoder 254 via the camera interface 255.

When image data is not sent, the cellular telephone 12 is able to directly display image data captured by the CCD camera 207 on the liquid crystal display 209 via the camera interface 255 and the LCD controller 256.

The image encoder 254 performs compression-coding on the image data supplied from the CCD camera 207 according to a predetermined coding method, for example, MPEG (Moving Picture Experts Group) 2 or MPEG4, so as to convert the image data into coded image data, and sends it to the multiplexer/demultiplexer 258.

Simultaneously, the cellular telephone 12 sends the sound collected by the microphone 212 while the image was captured by the CCD camera 207 to the multiplexer/demultiplexer 258 via the audio codec 260 as digital audio data.

The multiplexer/demultiplexer 258 multiplexes the coded image data supplied from the image encoder 254 with the audio data supplied from the audio codec 260 according to a predetermined method. The modulation/demodulation circuit 259 then performs spread spectrum on the resulting multiplexed data, and the transceiver circuit 264 performs digital-to-analog conversion and frequency conversion on the multiplexed data. The resulting signal is then transmitted via the antenna 205.

When receiving moving-picture file data linked to, for example, a simplified homepage in the data communication mode, the cellular telephone 12 performs de-spread spectrum on a signal received from a base station via the antenna 205 by using the modulation/demodulation circuit 259, and sends the resulting multiplexed data to the multiplexer/demultiplexer 258.

The multiplexer/demultiplexer 258 demultiplexes the multiplexed data into the coded image data and the audio data, and supplies the coded image data to the image decoder 257 via the synchronous bus 262 and supplies the audio data to the audio codec 260 via the synchronous bus 262.

The image decoder 257 decodes the coded image data into playback moving picture data according to a decoding method corresponding to the coding method, such as MPEG2 or MPEG4. The image decoder 257 then supplies the playback moving picture data to the liquid crystal display. 209 via the LCD controller 256, and displays the data on the liquid crystal display 209. Thus, the cellular telephone 12 is able to display, for example, moving picture data contained in a moving picture file linked to a simplified homepage.

Simultaneously, the audio codec 260 converts the audio data into an analog audio signal, and then supplies it to the speaker 208. Thus, the cellular telephone 12 is able to play back, for example, audio data contained in a moving picture file linked to a simplified homepage.

As in the case of e-mail, the cellular telephone 12 is able to record the received data of, for example, a simplified homepage into the memory stick 131 via the storage playback unit 263 according to the user's operation.

The cellular telephone 12 is also able to record various application programs (for example, the client program, which is described below) in the RAM or the ROM of the main controller 251, which is formed of the CPU, the ROM, and the RAM, and executes the programs by using the CPU.

When the client program, which is discussed below, is run by the main controller 251, as in the data communication mode, the modulation/demodulation circuit 259 performs spread spectrum on a request signal sent to the personal computer 1, and the transceiver circuit 264 performs digital-to-analog conversion and frequency conversion on the signal. The resulting signal is then transmitted via the antenna 205. Also, as in the data communication mode, music data sent from the personal computer 1 is received by the antenna 205, and the transceiver circuit 264 amplifies the music data and performs frequency conversion and analog-to-digital conversion on the music data. The modulation/demodulation circuit 259 then performs de-spread spectrum on the music data, and the audio codec 260 converts the music data into an analog audio signal. The sound corresponding to the music data converted into the analog audio signal is then output from the speaker 208.

Alternatively, a communication unit that is able to perform wireless communication according to a predetermined communication method, for example, IEEE802.11a, infrared communication, or Bluetooth, may be provided to perform wireless communication with the personal computer 1 according to a method different from the data communication mode.

Figure 16A:
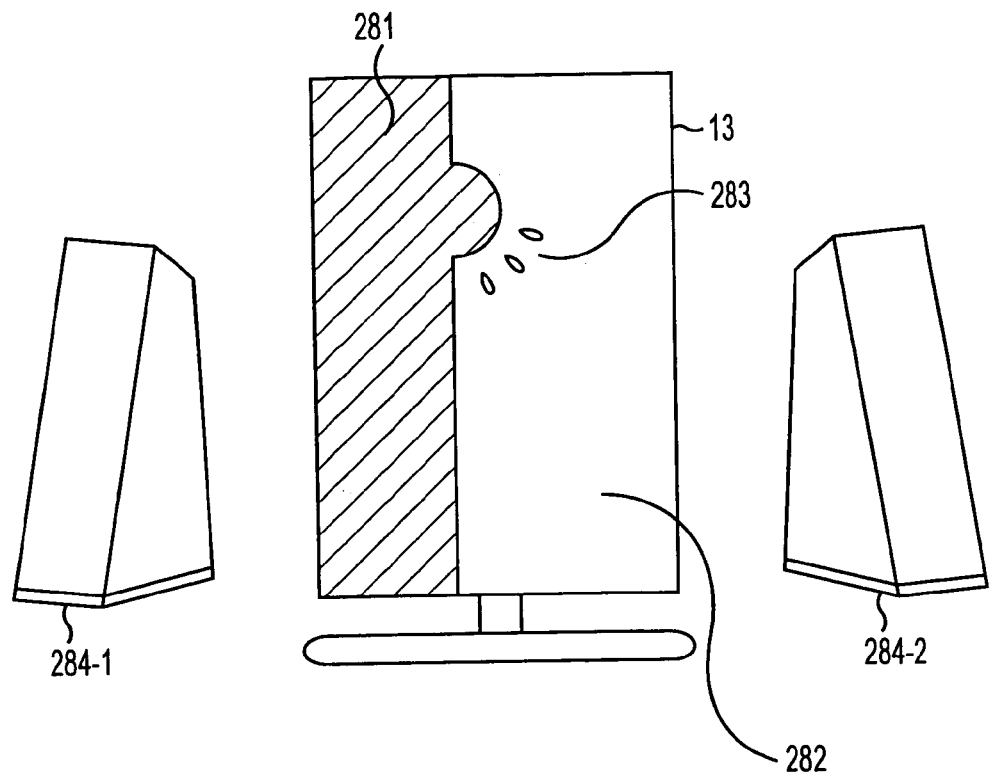
FIG. 16A is an external view of a desk-top playback device shown in FIG. 3.
Figure 16B:
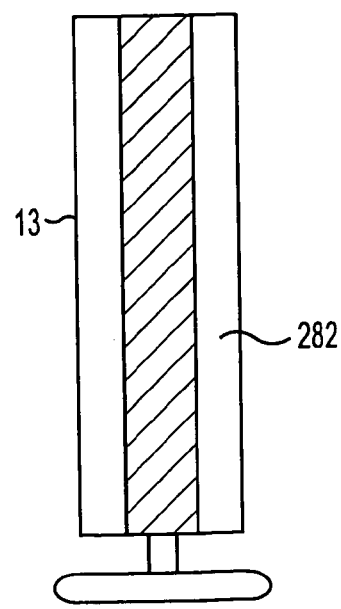
FIG. 16B is an external view of the desk-top playback device shown in FIG. 3.

FIGS. 16A and 16B are external views of the desk-top playback device 13.

FIG. 16A is a front view of the desk-top playback device 13. The desk-top playback device 13 plays back music data sent from the personal computer 1, and outputs the sound from speakers 284-1 and 284-2. The desk-top playback device 13 includes a display panel 281 and a front panel 282 on the front surface of the desk-top playback device 13. A GUI screen, which is discussed below, is displayed on the display panel 281.

The front panel 282 is provided with, not only an operation button 283, but also an IR (Infra Red) receiver (not shown) for receiving an infrared signal indicating a user's operation sent from a remote commander, which is discussed below with reference to FIGS. 18A and 18B. The front panel 282 may have a built-in speaker and an output terminal leading to a headphone (not shown), in which case, sound can be output without the need to connect the speakers 284-1 and 284-2.

FIG. 16B is a side view of the desk-top playback device 13. The desk-top playback device 13 is formed to be very thin, as shown in FIG. 16B, which increases the flexibility to select the installation place though the size of the display panel 281 is sufficiently large.

Figure 17:
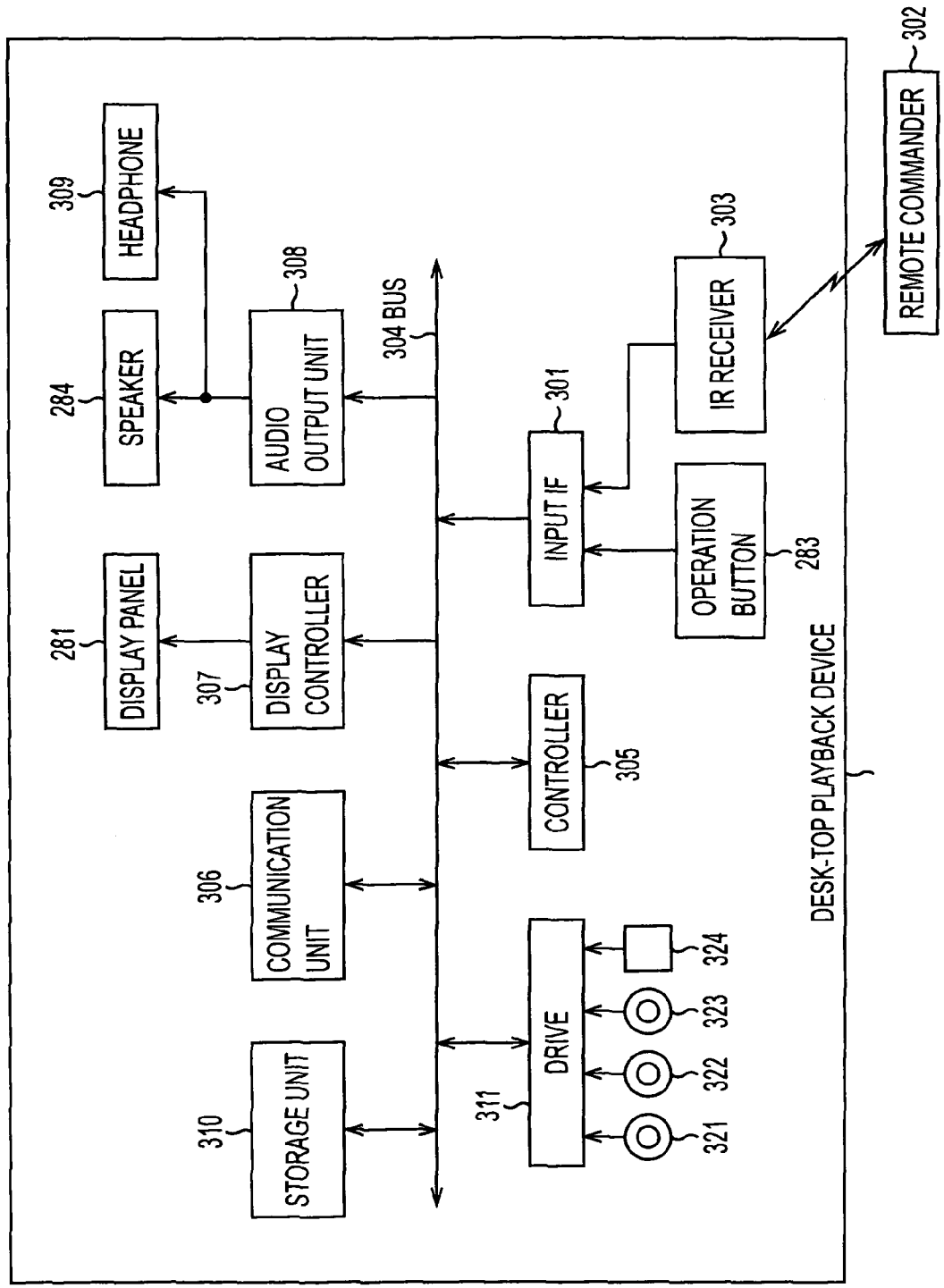
FIG. 17 is a block diagram illustrating the configuration of the desk-top playback device.

FIG. 17 is a block diagram illustrating the configuration of the desk-top playback device 13. An input IF (Interface) 301 receives a signal indicating a user's operation from the operation button 283 or an IR receiver 303 which has received an infrared signal from a remote commander 302, and outputs the signal to a controller 305 via a bus 304.

The controller 305 is a so-called "microcomputer" formed of a CPU, a ROM, and a RAM, and controls the overall operation of the desk-top playback device 13. The controller 305 runs the client program, which is discussed below, and in accordance with a signal indicating a user's operation input from the input IF 301, the controller 305 sends a music-data request signal to the personal computer 1 via a communication unit 306, or reads image data corresponding to a GUI screen, which is discussed below, from a storage unit 310 and outputs the read image data to a display controller 307 via the bus 304 and displays it on the display panel 281. The controller 305 also outputs music data received by the communication unit 306 to an audio output unit 308 via the bus 304, controls the audio output unit 308 to play back the music data in accordance with the data format, and outputs the sound from the speaker 284 or a headphone 309.

The communication unit 306 performs wireless communication with the personal computer 1 according to a predetermined communication method, for example, IEEE802.11a, infrared communication, or Bluetooth. The communication unit 306 sends a music-data request signal input from the controller 305 via the bus 304 to the personal computer 1, and receives music data from the personal computer 1 and outputs it to the controller 305 via the bus 304.

The display controller 307 outputs image data to the display panel 281, and controls the image data to be displayed under the control of the controller 305. Under the control of the controller 305, the audio output unit 308 plays back input audio data based on the format, outputs the audio data to the speaker 284 or the headphone 309, and controls the sound to be output.

GUI data to be displayed on the display panel 281 is stored in a storage unit 310, and also, various types of information required for the control performed by the controller 305 are stored in the storage unit 310.

A drive 311 is also connected to the controller 305 via the bus 304. The drive 311 reads data or a program recorded in a magnetic disk 321, an optical disc 322, a magneto-optical disk 323, or a semiconductor memory 324 loaded in the drive 311, and supplies the data or the program to the controller 305 via the bus 304. The drive 311 also records data or a program supplied from the controller 305 to the magnetic disk 321, the optical disc 322, the magneto-optical disk 323, or the semiconductor memory 324 loaded in the drive 311.

Figure 18A:
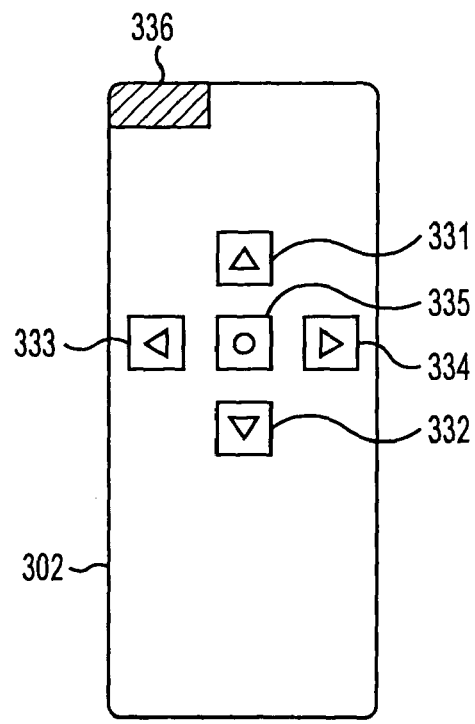
FIG. 18A illustrate a remote commander.
Figure 18B:
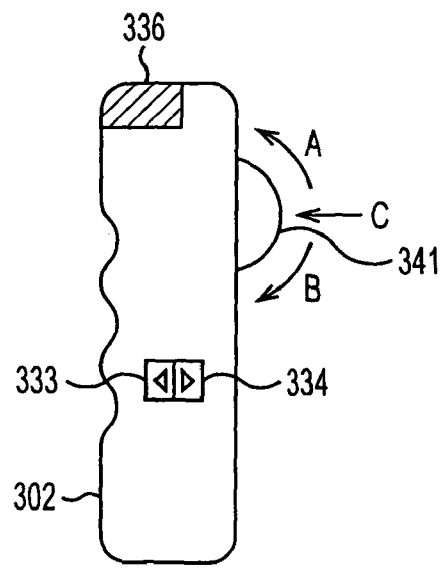
FIG. 18B illustrates the remote commander.

FIGS. 18A and 18B are external views of the remote commander 302. The remote commander 302 includes, as shown in FIG. 18A, cursor buttons 331 and 332, a zoom-out button 333, a zoom-in button 334, and a restart button 335. The user operates the cursor buttons 331 and 332, the zoom-out button 333, the zoom-in button 334, and the restart button 335 by referring to a GUI displayed on the display panel 281.

The cursor buttons 331 and 332 are operated by the user for changing the selection of an icon or a thumbnail, which are discussed below, displayed on the display panel 281. The zoom-out button 333 and the zoom-in button 334 are operated by the user when a zoom-out or zoom-in operation is designated, i.e., when the GUI screen currently displayed on the display panel 281 is changed. The restart button 335 is operated by the user when the user wishes to listen to a piece of music which is currently played back in the desk-top playback device 13 from the beginning. When the user operates one of the above-described buttons, an infrared signal is output from an IR transmitter 336 to the IR receiver 303 of the desk-top playback device.

The remote commander 302 may be provided with, as shown in FIG. 18B, a jog dial 341 instead of the cursor buttons 331 and 332 and the restart button 335. The jog dial 341 is a rotating/pressing operation device, and is rotatable in the directions indicated by the arrows A and B and is also pressable in the direction indicated by the arrow C. The rotation operation on the jog dial 341 in the direction indicated by the arrow A is equivalent to the input operation on the cursor button 331 of FIG. 18A, and the rotation operation on the jog dial 341 in the direction indicated by the arrow B is equivalent to the input operation on the cursor button 332 of FIG. 18A. The pressing operation on the jog dial 341 is equivalent to the input operation on the restart button 335.

Figure 19:
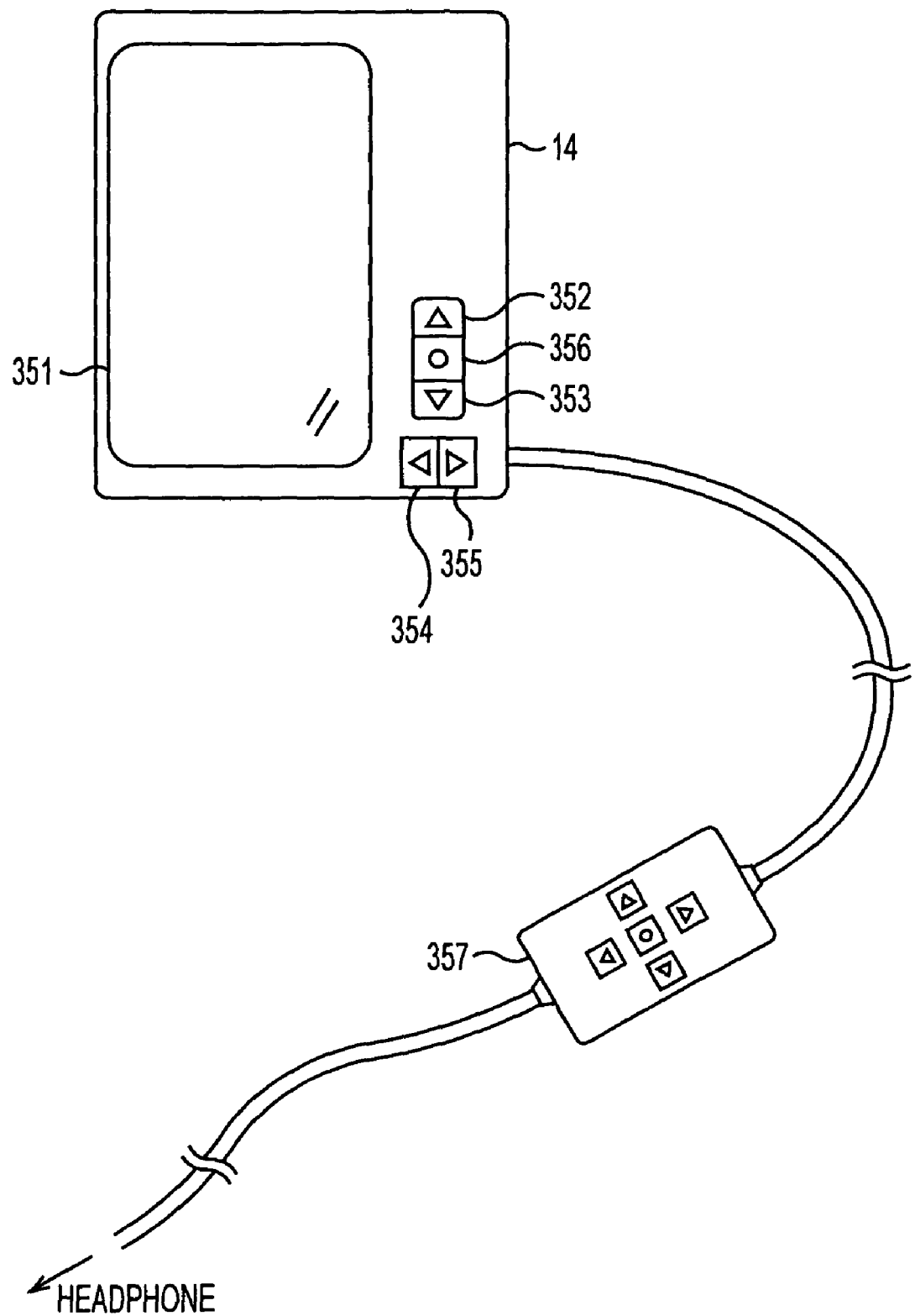
FIG. 19 is an external view of a portable playback device shown in FIG. 3.

FIG. 19 is an external view of the configuration of the portable playback device 14. The size of the portable playback device 14 is small enough to be held in a pocket.

A GUI screen for assisting the user's operation is displayed on a display panel 351. Since the display area of the display panel 351 is much smaller than the display panel 281 of the desk-top playback device 13 described with reference to FIGS. 16A and 16B, a simple GUI may be displayed compared to the GUI displayed on the display panel 281 of the desk-top playback device 13.

The portable playback device 14 is provided with cursor keys 352 and 353, a zoom-out key 354, a zoom-in key 355, and a restart key 356. A remote commander 357 provided with keys similar to the cursor keys 352 and 353, the zoom-out key 354, the zoom-in key 355, and the restart key 356 is also provided in a mid portion of a cable for connecting the portable playback device 14 to a headphone 16 so as to allow the user to operate the portable playback device 14 while keeping it in a pocket or a bag. The user operates the cursor keys 352 and 353, the zoom-out key 354, the zoom-in key 355, or the restart key 356 by referring to the GUI displayed on a display panel 351, or operates the remote commander 357 without referring to the display panel 351.

The cursor keys 352 and 353 are operated by the user when the icon or the thumbnail displayed on the display panel 351 is changed. The zoom-out key 354 and the zoom-in key 355 are displayed by the user when the GUI screen currently displayed on the display panel 351 is changed, i.e., when a zoom-out or zoom-in operation is designated. The restart key 356 is operated by the user when the user wishes to listen to a piece of music which is currently played back in the portable playback device 14 from the beginning. Basically, the keys provided for the remote commander 357 are configured similarly to the cursor keys 352 and 353, the zoom-out key 354, the zoom-in key 355, and the restart key 356.

Figure 20:
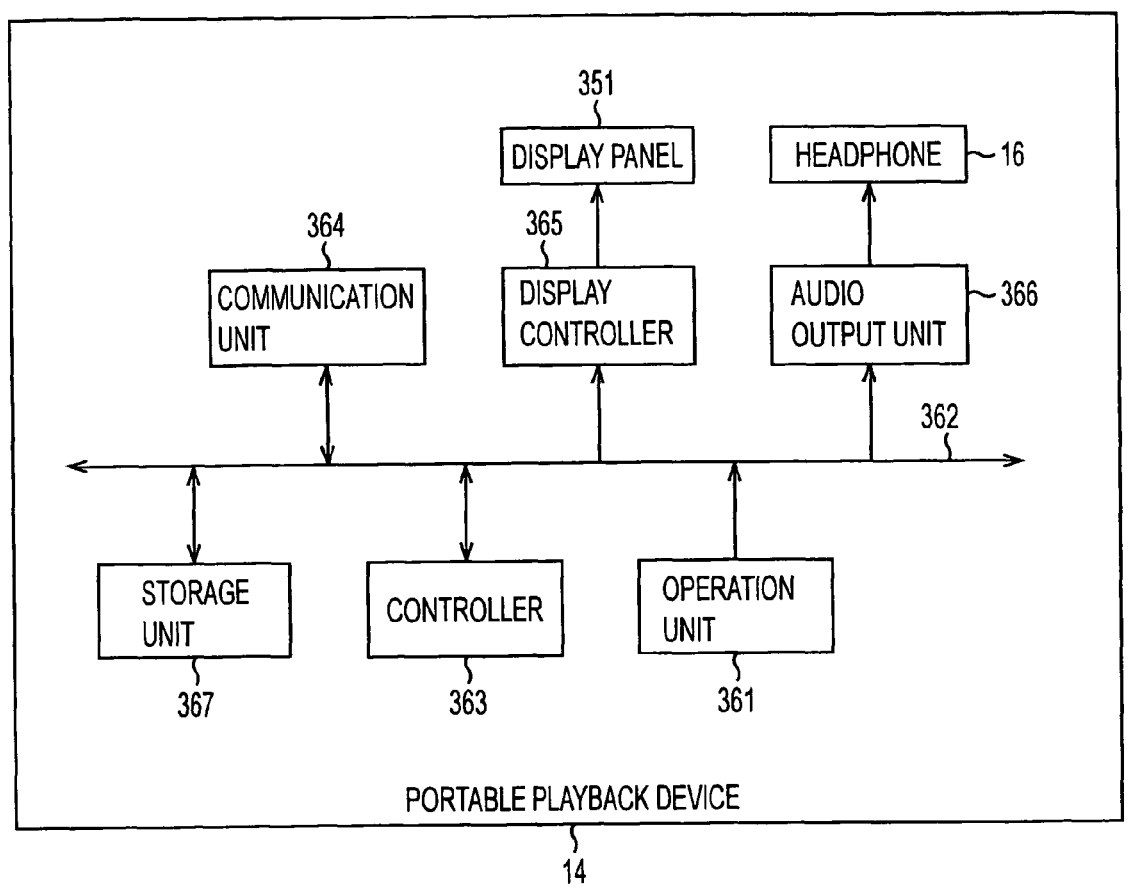
FIG. 20 is a block diagram illustrating the configuration of the portable playback device.

FIG. 20 is a block diagram illustrating the configuration of the portable playback device 14. An operation unit 361 corresponds to the cursor keys 352 and 353, the zoom-out key 354, the zoom-in key 355, the restart key 356, and the remote commander 357 shown in FIG. 19, and outputs a signal indicating an input user's operation to a controller 363 via a bus 362.

The controller 363 is a so-called "microcomputer" formed of a CPU, a ROM, and a RAM, and controls the overall operation of the portable playback device 14. The controller 363 starts the client program, which is discussed below, and in accordance with a signal indicating an input user's operation on the operation unit 361, the controller 363 sends a music-data request signal to the personal computer 1 via a communication unit 364, or reads image data corresponding to the GUI screen, which is discussed below, from a storage unit 367, and outputs the image data to a display controller 365 via the bus 362 and displays it on the display panel 351. The controller 363 also outputs music data received by the communication unit 364 to an audio output unit 366 via the bus 362, controls the audio output unit 366 to play back the music data in accordance with the data format, and outputs the sound from the headphone 16.

The communication unit 364 performs wireless communication with the personal computer 1 according to a predetermined communication method, for example, IEEE802.11a, infrared communication, or Bluetooth. The communication unit 364 sends a music-data request signal input from the controller 363 via the bus 362 to the personal computer 1, and receives music data from the personal computer 1 and outputs it to the controller 363 via the bus 362.

The display controller 365 outputs image data to the display panel 351 and controls the image data to be displayed under the control of the controller 363. Under the control of the controller 363, the audio output unit 366 plays back input audio data based on the format, outputs the audio data to the headphone 16, and controls the sound to be output.

GUI data displayed on the display panel 351 is stored in the storage unit 367, and various types of information required for the control operation by the controller 363 are also stored in the storage unit 367.

Figure 21:
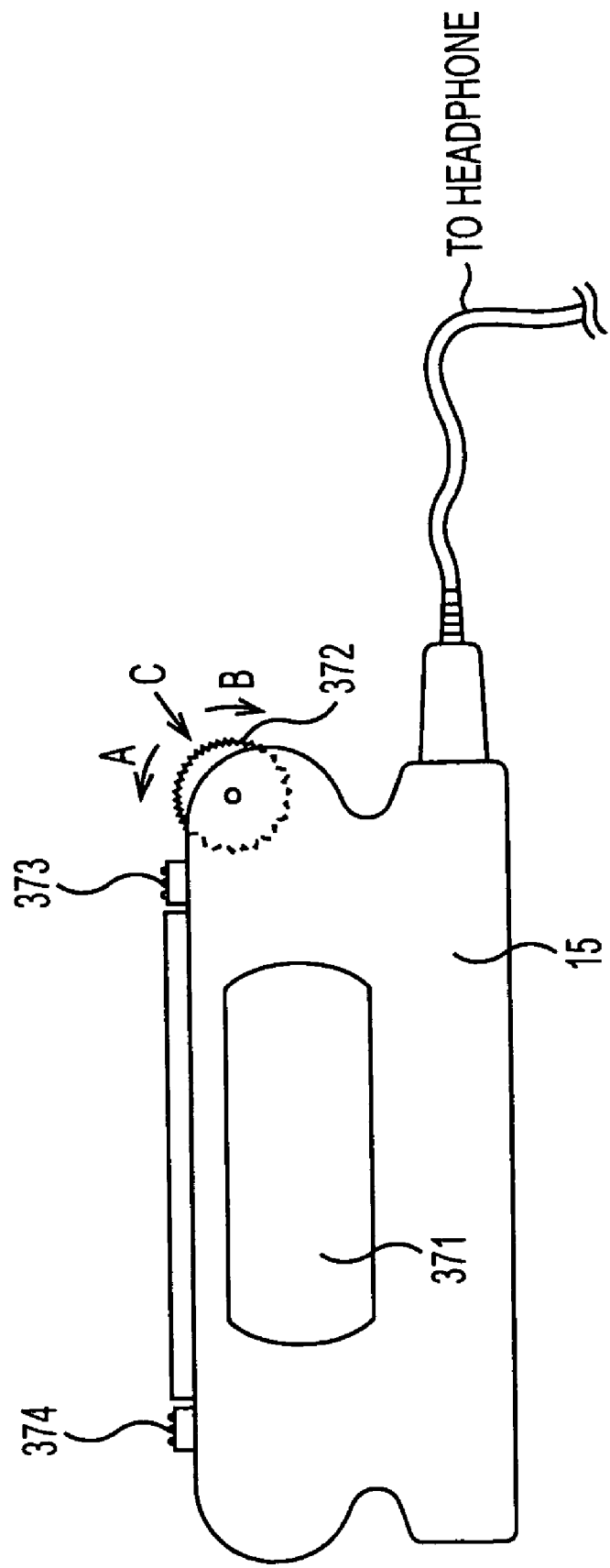
FIG. 21 is an external view of a simplified playback device shown in FIG. 3.

FIG. 21 is an external view of the simplified playback device 15. A jog dial 372 is a rotating/pressing operation device, and is rotatable in the direction indicated by the arrows A and B. When the jog dial 372 is rotated by the user, the selection of an icon or a thumbnail displayed in a display window 371 is changed according to the rotation angle. The command associated with the selected item is then output to the personal computer 1.

A zoom button 373 can be moved in two directions, and is operated by the user for designating a zoom-out or zoom-in operation. A restart button 374 is operated by the user when the user wishes to play back music which is currently played back in the simplified playback device 15 from the beginning. By pressing the jog dial 372 in the direction indicated by the arrow C, a function similar to that when the restart button 374 is pressed may be implemented.

The display window 371 is formed of an LCD (Liquid Crystal Display) or a plurality of LEDs (Light Emitting Diodes). The headphone 16 is connected via a jack, and is attachable and detachable to and from the simplified playback device 15 by inserting and removing the jack into and from the simplified playback device 15.

Figure 22:
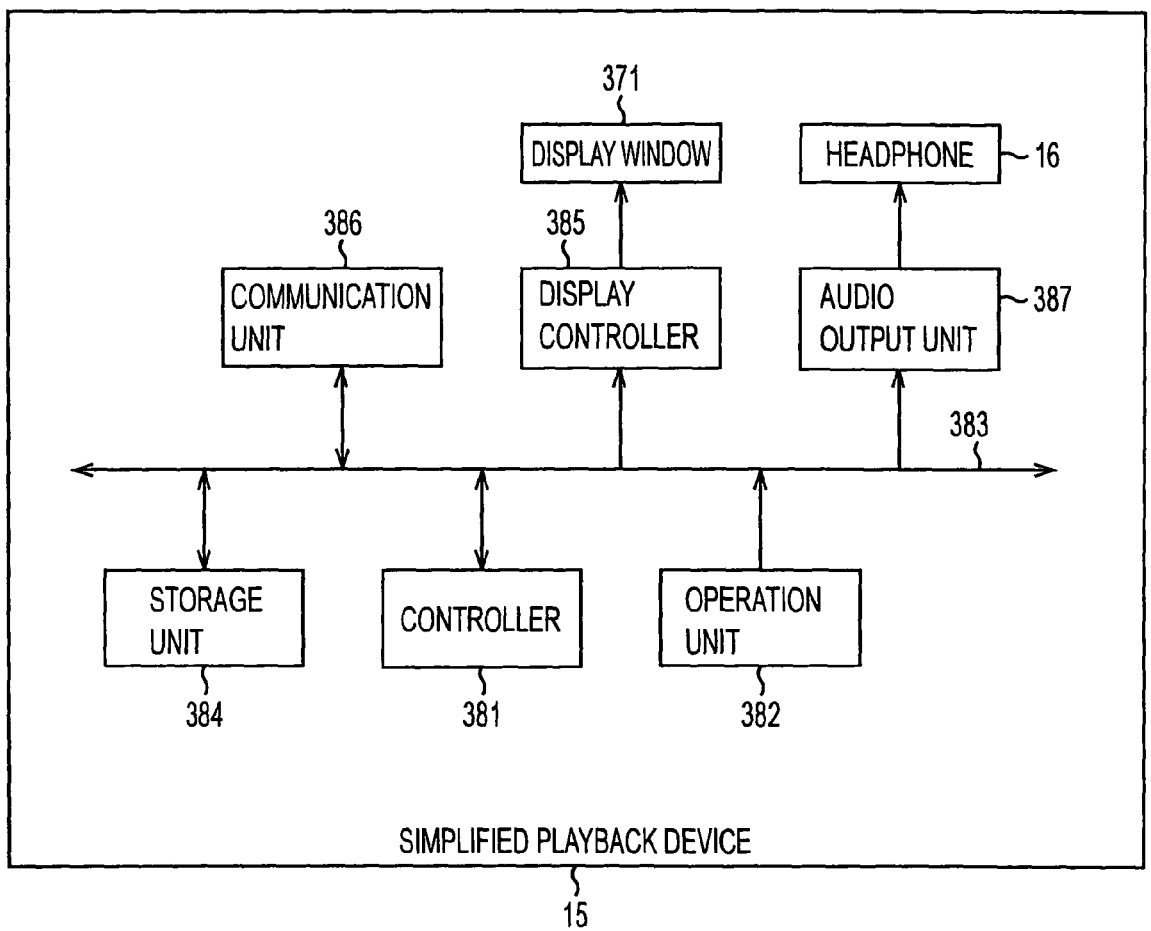
FIG. 22 is a block diagram illustrating the configuration of the simplified playback device.

FIG. 22 is a block diagram illustrating the configuration of the simplified playback device 15. A controller 381 is a so-called "microcomputer" formed of a CPU, a ROM, and a RAM, and controls the overall operation of the simplified playback device 15. An operation unit 382 is equivalent to the jog dial 372, the zoom button 373, and the restart button 374. The controller 381 starts the client program, which is discussed below, and in accordance with a signal input from the operation unit 382 via a bus 383, the controller 381 outputs an image or text stored in a storage unit 384 to a display controller 385 and displays it in the display window 371, or sends a music-data request signal to the personal computer 1 via a communication unit 386. The controller 381 also outputs music data sent from the personal computer 1 to an audio output unit 387, controls the audio output unit 387 to play it back, and sends it to the headphone 16 and outputs it as the sound.

The communication unit 386 performs wireless communication with the personal computer 1 according to a predetermined communication method, for example, IEEE802.11a, infrared communication, or Bluetooth. The communication unit 386 sends a music-data request signal input from the controller 381 via the bus 382 to the personal computer 1, and receives music data from the personal computer 1 and outputs it to the controller 381 via the bus 382.

The display controller 385 outputs GUI data containing image data or text data to the display window 371, and controls such data to be displayed under the control of the controller 381. The audio output unit 387 plays back input audio data based on the format, and controls the sound to be output to the headphone 16 under the control of the controller 381.

GUI data to be displayed in the display window 371 is stored in the storage unit 384, and various types of information required for the control operation by the controller 381 are also stored in the storage unit 384.

Figure 23:
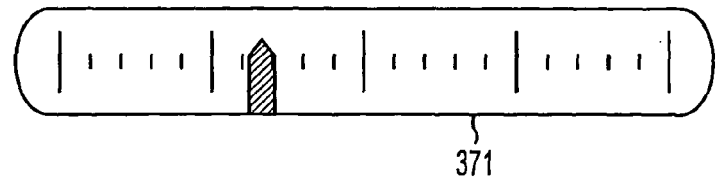
FIG. 23 illustrates an example of a different mode of a display window provided for the simplified playback device.

A description has been given, assuming that the display window 371 is formed of an LCD or a plurality of LEDs. However, the display window 371 may be formed of be a scale and a needle, as shown in FIG. 23. In this case, although characters and images cannot be displayed in the display window 371, the needle moves on the scale according to the rotation of the jog dial 372.

In the simplified playback device 15, the provision of the zoom button 373 may be omitted. In this case, the selection of a piece of music (or the selection of a station, which is described below) is determined only by the position of the needle, which is sufficient for the user who wishes to randomly listen to various pieces of music.

The user is able to randomly listen to music by changing the position of the needle, and if there is a piece of music that pleases the user, the user can operate the restart button 374 to listen to that piece of music from the beginning.

Figure 24:
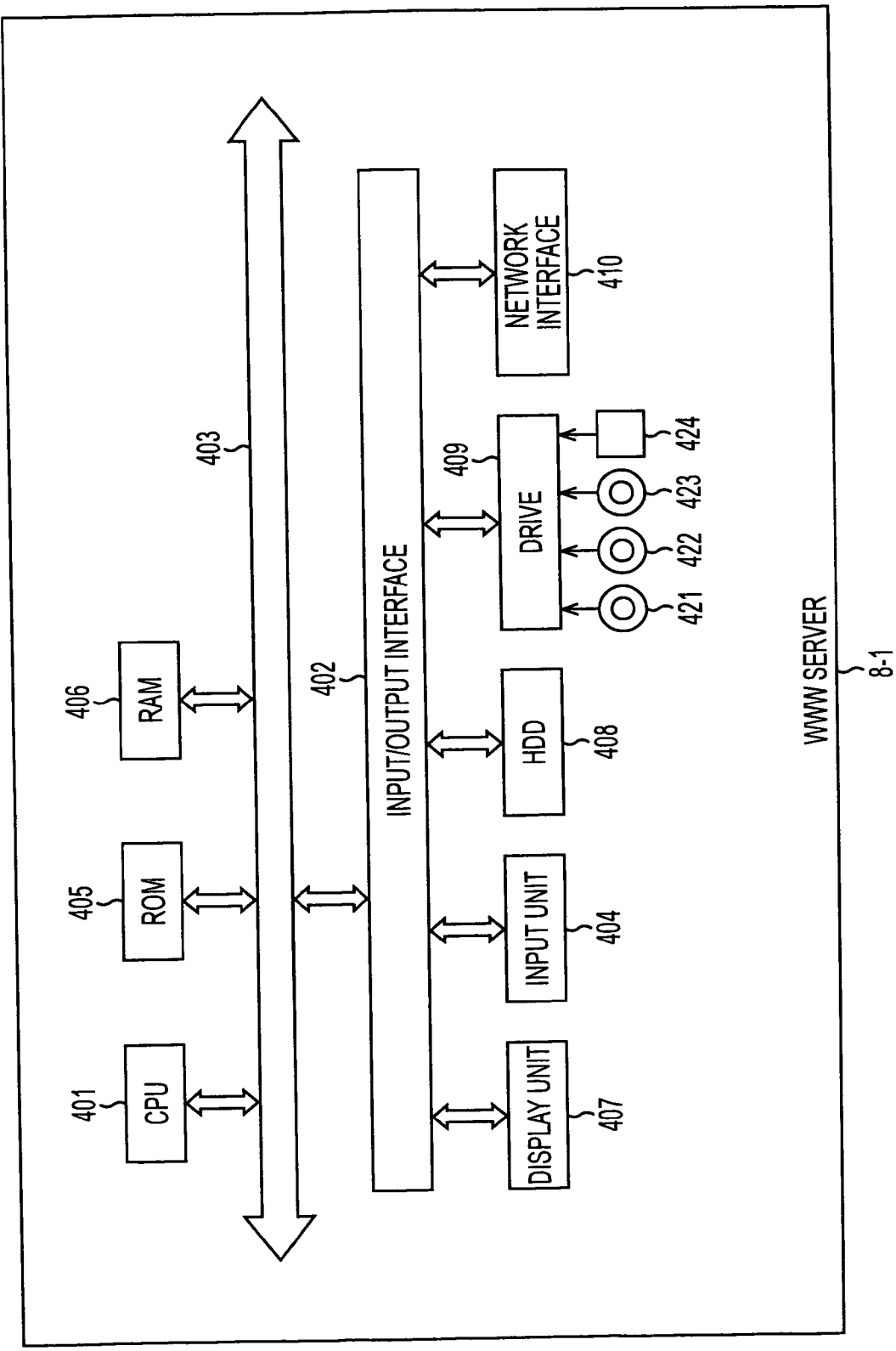
FIG. 24 is a block diagram illustrating the configuration of a WWW server of a music-data distribution service provider.

FIG. 24 is a block diagram illustrating the configuration of the WWW server 8-1 owned by the music-data distribution service provider.

A CPU (Central Processing Unit) 401 receives, via an input/output interface 402 and an internal bus 403, signals indicating various instructions input by the administrator of the WWW server 8-1 through an input unit 404 or control signals from the personal computer 1 via a network interface 410, and performs various types of processing based on the input signals. A ROM (Read Only Memory) 405 basically stores fixed data of programs or computation parameters used by the CPU 401. A RAM (Random Access Memory) 406 stores programs executed by the CPU 401 or variable parameters used while the CPU 401 is executing such programs. The CPU 401, the ROM 405, and the RAM 406 are connected to each other via the internal bus 403.

The internal bus 403 is also connected to the input/output interface 402. The input unit 404 is formed of, for example, a keyboard, a touch pad, a jog dial, or a mouse, and is used for inputting various instructions by the administrator of the WWW server 8-1. A display unit 407 is formed of, for example, a CRT (Cathode Ray Tube) or liquid crystal display device, and displays various items of information in text or image format.

An HDD (hard disk drive) 408 drives a hard disk to record or play back programs or information (for example, content data) executed by the CPU 401 on or from the hard disk. A drive 409 loads a magnetic disk 421, an optical disc 422, a magneto-optical disk 423, or a semiconductor memory 424 when necessary, and sends and receives data thereto and therefrom.

The network interface 410 is connected to the Internet 5, and sends and receives information to and from the personal computer 1 via the Internet 5. The network interface 410 may be connected to, for example, an external storage device storing content data therein.

The input unit 404, the ROM 405, the RAM 406, the display unit 407, the HDD 408, the drive 409, and the network interface 410 are connected to the CPU 401 via the input/output interface 402 and the internal bus 403.

Figure 25:
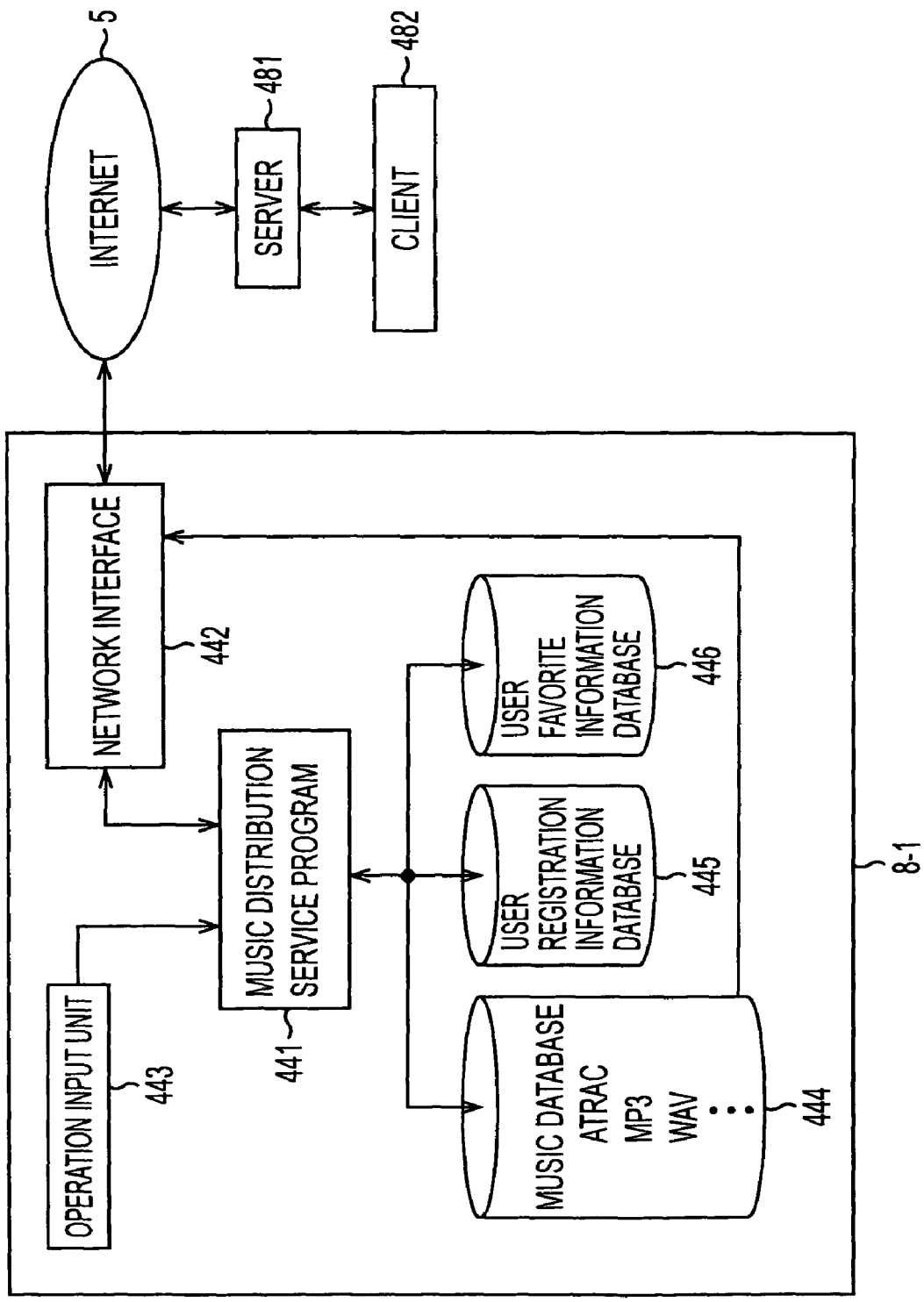
FIG. 25 is a functional block diagram illustrating the functions of the WWW server of the music-data distribution service provider.

FIG. 25 is a functional block diagram illustrating the WWW server 8-1 owned by the music-data distribution service provider in the network system for receiving content-data distribution services described with reference to FIG. 2.

A music distribution service program 441 sends music data (push distribution data or purchased content data) to a server 481, which is described below with reference to FIG. 26, registers information in a music database 444, a user registration information database 445, and a user favorite information database 446, or controls billing processing with the registered user owning the server 481.

The music distribution service program 441 records music data in the music database 444 in, for example, ATRAC (Advanced TRansform Acoustic Coding), MP3 (MPEG Audio Layer-3) format, or WAV format according to a signal indicating an operation input into an operation input unit 443 by the administrator of the WWW server 8-1. The music distribution service program 441 also updates the user registration information database 445 or the user favorite information database 446 based on information input via a network interface 442.

The music distribution service program 441 also connects to the Internet 5 via the network interface 442 so as to receive from the server 481 various items of information for allowing the user to make registration to receive music data from the music-data service provider or various items of information for allowing the user to purchase music data, or searches the music database 444 for sampled push distribution data or purchased music data so as to send it to the server 481 via the network interface 442 and the Internet 5.

The music database 444 registers therein music data in, for example, ATRAC, MP3, or WAV format. The music data includes complete form of music data for sale, part of music data for push distribution, and music data that can be listened to only for a predetermined times. The music distribution service program 441 searches the music database 444 for required music data, and distributes it to the server 481.

The user registration information database 445 records therein user registration information for receiving music-data distribution services. In the user registration information database 445, for example, a user ID assigned to each user for identifying the user, information required for billing processing (for example, a payment method or a credit card number), a distribution address for music data (for example, e-mail address), etc. are registered. The music distribution service program 441 distributes music data to the server 481 or performs billing processing based on the user registration information registered in the user registration information database 445.

The user favorite information database 446 records therein user favorite information received when the user registers himself/herself, music data purchased by the user, information concerning the review of push-distributed music data, which is received from the user by processing described below. The music distribution service program 441 selects music data to be push-distributed based on the user favorite information registered in the user favorite information database 446.

Figure 26:
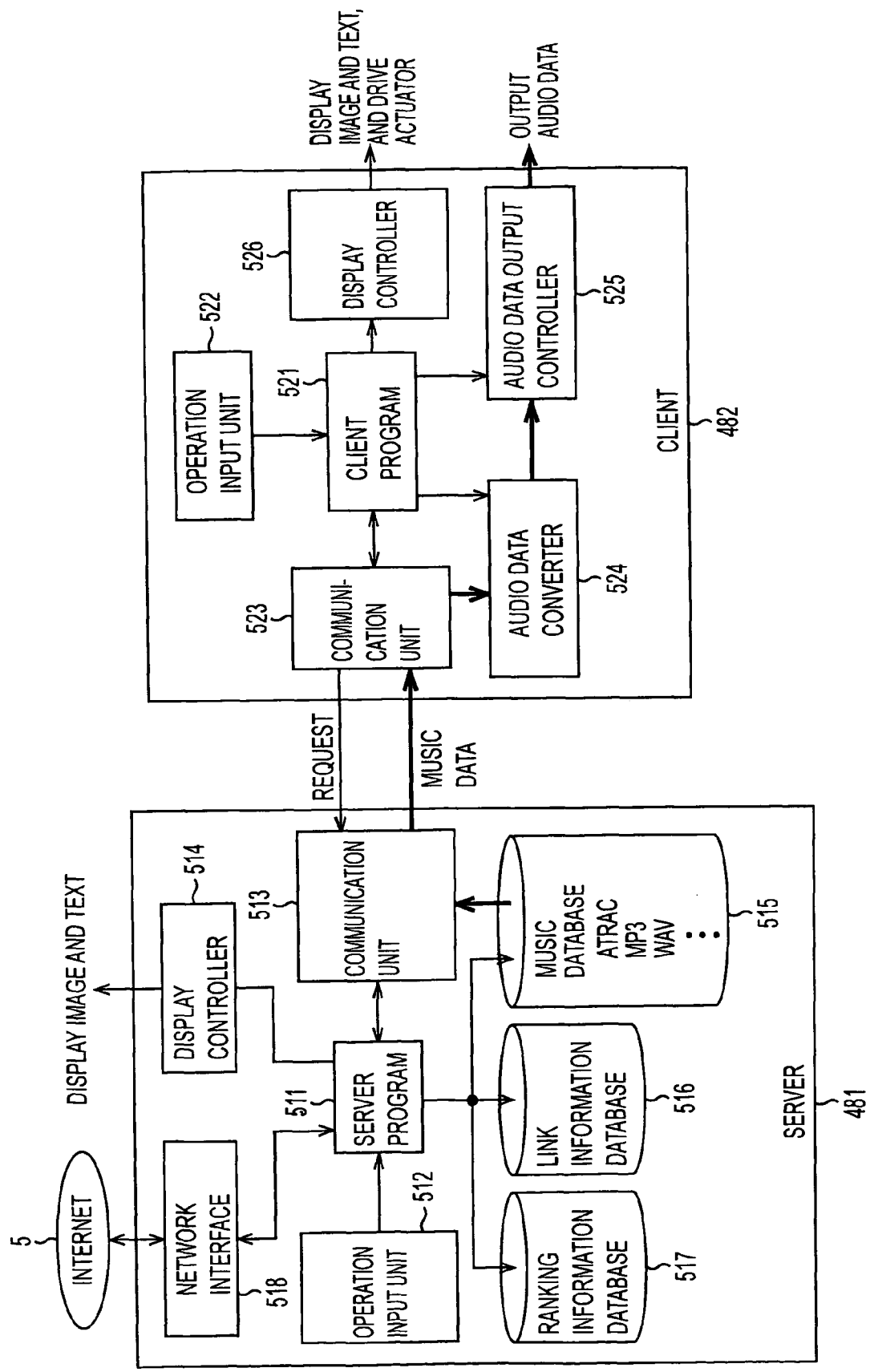
FIG. 26 is a functional block diagram illustrating the functions of a client and a server.

FIG. 26 is a functional block diagram illustrating the relationship between a server and a client and the functions of the server and the client in a client-server system of the home network described with reference to FIG. 3. In this system, the server 481 is equivalent to the personal computer 1 shown in FIG. 3, and a client 482 is equivalent to one of the PDA 11, the cellular telephone 12, the desk-top playback device 13, the portable playback device 14, and the simplified playback device 15 shown in FIG. 3.

A server program 511 of the server 481 controls the sending of music data to the client 482 and the registration of information into a music database 515, a link information database 516, and a ranking information database 517. The server program 511 controls a display controller 514 to display a display screen for assisting the user to register music data on the LCD 25, and in accordance with a signal indicating a user's operation input from an operation input unit 512, the server program 511 records music data in the music database 515 according to a format, for example, ATRAC (Advanced TRansform Acoustic Coding), MP3 (MPEG Audio Layer-3), or WAV, and updates the link information database 516, and also updates the ranking information database 517 based on a request signal input from the client 482 via a communication unit 513.

The server program 511 also receives a request signal from the client 482 via the communication unit 513, and searches the music database 515 for music data requested by the client 482 by referring to the link information database 516 and the ranking information database 517, and sends the music data to the client 482 via the communication unit 513.

The server program 511 also connects to the Internet 5 via a network interface 518 to send various items of information for making registration to receive the distribution of music data from the music-data distribution service provider or various items of information for purchasing music data to the WWW server 8-1 owned by the music-data distribution service provider. The server program 511 also receives sampled push distribution data or purchased music data from the WWW server 8-1.

A description is now given of the music database 515, the link information database 516, and the ranking information database 517 before sampled push distribution data is received from the WWW server 8-1 owned by the music-data distribution service provider.

FIG. 27 is a music data list recorded in the music database 515 together with the music data. In the music data list, the music piece ID uniquely assigned to each piece of music, the address information indicating the head position at which the corresponding music data is recorded, and the playback start position information of the music data are registered.

When music data is requested, the playback start position information is first checked, and then, music data corresponding to a so-called "melodious portion" or a climax portion rather than the first portion of the music piece is sent to the client 482 so as to allow the user to easily understand which piece of music is being played back or to understand the image of the piece of music. Then, if the user likes the tune and sends an instruction to play back the music from the beginning, a request signal is generated and sent so that the music can be played back from the beginning. Then, the server program 511 sends the whole music data to the client 482 based on the address information indicating the head position at which the music data is recorded.

Alternatively, in addition to the audio data corresponding to the whole music, a so-called "melodious portion" or a climax portion that allows the user to easily understand which piece of music is being played back or to understand the image of the piece of music, i.e., partial audio data, may be prepared in the music database 515. In this case, address information indicating the recording position of the partial audio data rather than the playback start position information is registered in the music data list.

Multiple registration of the same piece of music in the music data list or in the music database 515 is prevented.

FIG. 28 is a link information list recorded in the link information database 516. In the link information list, IDs associated with music data are registered by being classified into a virtual hierarchical structure based on the user registration. That is, although the music data itself is not recorded in a hierarchical structure, a virtual hierarchical structure is constructed in the link information list. The number of hierarchical levels varies, as shown in FIG. 28. In this example, the primary level, which is the roughest classification ("user A's favorites", "user B's favorites", "user C's favorites", "morning songs", and "evening songs" in FIG. 28) is referred to as a "station", and the intermediate classification and the detailed classification divided from the station leading to the music data ("for driving", "classic", "composer A", and "happy songs" in FIG. 28) are referred to as hierarchical categories. In the link information list, the same piece of music ID may be registered in different places.

FIG. 29 is a ranking list recorded in the ranking information database 517. The ranking is determined for each station, and is indicated together with the hierarchical categories if necessary. The ranking is occasionally updated under the control of the server program 511 according to the requests sent from the client 482.

When recording music data in the music database 515, the user is able to register the music data in a desired station or a desired hierarchical category according to the GUI displayed on the LCD 25 by the display controller 514. The user is also able to form a new station or a hierarchical category, or register the same piece of music in a plurality of stations or a plurality of hierarchical categories, or register a piece of music that is already registered in a station or a hierarchical category in a different station or a different hierarchical category. The server program 511 of the server 481 updates the music database 515, the link information database 516, and the ranking database 517 based on a user's operation input from the operation input unit 512.

For example, by preparing a station for each member of a family in the link information database 516 of the server 481 and by registering favorite music data of each member in the station, the members can individually enjoy music in a room away from the server 481 (that is, the personal computer 1).

The initial ranking for newly registered music data can be set in any manner according to the system. For example, the ranking may be established when new music data is registered, or it may be started from the topmost level of the corresponding station so as to allow the user to frequently listen to the music. Alternatively, new music data may be started from the bottommost level.

The server program 511 can generate a new station or register music data in a generated station, not only from user registration, but also based on the status of requests made from the client 482. For example, a station collected from music pieces that are requested to play back from the beginning during 7:00 to 9:00 in the morning can be set as "morning songs", or a station collected from music pieces that are requested to play back from the beginning from 9:00 to 11:00 in the evening may be set as "night songs". In this case, only the music pieces that are requested a predetermined number of times rather than only one time under predetermined conditions may be registered in a corresponding station.

The predetermined conditions are not restricted to the time span, such as "morning" or "evening", and may be the day of the week, the month, or the season. Further, for example, an "everyone's favorites" station may be set, and music pieces that are simply requested to be played back from the beginning a predetermined number of times during a predetermined period may be registered in the "everyone's favorites" station.

As described above, the databases are updated based on the status of requests made from a plurality of clients, and thus, databases reflecting all the users' favorites (for example, all the members of a family) utilizing the client-server system rather than a single user's favorites can be constructed.

Referring back to FIG. 26, the configuration of the client 482 is described below.

A client program 521 of the client 482 controls a music-data request signal to be sent to the server 481 and controls music data to be received and played back from the server 481, and controls a GUI to be displayed by a display controller 526.

When the client 482 is provided with a display portion for displaying images or text (for example, the display panel 281 of the desk-top playback device 13), the client program 521 controls the display controller 526 to read image data from a built-in storage unit (for example, the storage unit 310 of the desk-top playback device 13), to display the GUI for assisting the user to select music data, and to change the display of the GUI according to a signal indicating a user's operation input from an operation input unit 522.

When the client 482 is not provided with a display portion for displaying images or text, but with the simple display window 371 shown in FIG. 23, the client 482 moves the position of the needle of the display window 371 (drives the actuator for moving the needle) according to a signal indicating a user's operation input from the operation input unit 522.

For example, when the position of the needle indicates that a station is to be selected, the user moves the position of the needle to change the station, and a music-data request signal is sent so that the music data is played back from a predetermined position in order of descending precedence in the station. When the position of the needle indicates the music data, the user moves the position of the needle to change the piece of music, and a request signal is sent so that the selected piece of music is played back from a predetermined position.

The client program 521 also sends a music-data request signal to the server 481 via a communication unit 523 according to a signal indicating a user's operation input from the operation input unit 522. When the communication unit 523 receives music data of a format, for example, ATRAC, MP3, or WAV, from the server 481, the received music data is output to an audio data converter 524.

The audio data converter 524 converts the received music data into an analog audio signal according to a method suitable for the format of the music data, and outputs it to an audio data output controller 525. The audio data output controller 525 controls the sound to be output from, for example, the speaker 284 or the headphone 16.

The user of the client 482 refers to the GUI controlled by the display controller 526 (or the needle moving along the scale), or if the portable playback device 14 is used, the user operates the operation input unit 522 (for example, the remote commander 302 or 357) so that the user can listen to various pieces of music recorded in the music database 515 of the server 481.

The relationship between the server 481 and the client 482 described with reference to FIG. 26 can be identified as, for example, the relationship between a radio station and a radio.

That is, the user of the client 482 merely selects the station (tuning) by performing a very simple operation, such as a cursor operation using a remote commander so as to receive music data of a desired program (a station or a hierarchical category) and to play it back without the need to select the music data itself. If the user wishes to change the piece of music, the user only performs tuning so that a desired piece of music is immediately received and is played back.

A description is given, with reference to FIGS. 30 through 36, of a GUI whose display is controlled by the display controller 526 when, for example, the desk-top playback device 13 is used as the client 482.

Figure 30:
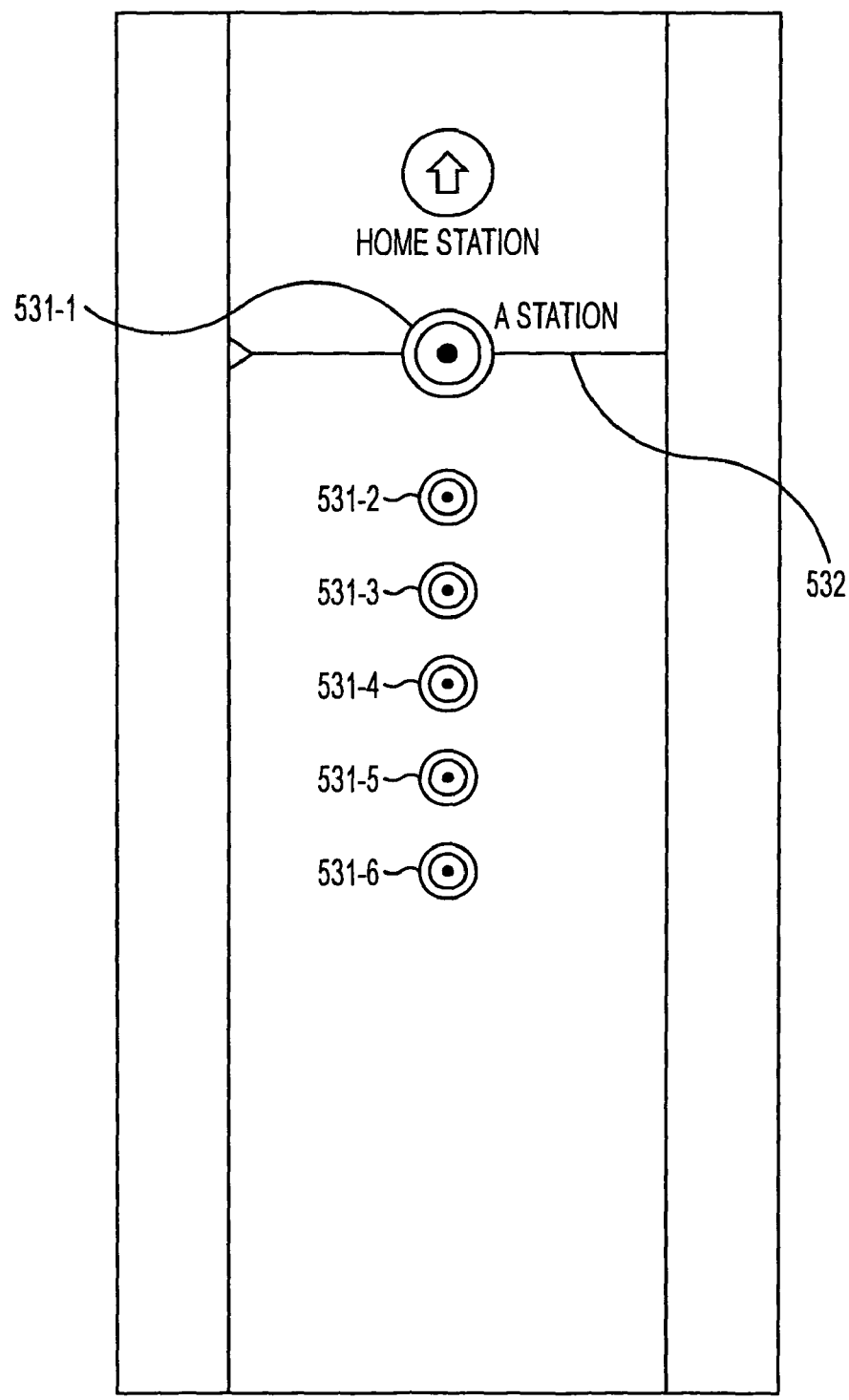
FIG. 30 illustrates a GUI to be displayed.

FIG. 30 illustrates the initial screen of the client 482 that makes a request for music data to the server 481 in which the music data and the information thereof described with reference to FIGS. 27 through 29 are registered in the music database 515, the link information database 516, and the ranking information database 517. Icons 531-1 through 531-6 displayed on the display screen shown in FIG. 30 correspond to the stations of the link information list described with reference to FIG. 28.

For example, while a music piece registered in the "user A's favorites" station is being played back, a cursor line 532 is adjusted to the icon 531-1 corresponding to the "user A's favorites" station, as shown in FIG. 30, and the icon 531-1 is displayed in an enlarged size, and the station name (in this example, "A station") associated with the icon is displayed. In this example, the icon associated with the music data that is currently played back is displayed in an enlarged size. Alternatively, it may be displayed in a different color, inverted, or highlighted (increasing the brightness) so as to distinguish from the other icons.

When power is supplied to the client 482, for example, to the desk-top playback device 13, a request for music data having the highest rank in a predetermined station is made according to the processing described below. In this case, as discussed above, the music data is not played back from the beginning, but a so-called "melodious portion" or a characteristic portion is played back. If the user likes the tune by listening to the "melodious portion" or the characteristic portion, the user presses, for example, the restart button 335 or the jog dial 341 of the remote commander 302 described with reference to FIGS. 18A and 18B so as to make a request to the server 481 for the music data which is now being played back to be played back from the beginning.

Then, the user is able to move the cursor line 532 to change the station (selecting the radio station if radio broadcasting is received) by pressing the cursor button 331 or 332 or rotating the jog dial 341 of the remote commander 302 described with reference to FIGS. 18A and 18B.

Figure 31:
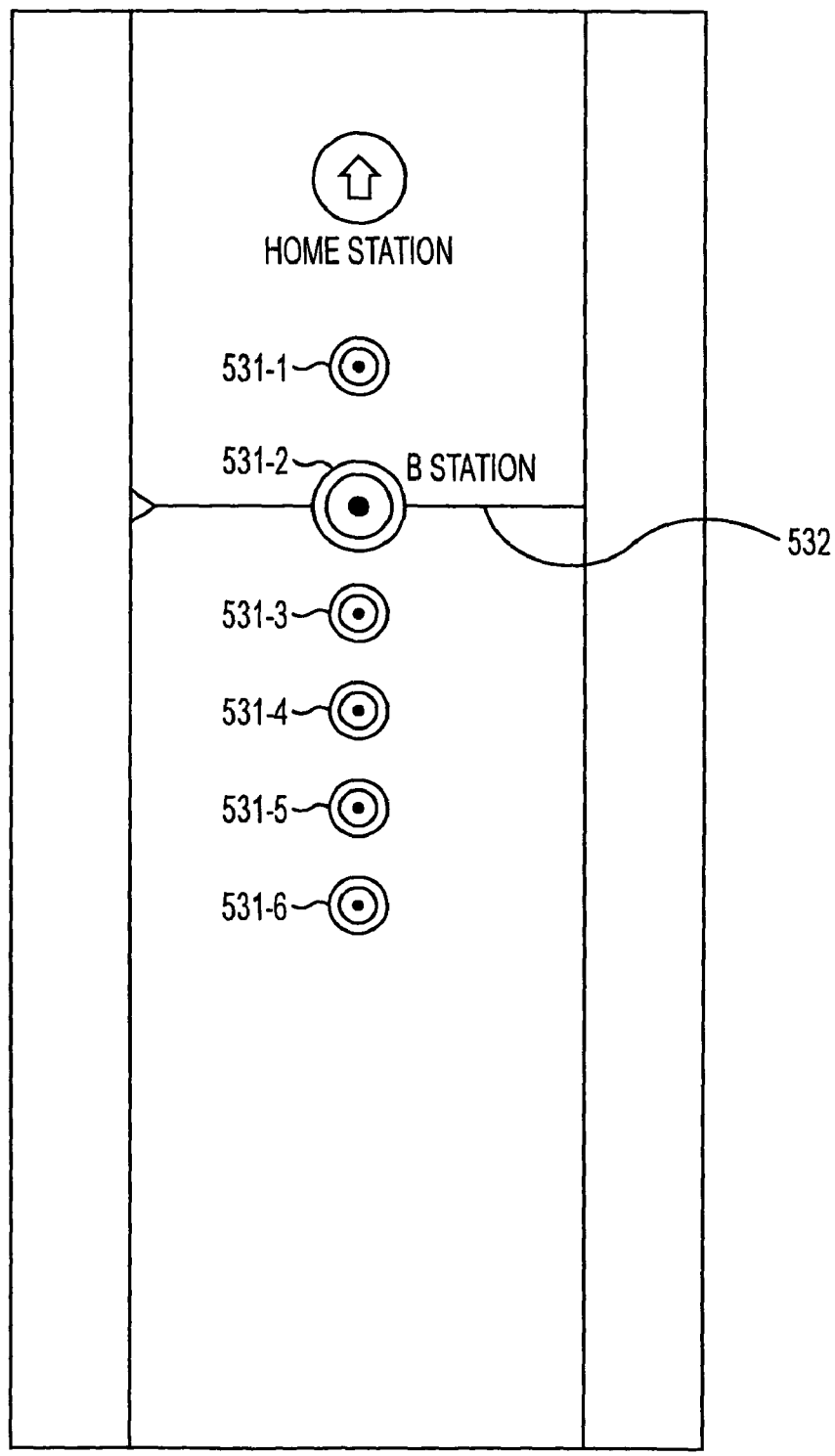
FIG. 31 illustrates a GUI to be displayed.

FIG. 31 illustrates the display screen when the cursor line 532 is moved to B station (corresponding to the "user B's favorites" of the link information list described with reference to FIG. 28) by pressing the cursor button 332 or the rotating the jog dial 341 of the remote commander 302 in the direction indicated by the arrow B in FIG. 18B by the user. In this case, the icon 531-2 corresponding to the selected B station is displayed in an enlarged size, and a so-called "melodious portion" or a characteristic portion of a music piece having the highest rank is played back.

In the music database 515 of the server 481, not only music data reflecting the favorites of a user of a certain client 482, but also music data reflecting the favorites of a user of another client 482, is recorded. If music data is recorded in folders, as in known art, the user has to search for music data in the bottommost layer by tracing the hierarchical structure to play it back. Accordingly, a very complicated operation is required for tracing a hierarchical structure constructed by another user to play back music data registered by this user. In this system, however, it is possible to listen to music pieces registered by another user only by performing a very simple operation, such as vertically moving the cursor line 532.

Figure 32:
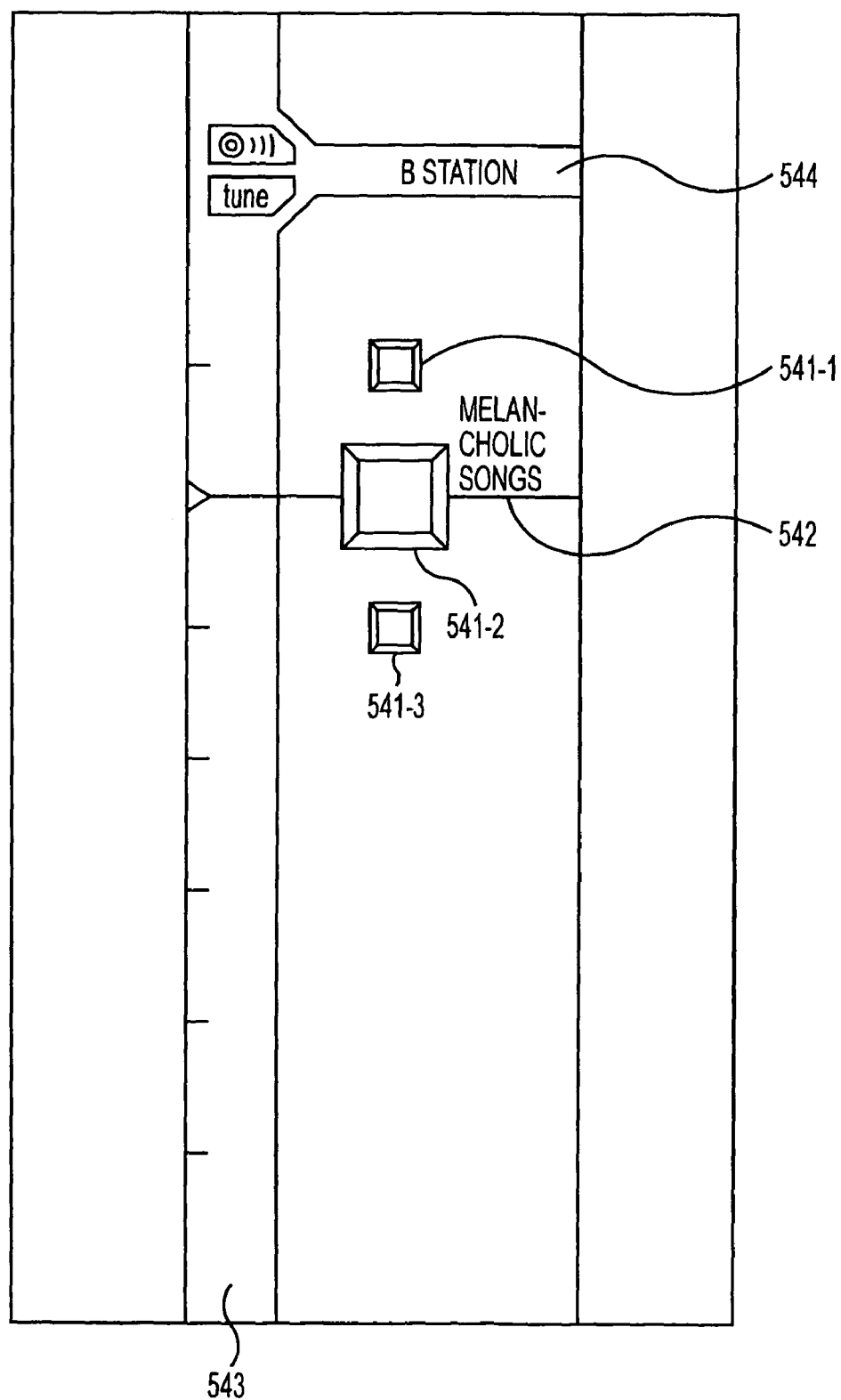
FIG. 32 illustrates a GUI to be displayed.

If the user presses the zoom-in button 334 of the remote commander 302 in the state shown in FIG. 31, icons 541-1 through 541-3 corresponding to hierarchical categories positioned at a lower level of the station "user B's favorites" are displayed, as shown in FIG. 32. If the music piece which is currently played back belongs to a hierarchical category "melancholic songs", a cursor line 542 is adjusted to the icon 541-2 corresponding to the hierarchical category "melancholic songs" when the GUI is changed, and the icon 541-2 is displayed in an enlarged size. An indicator area 543 is also provided to allow the user to intuitively understand the level of the category in the hierarchical structure. In the indicator 543, a scale having predetermined increments is indicated, and the station name containing the displayed hierarchical area is indicated in a text display area 544.

Figure 33:
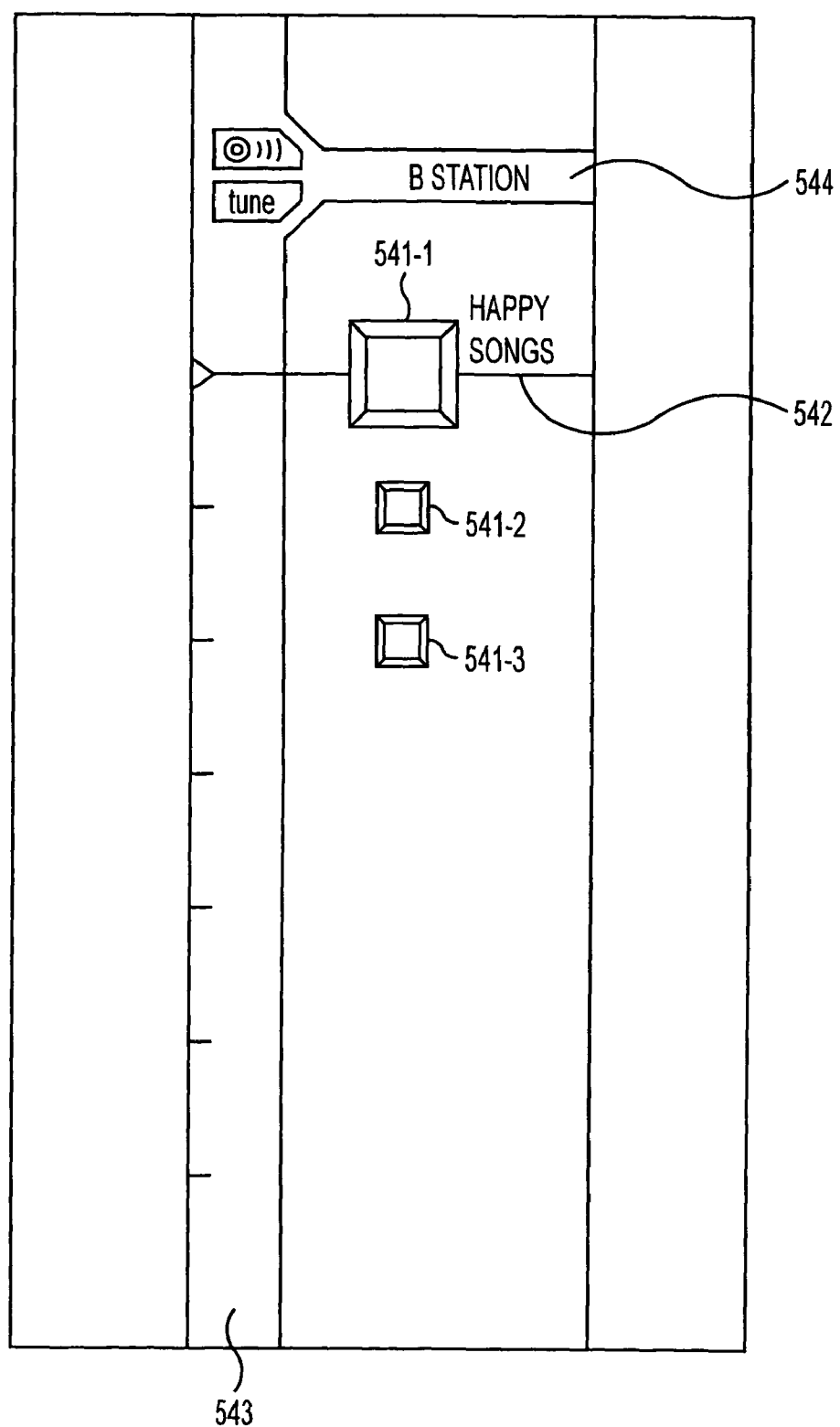
FIG. 33 illustrates a GUI to be displayed.

Also in this case, the user can move the cursor line 542 to change the hierarchical category by pressing the cursor button 331 or 332 or rotating the jog dial 341 of the remote commander 302 described with reference to FIGS. 18A and 18B. When the hierarchical category is changed, the icon 541-1 corresponding to the newly selected hierarchical category "happy songs" is displayed in an enlarged size, as shown in FIG. 33.

The user is able to display the data of the selected hierarchical category "happy songs" by zooming in on the icon. In this case, the data of the hierarchical category "happy songs" is the bottommost layer, which corresponds to the level of the music data.

Figure 34:
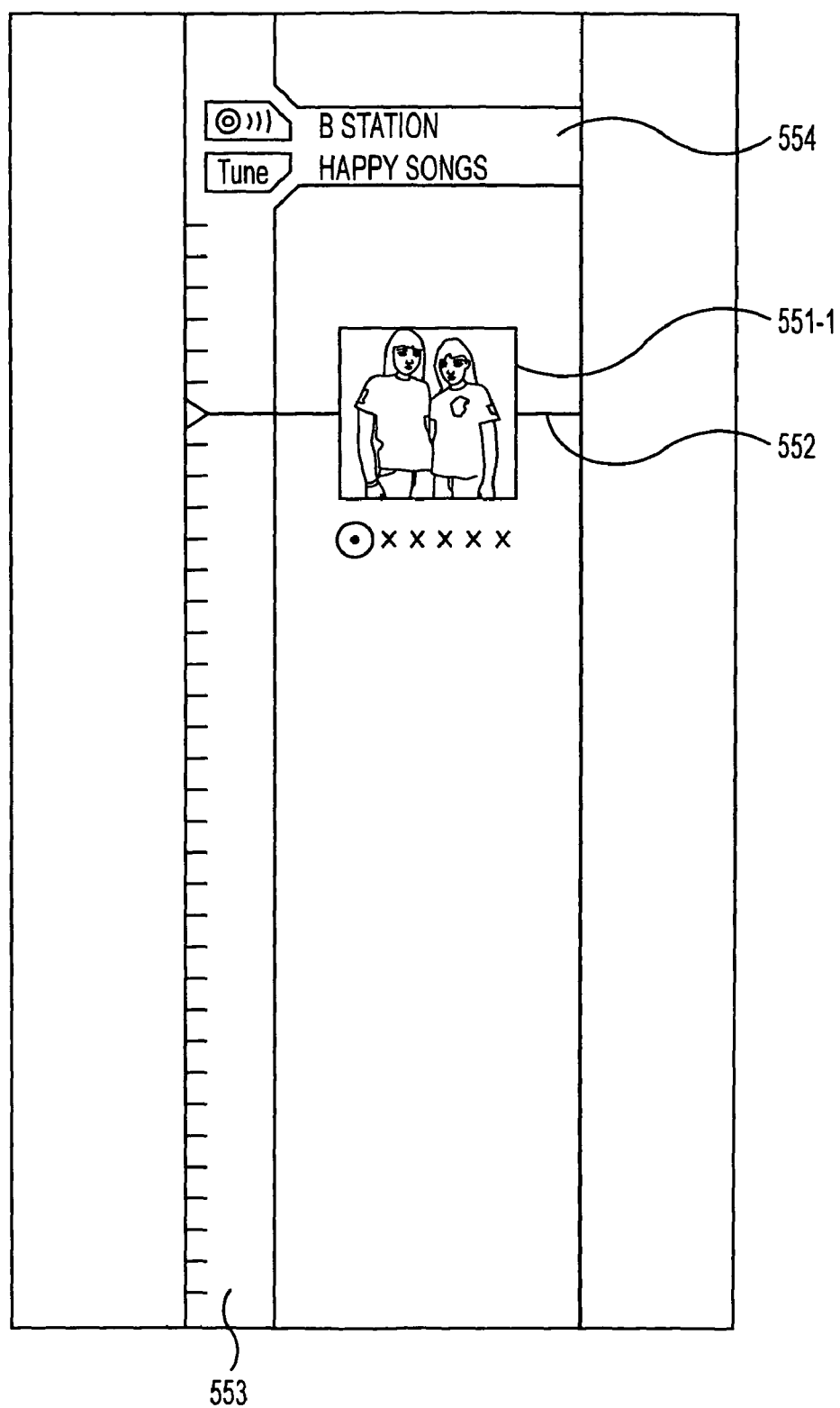
FIG. 34 illustrates a GUI to be displayed.

In this case, as shown in FIG. 34, a thumbnail 551 (for example, a CD jacket or an artist photograph) associated with the music piece which is currently played back may be displayed. As in the display screen in which the hierarchical categories are displayed, as shown in FIG. 32 or 33, an indicator area 553 and a text display area 554 are provided. The increment of the scale displayed in the indicator area 553 is narrower than that of the indicator area 543 shown in FIGS. 32 and 33. That is, the user is able to intuitively understand the level of the music data which is currently played back by the increments of the scale displayed in the indicator area even if there are many hierarchical levels.

Figure 35:
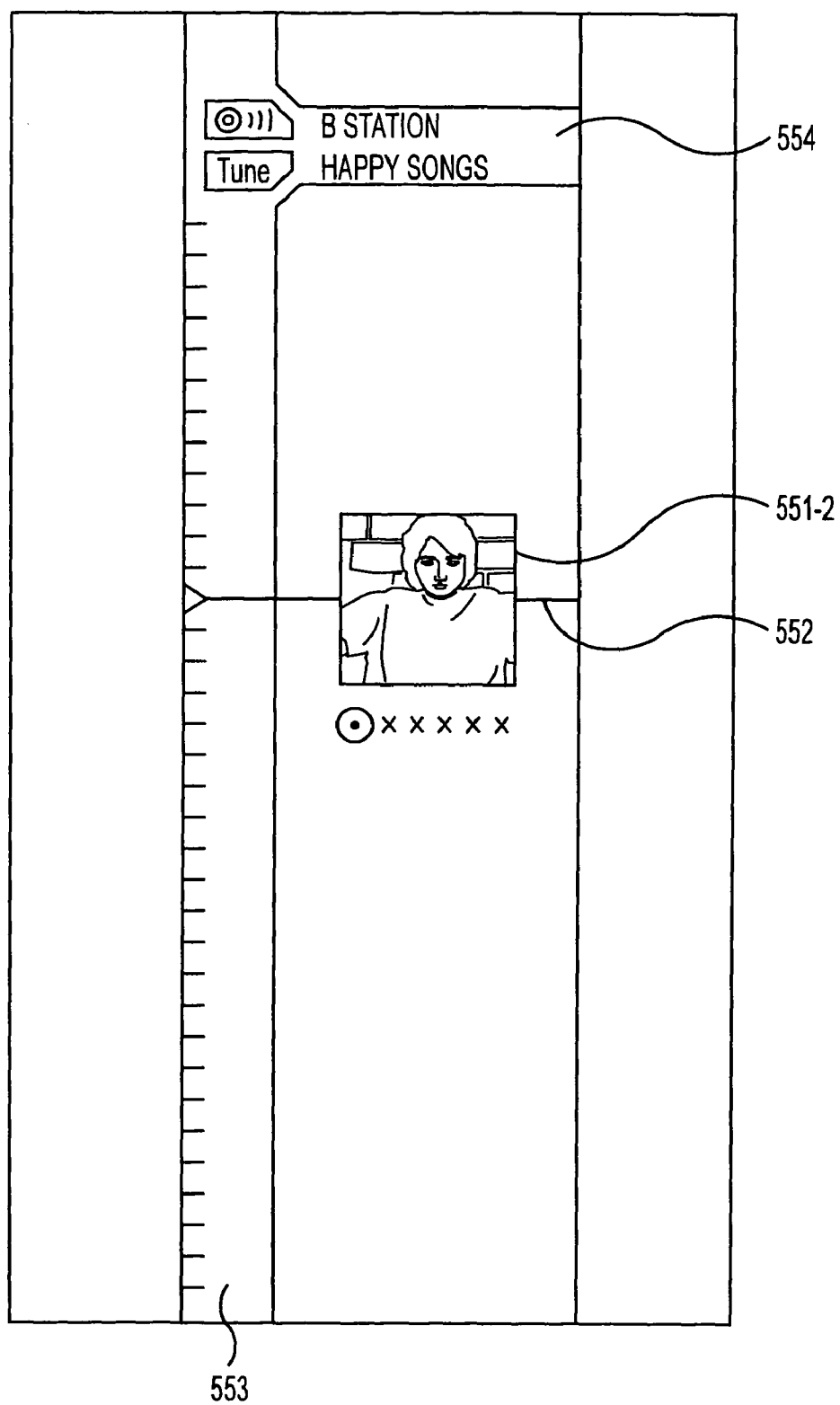
FIG. 35 illustrates a GUI to be displayed.

Also in this case, the user is able to move a cursor line 552 to make a request for a different piece of music data to the server 481 by pressing the cursor button 331 or 332 or rotating the jog dial 341 of the remote commander 302 described with reference to FIGS. 18A and 18B. When the cursor line 552 is moved, a request is made for music data corresponding to the position of the cursor line 552 to the server 481, and the music data is received and played back (not from the beginning, but from a so-called "melodious portion"). Simultaneously, a thumbnail 551-2 associated with the music data that is currently played back is displayed, as shown in FIG. 35.

Figure 36:
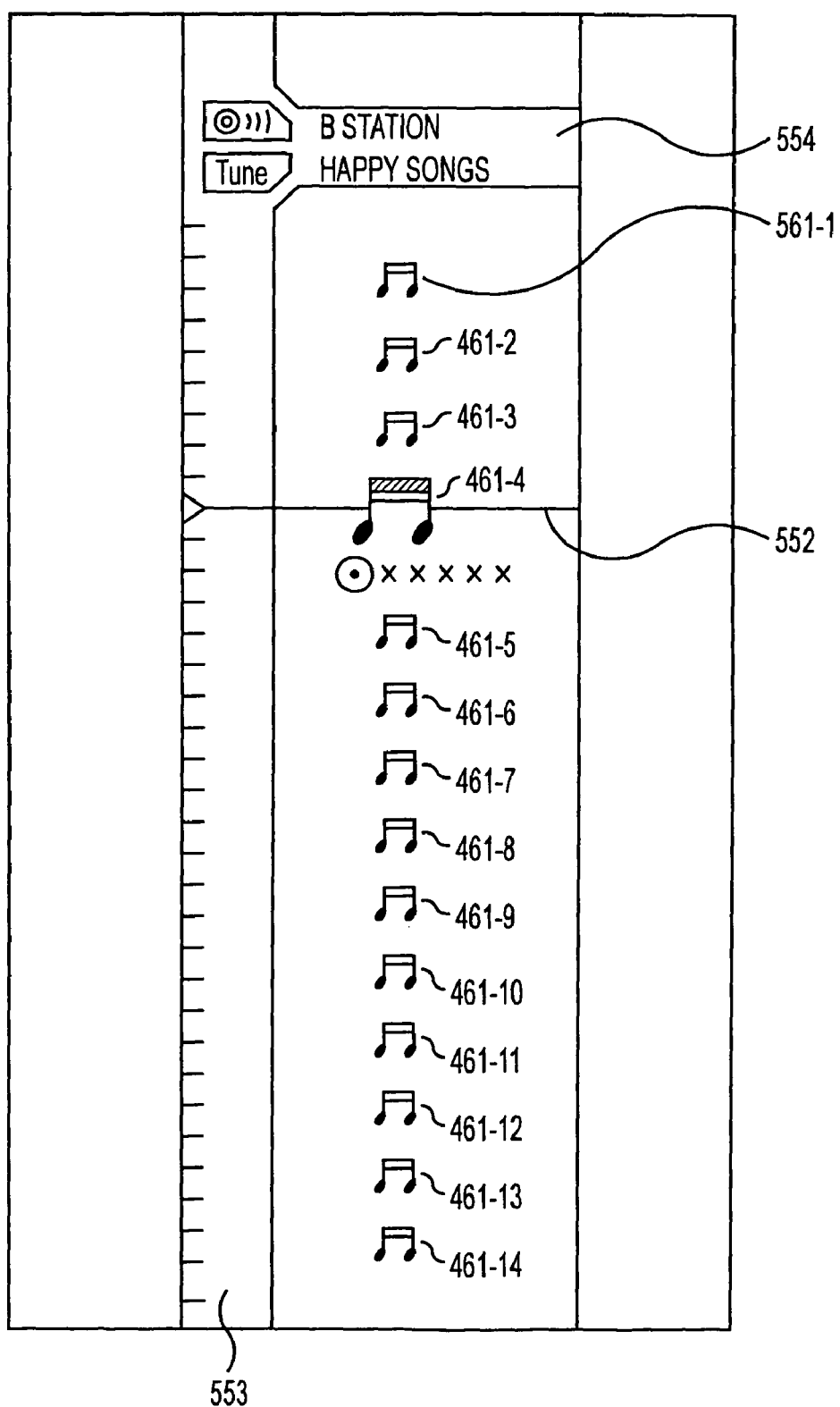
FIG. 36 illustrates a GUI to be displayed.

In this example, a thumbnail corresponding to music data is displayed in the bottommost layer. Alternatively, as in stations or hierarchical categories, in the level of music data, a plurality of icons 561-1 through 561-14 may be displayed in an enlarged size, as shown in FIG. 36, and the cursor line 552 may be moved to display the icon (icon 561-4 in FIG. 36) corresponding to the position of the cursor line 552.

In each GUI screen, if a mark, such as an icon or a thumbnail, cannot be wholly displayed in the screen, it may be adapted that the mark can be scrolled on the screen.

In FIGS. 31 through 36, a description has been given of GUIs when the desk-top playback device 13 is used as the client 482. When the PDA 11, the cellular telephone 12, the portable playback device 14, or the simplified playback device 15 is used as the client 482, GUIs similar to those described above may be displayed, or if the display area is small, GUIs including simplified marks (icons or thumbnails) may be displayed.

Processing performed by the server 481 and the WWW server 8-1 of the music-data distribution service provider is described below with reference to the flowchart of FIG. 37.

In step S1, the server program 511 of the server 481 receives user registration information, for example, the destination address of music data, favorite information such as a favorite music category, or the payment method for billing (credit card or e-money), from the operation input unit 512.

In step S2, the server program 511 of the server 481 sends the user registration information input in step S1 to the WWW server 8-1 of the music-data distribution service provider via the network interface 518 and the Internet 5.

In step S3, among the user registration information received by the Internet 5 and the network interface 442, the music distribution service program 441 of the WWW server 8-1 registers the destination address of the music data and the billing payment method in the user registration information database 445, and registers the favorite information, for example, a favorite music category, in the user favorite information database 446.

The WWW server 8-1 also issues a user ID to the user owning the server 481 that has sent the user registration information. The payment method used for billing processing may be a credit card, e-money authenticated by an IC card, or a prepaid card. In the user registration information database 445, one user may register a plurality of payment methods, and the payment method may be set when music data is purchased.

In step S4, the music distribution service program 441 of the WWW server 8-1 selects a recommended music piece from push distribution data registered in the music database 444 based on the user favorite information registered in the user favorite information database 446.

In step S5, the music distribution service program 441 of the WWW server 8-1 sends the push distribution data of the recommended music piece selected in step S4 to the server 481 via the network interface 442 and the Internet 5.

In step S6, the server program 511 of the server 481 registers the push distribution data received via the Internet 5 and the network interface 518 in the music database 515, and also updates the link information database 516 and the ranking information database 517.

FIG. 38 illustrates a music data list of the music database 515 in which push distribution data is registered. In this list, the music IDs of the registered push distribution data are set as 9000-9999 so that they can be distinguished from the other music data pieces. When the push distribution data is part of the music data, the address information and the playback start position information are the same information as the corresponding music data.

The new music piece ID of the push distribution data, registered in the music database 515, described with reference to FIG. 38, is also registered in the link information database 516 and the ranking information database 517. FIG. 39 is a link information list registered in the link information database 516.

The newly registered push information is registered in a "recommended music" station of the link information list. If the "recommended music" station is not set, it is set, and the music piece ID of the push distribution data is registered therein.

FIG. 40 illustrates a ranking list registered in the ranking information database 517. The rank in the "recommended music" station can be determined in any manner. For example, newly distributed data may be positioned at a higher level of the rank. Alternatively, the music-data distribution provider may distribute push distribution data by adding mark information to each item of data, and data having a higher mark may be considered as highly recommended data. In this manner, the rank may be determined according to the mark.

In step S7, the server program 511 of the server 481 sends information concerning the GUI of the newly set "recommended music" station to the corresponding client.

Figure 41:
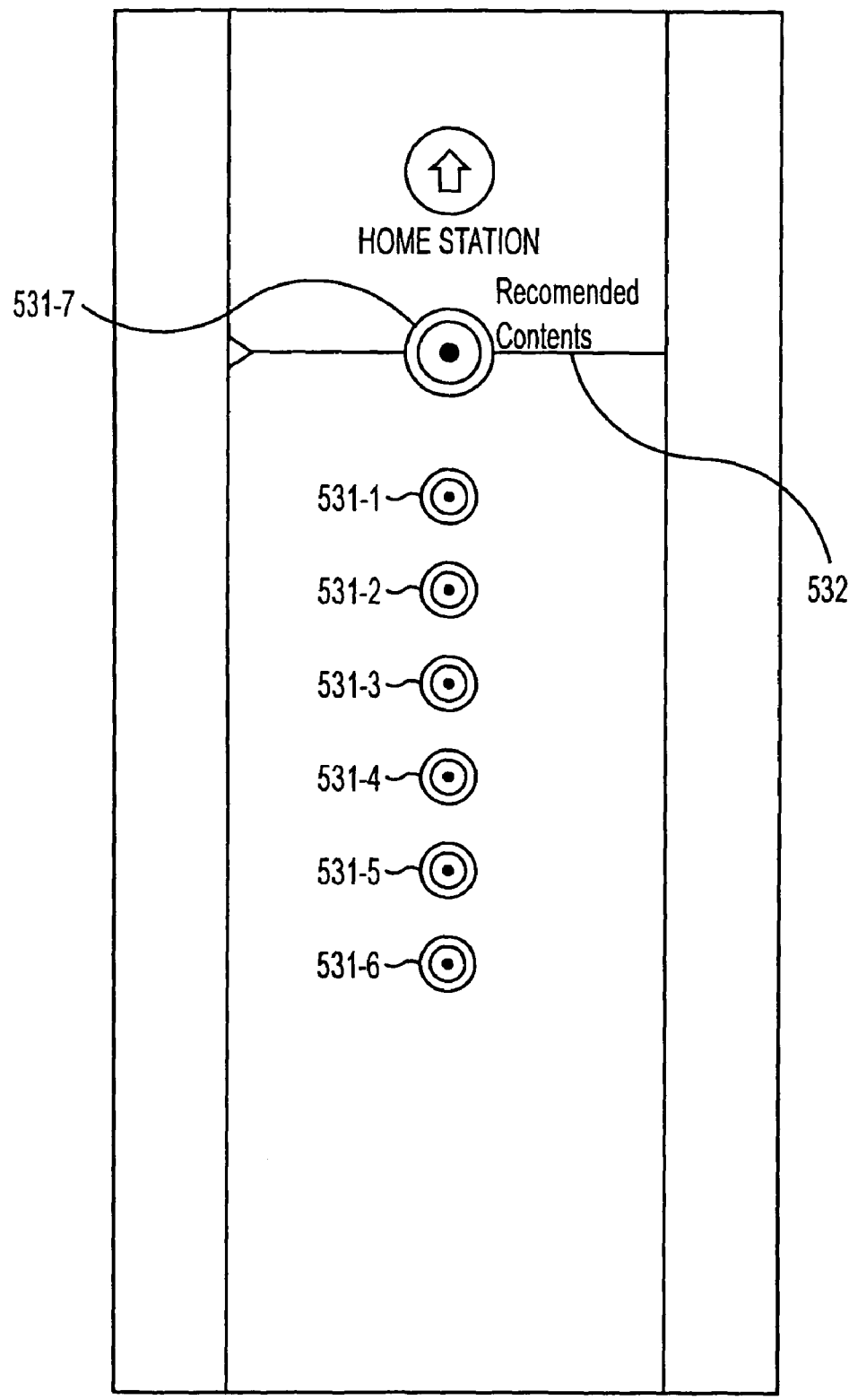
FIG. 41 illustrates a GUI to be displayed.

On the station display screen of the client 482, an icon 531-7 corresponding to the "recommended music" station is added. The icon 531-7 may be displayed, as shown in FIG. 41, at the head (top) of the screen so that it can be more noticeable than the icons 531-1 through 531-6 of the other stations. When the power of the client 482 is turned on, the icon 531-7 is selected so as to play back the music data (push distribution data) registered in the "recommended music" station.

Figure 42:
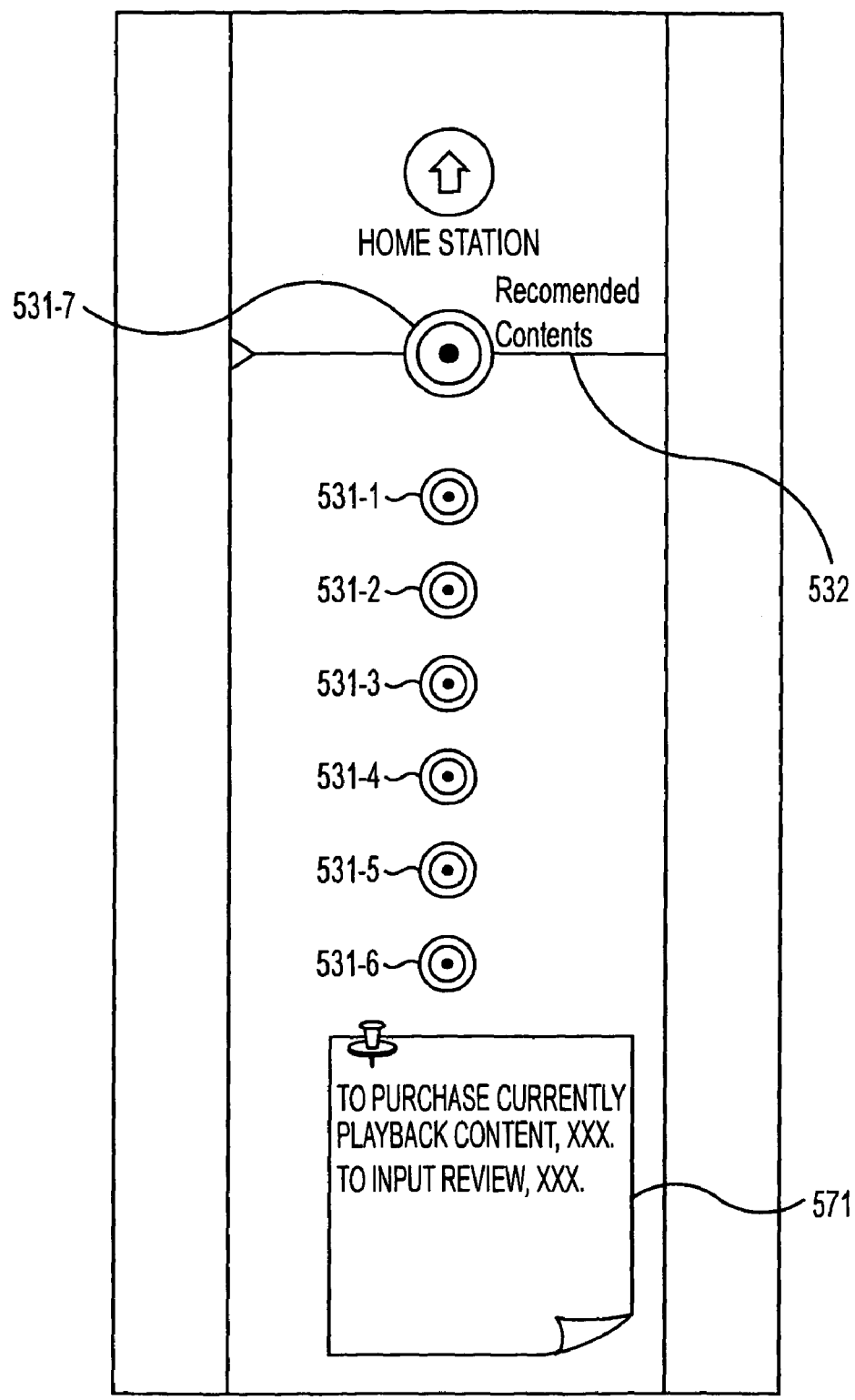
FIG. 42 illustrates a GUI to be displayed.

On the station display screen shown in FIG. 41, while the push distribution data is being played back, for example, a message window 571 shown in FIG. 42, may be displayed to indicate an introduction of the content corresponding to the currently played back push distribution data so as to encourage the user to purchase the corresponding music piece, or to indicate a method for purchasing the music piece or a method for inputting a review of the music piece so as to instruct the user to perform various operations.

Figure 43:
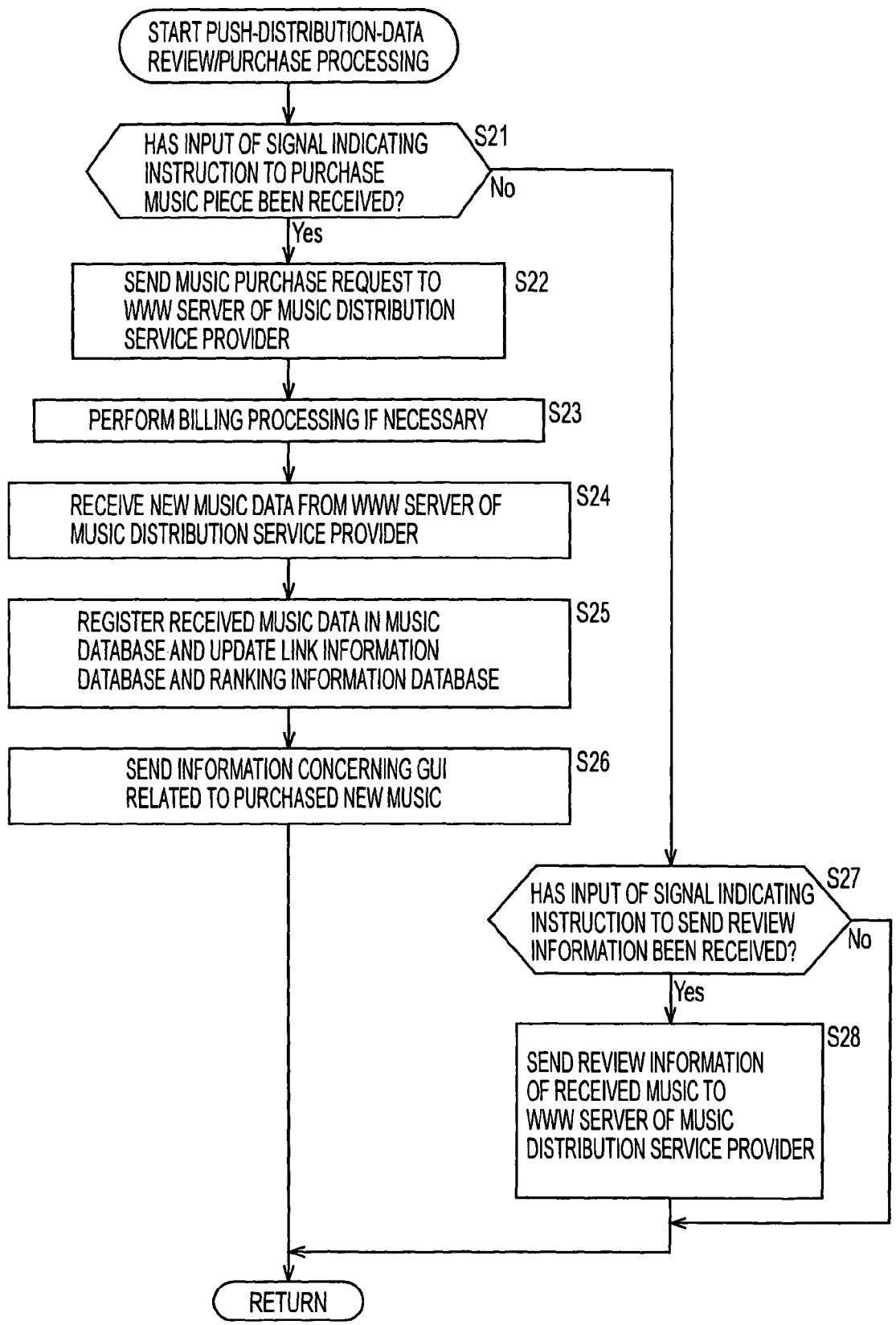
FIG. 43 is a flowchart illustrating push-distribution-data review/purchase processing.

In step S8, the server 481 performs push-distribution-data review/purchase processing, which is described below with reference to the flowchart of FIG. 43.

In step S9, the music distribution service program 441 of the WWW server 8-1 determines whether it has received the input of a signal indicating an instruction to purchase the music piece (signal sent from the server 481 in step S22 of FIG. 43, which is described below) from the server 481.

If it is determined in step S9 that a signal indicating an instruction to purchase the music piece has been received, in step S10, the music distribution service provider 441 of the WWW server 8-1 searches the music database 444 for the corresponding music data (not data for push distribution, but the content data corresponding to the entire music piece) and sends it to the server 481.

In step S11, the music distribution service program 441 of the WWW server 8-1 searches the user registration information database 445 for required information, and performs billing processing with the user using the server 481 if necessary. The payment method for billing processing may be a credit card, e-money authenticated by an IC card, or a prepaid card.

If it is determined in step S9 that a signal indicating an instruction to purchase the music piece has not been received, or after step S11, the process proceeds to step S12. In step S12, the music distribution service program 441 of the WWW server 8-1 determines whether review information for the music data (signal sent from the server 481 in step S28 of FIG. 43, which is described below) has been received from the server 481.

If it is determined in step S12 that review information for the music data has been received, in step S13, the music distribution service program 441 of the WWW server 8-1 updates the corresponding user favorite information of the user favorite information database 446 based on the music-data review information received in step S12.

If it is determined in step S12 that music-data review information has not been received, or after step S13, the process returns to step S4, and step S4 and the subsequent steps are repeated.

According to the above-described processing, sample data of a recommended music piece is push-distributed from the WWW server 8-1 to the server 481 and is recorded therein, and is played back by the client 482. If the user likes the pushed distribution data after listening to it, he/she can purchase the corresponding content data (music data corresponding to the entire music piece).

Even if an instruction to purchase the content data is not input, a user's review for the music piece can be sent to the WWW server 8-1, and thus, user favorite information registered in the user favorite information database 446 can always be updated. Accordingly, the music-data distribution service provider can send push distribution data reflecting the favorite information of each user so as to effectively distribute the push distribution data, thereby obtaining the opportunity to sell the content.

The above description has been given, assuming that user registration is conducted in advance. However, user registration may be conducted at any time. For example, user registration can be conducted when the user of the server 481 browses a web page released by the WWW server 8-1 and purchases music data from the music-data distribution service provider for the first time, and then, push distribution data may be sent to the server 481 based on the user registration information.

Figure 37:
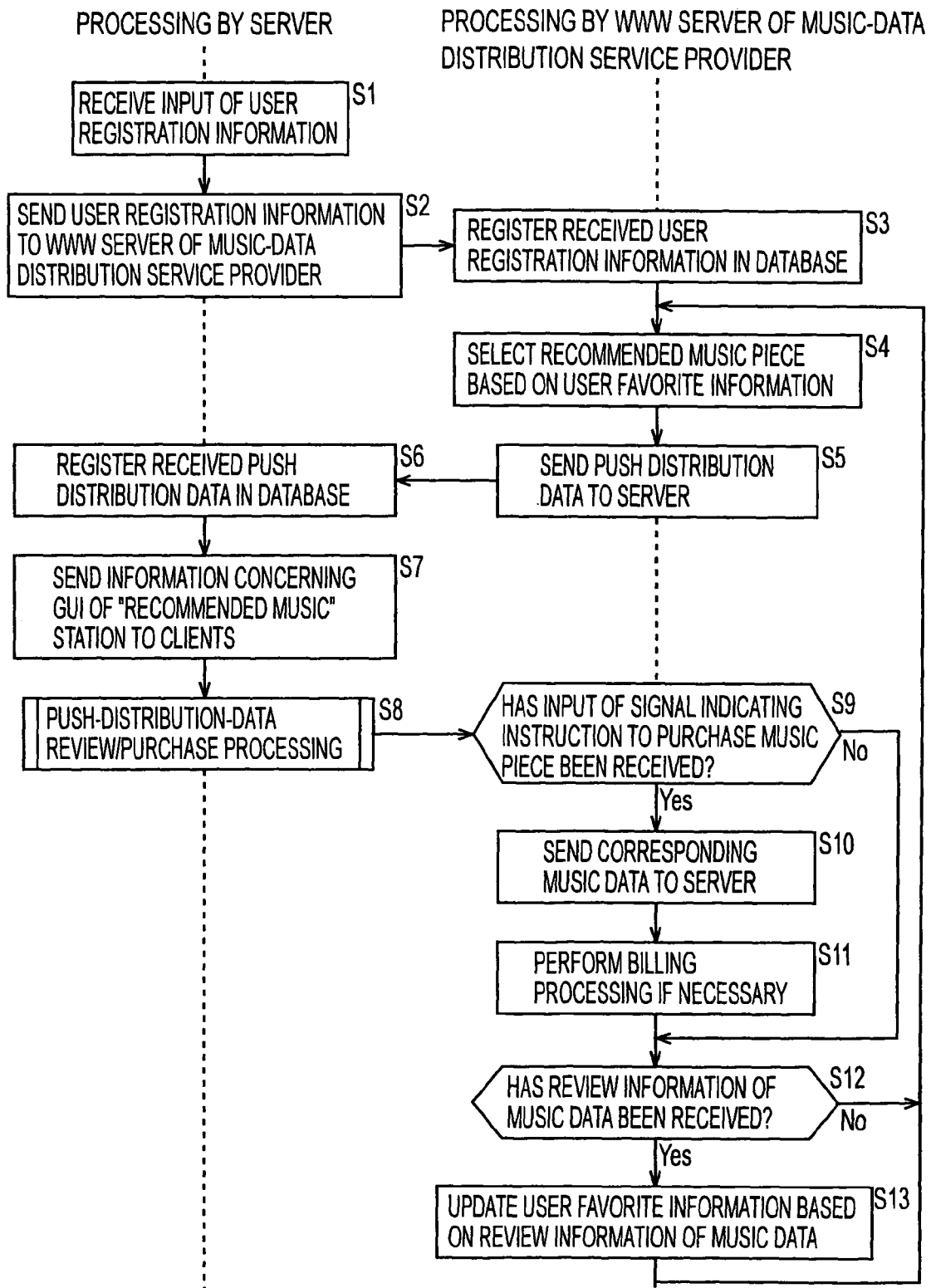
FIG. 37 is a flowchart illustrating processing between the server and the WWW server.

The push-distribution-data review/purchase processing executed in step S8 of FIG. 37 is described below with reference to the flowchart of FIG. 43.

Figure 44:
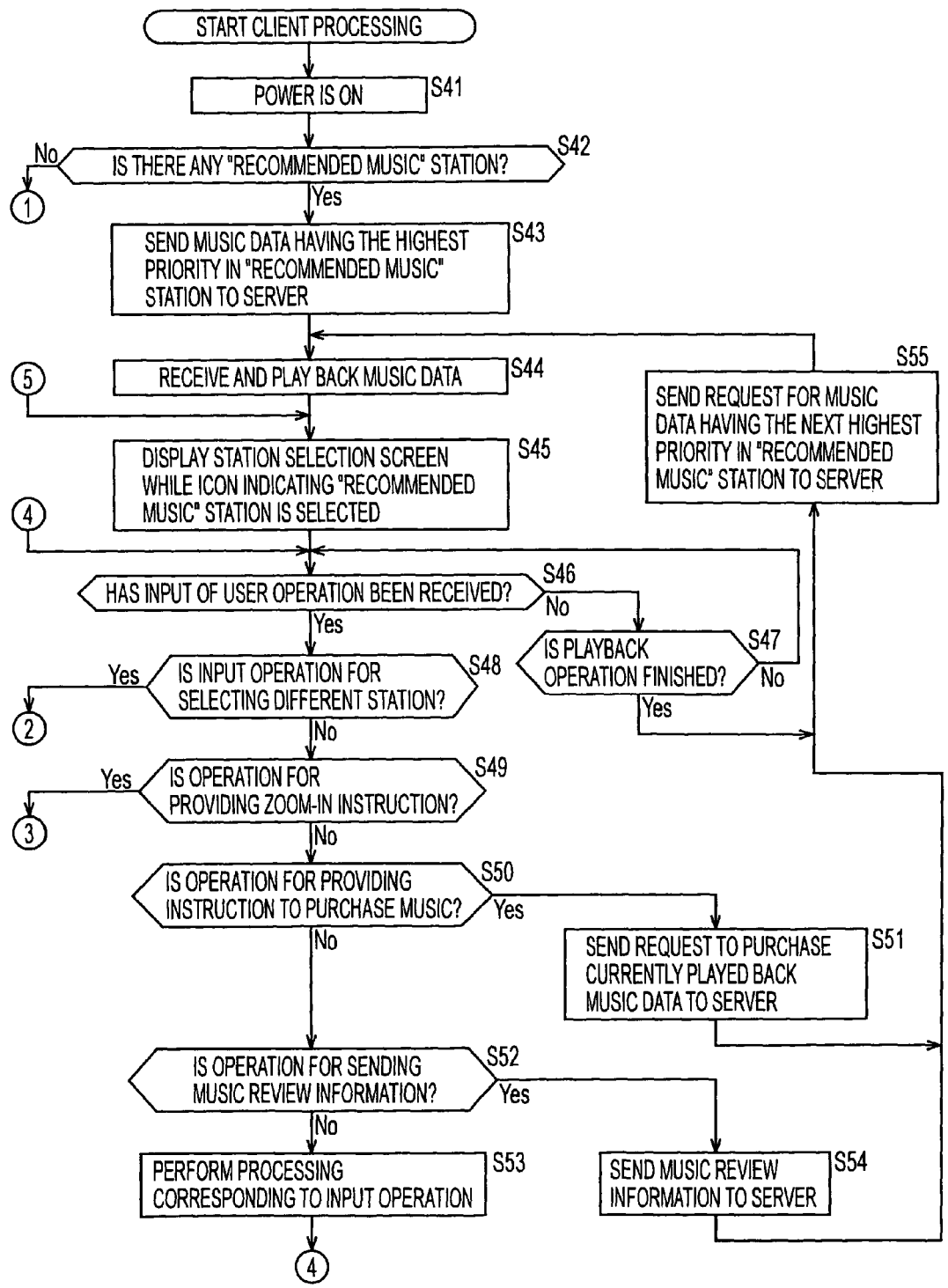
FIG. 44 is a flowchart illustrating the processing by a client.
Figure 45:
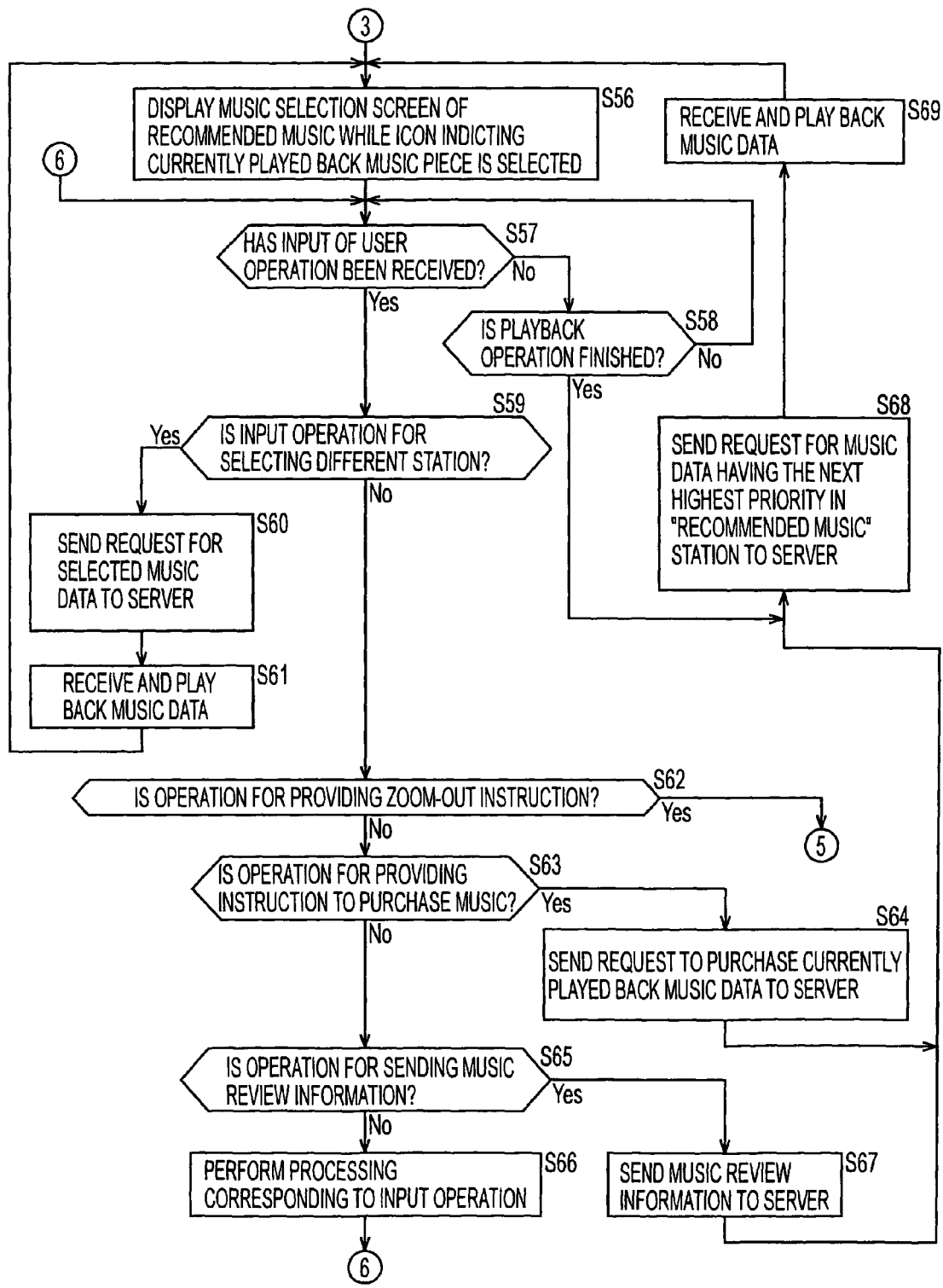
FIG. 45 is a flowchart illustrating the processing by the client.
Figure 46:
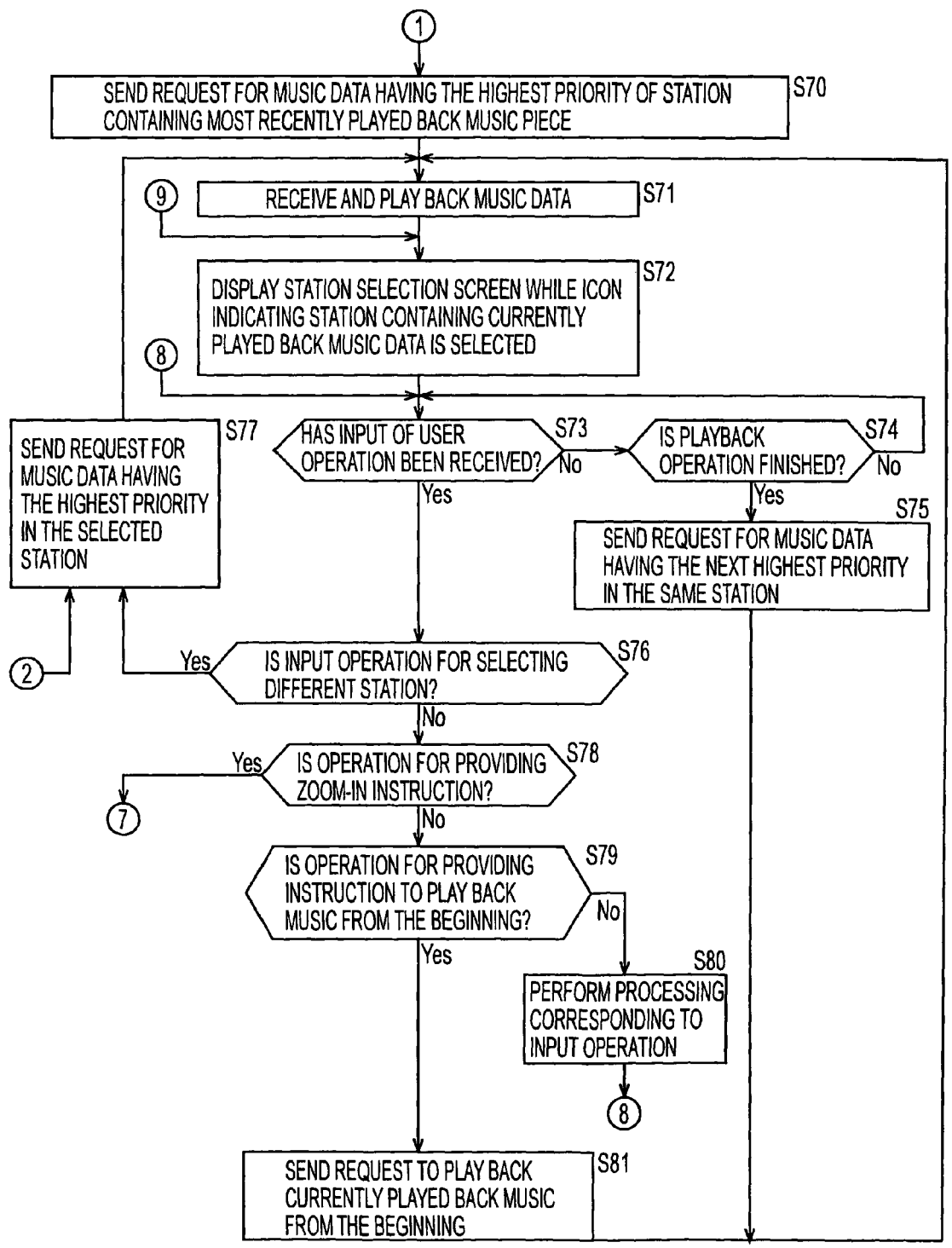
FIG. 46 is a flowchart illustrating the processing by the client.
Figure 47:
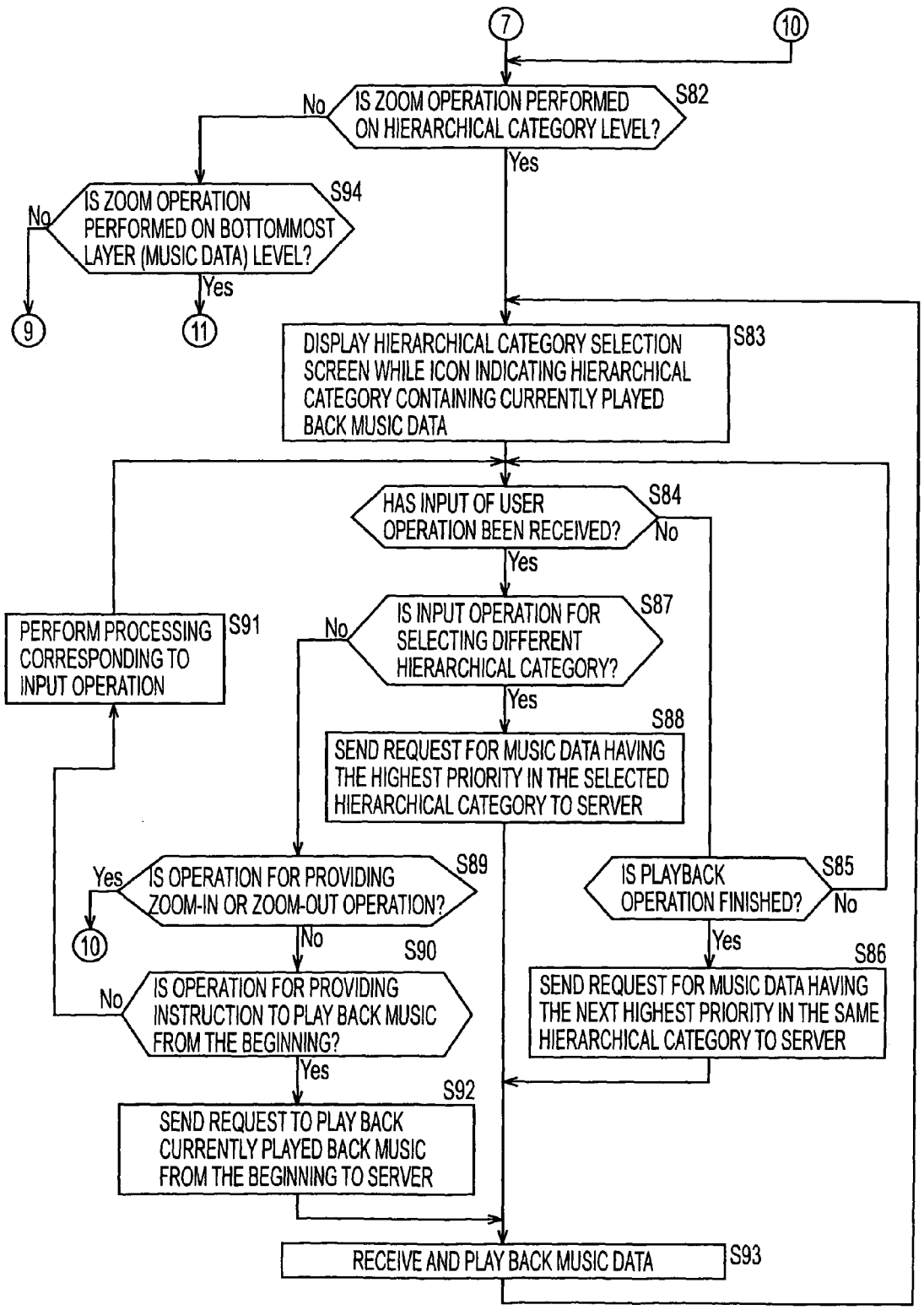
FIG. 47 is a flowchart illustrating the processing by the client.
Figure 48:
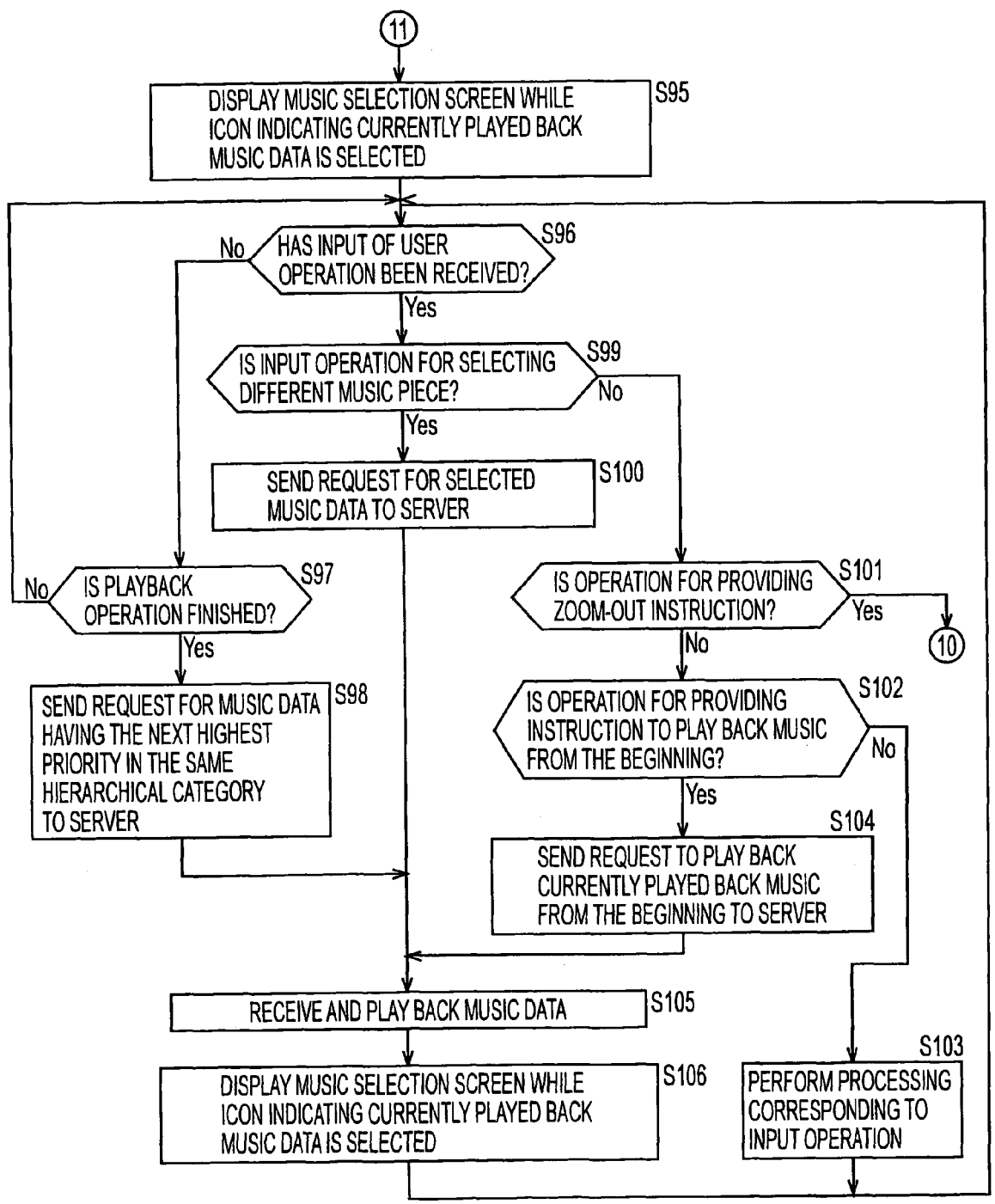
FIG. 48 is a flowchart illustrating the processing by the client.

In step S21, the server program 511 of the server 481 determines whether a signal indicating an instruction to purchase the music data (signal sent from the client 482 in step S51 of FIG. 44 or step S64 of FIG. 45, which is described below) has been received from the client 482 via the communication unit 531.

If it is determined in step S21 that a signal indicating an instruction to purchase the music piece has been received from the client 482, the process proceeds to step S22. In step S22, the server program 511 of the server 481 sends a request to purchase the music piece to the WWW server 8-1 of the music-data distribution service provider via the network interface 518 and the Internet 5.

In step S23, the server program 511 of the server 481 performs billing processing, if necessary, by sending the payment method for a fee for the music data to be purchased or information required for the payment to the WWW server 8-1 of the music-data distribution service provider. The payment method for billing processing may be a credit card, e-money authenticated by an IC card, or a prepaid card.

In step S24, the server program 511 of the server 481 receives new music data (content data corresponding to the entire music piece sent from the WWW server 8-1 in step S10 of FIG. 37) from the WWW server 8-1 of the music-data distribution service provider.

In step S25, the server program 511 of the server 481 registers the received music data in the music database 515, and updates the link information database 516 and the ranking information database 517. The server program 511 may control the display controller 514 to display a GUI screen for assisting the user to determine in which station the newly registered music data is to be registered, or to prepare a station for temporarily registering newly purchased music data and to automatically register the new music data in that station.

In step S26, the server program 511 of the server 481 sends information concerning the GUI related to the newly purchased music data to the client 481 based on the updated content in step S25.

For example, for the client 482 that can display thumbnails 551-1 and 551-2 shown in FIGS. 34 and 35 (for example, the client 482 that can display relatively large GUIs, such as the PDA 11 or the desk-top playback device 13), information indicating the newly purchased music data is to be displayed as which type of thumbnail in which hierarchical category of which station, and if necessary, image data corresponding to the thumbnail, is sent according to the updated content of the databases.

For the client 482 that displays GUIs only by using icons without using thumbnails (for example, the client 482 that can display only relatively small GUIs, such as the cellular telephone 12, the portable playback device 14, or the simplified playback device 15), data indicating the newly purchased music data is to be displayed as which type of icon in which hierarchical category of which station is sent according to the updated content of the databases.

If the display window 371, such as that shown in FIG. 23, is provided with the simplified playback device 15, it is not necessary to send information concerning GUIs to the corresponding client 482. In this manner, data corresponding to the method for displaying GUIs in the client 482 is sent from the server program 511, and the process returns to step S9 of FIG. 37.

If it is determined in step S21 that a signal indicating an instruction to purchase the music piece has not been input from the client 482, the process proceeds to step S27. In step S27, the server program 511 of the server 481 determines whether the input of a signal indicating an instruction to send review information received from the client 482 (signal sent from the client 482 in step S54 of FIG. 44 or step S67 of FIG. 45, which is described below) to the WWW server 8-1 via the communication unit 513 has been received.

If it is determined in step S27 that the input of a signal indicating an instruction to send review information has been received, in step S28, the server program 511 of the server 481 sends the review information for the music piece corresponding to the push distribution data received from the client 482 to the WWW server 8-1 of the music-data distribution service provider via the network interface 518 and the Internet 5.

If it is determined in step S27 that the input of a signal indicating an instruction to send review information has not been received, or after step S28, the process returns to step S9 of FIG. 37.

According to the above-described processing, the server 481 purchases content data from the music-data distribution service provider owning the WWW server 8-1 or sends a review of a push-distributed music piece to the WWW server 8-1 based on an operation performed by the user using the client 482.

The processing performed by the client 482 is described below with reference to the flowcharts of FIGS. 44 through 48, assuming that the desk-top playback device 13 is used as the client 482.

In step S41, power is supplied to the client 482.

In step S42, the client program 521 of the client 482 determines whether a "recommended music" station is provided. If it is determined in step S42 that a "recommended music" station is not provided, the process proceeds to step S70.

If it is determined in step S42 that a "recommended music" station is provided, in step S43, the client program 521 of the client 482 sends a request for the music data having the highest priority (push distribution data) in the "recommended music" station to the server 481 via the communication unit 523.

Upon receiving the request from the client 482, the server 481 searches for the corresponding push distribution data and sends it to the client 482.

In step S44, the communication unit 523 receives the music data, and the client program 521 controls the audio data converter 524 and the audio data output controller 525 to play back the received music data. More specifically, the audio data converter 524 converts the music data input from the communication unit 523 into an analog audio signal according to the method suitable for the format, and outputs the analog audio signal to the audio data output controller 525. The audio data output controller 525 outputs the analog audio signal to, for example, the speaker 284 or the headphone 16, and plays back the received music data.

In step S45, the client program 521 of the client 482 displays the station selection screen while the icon 531-7 indicating the "recommended music" station is being selected by the cursor 532, as described with reference to FIG. 41.

In step S46, the client program 521 of the client 482 determines whether an operation has been input from the user based on a signal input from the operation unit 522.

If it is determined in step S46 that an operation has not been input from the user, the client program 521 of the client 482 determines in step S47 whether the playback operation of the current music piece has finished. If it is determined in step S46 that the playback operation of the current music piece has not been finished, the process returns to step S46, and the corresponding processing is repeated. If it is determined in step S47 that the playback operation of the current music piece has finished, the process proceeds to step S55, which is described below.

If it is determined in step S46 that an operation has been input from the user, in step S48, the client program 521 of the client 482 determines whether the input operation has been performed for selecting a different station based on the signal input from the operation input unit 522. If it is determined in step S48 that the input operation has been performed for selecting a different station, the process proceeds to step S77, which is described below.

If it is determined in step S48 that the input operation has not been performed for selecting a different station, the client program 521 of the client 482 determines in step S49 whether the input operation has been performed for giving an instruction to perform a zoom-in operation based on the signal input from the operation input unit 522. If it is determined in step S49 that the input operation has been performed for giving an instruction to perform a zoom-in operation, the process proceeds to step S56, which is described below.

If it is determined in step S49 that the input operation has not been performed for giving an instruction to perform a zoom-in operation, the process proceeds to step S50. In step S50, the client program 521 of the client 482 determines whether the input operation has been performed for purchasing the music piece associated with the currently played-back push distribution data based on the signal input from the operation input unit 522.

The user can give an instruction to purchase the music piece corresponding to the currently played-back push distribution data by pressing a predetermined button for purchasing music data, which is provided for the remote commander 302, or by combining operations of the existing buttons.

If it is determined in step S50 that the input operation has been performed for purchasing the music piece corresponding to the currently played-back push distribution data, in step S51, the client program 521 of the client 482 sends a request to purchase the currently played-back music data to the server 481 via the communication unit 523.

If it is determined in step S50 that the input operation has not been performed for purchasing the music piece associated with the currently played-back push distribution data, the process proceeds to step S52. In step S52, the client program 521 of the client 482 determines whether the input operation has been performed for sending review information for the music piece.

If it is determined in step S52 that the input operation has not been performed for sending review information for the music piece, it means that the input operation is for changing the volume or the tone. Accordingly, in step S53, the client program 521 of the client 482 performs processing corresponding to the input operation. The process then returns to step S46, and step S46 and the subsequent steps are repeated.

If it is determined in step S52 that the input operation has been performed for sending review information for the music piece, in step S54, the client program 521 of the client 482 sends the music-piece review information input by the user to the server 481 via the communication unit 523. The music-piece review information may consist of five levels, such as "very good", "good", "satisfactory", "not very good", and "poor", or a different review method may be employed.

If it is determined in step S47 that the playback operation of the current music piece has finished, or after step S51 or S54, the process proceeds to step S55. In step S55, the client program 521 of the client 482 sends a request for music data having the next highest priority in the "recommended music" station to the server 481 via the communication unit 523, and the process returns to step S44, and step S44 and the subsequent steps are repeated.

Figure 49A:
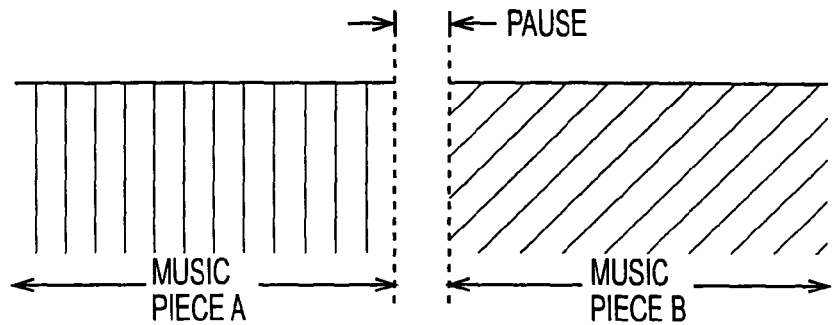
FIG. 49A illustrates a state in which there is a pause between two pieces of music.

A description is now given of the processing of the audio data output controller 525 when the music piece to be played back is changed, for example, after returning to step S44. If, for example, there is a pause between two pieces of music, as shown in FIG. 49A, when music piece A is changed to music piece B, the user has an unnatural feeling as if the needle for the record jumps and the playback operation is suspended.

Figure 49B:
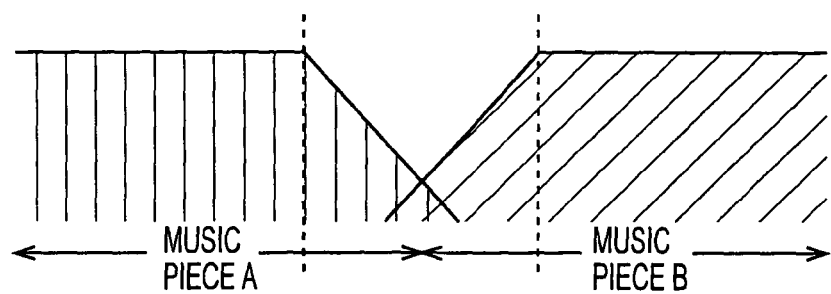
FIG. 49B illustrates a state in which crossfading is performed.

To avoid such an unnatural feeling, crossfading, for example, is performed, as shown in FIG. 49B, to gradually decrease the volume of the music piece A and to gradually increase the volume of the music piece B. In this case, it is difficult for the user to recognize the switching point of the two pieces of music, and the user feels as if music were changed without noticing it.

Figure 49C:
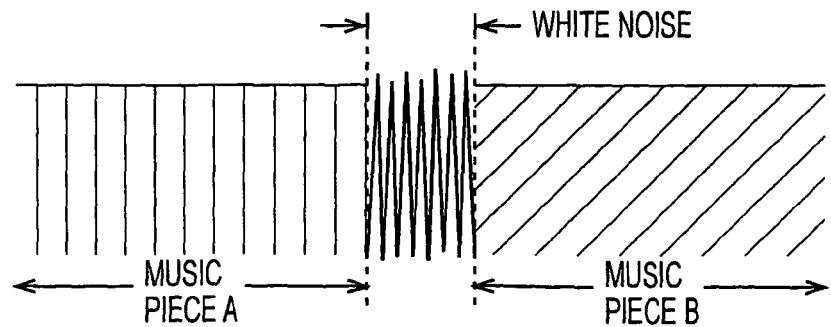
FIG. 49C illustrates a state in which white noise is inserted into a playback switching point of two pieces of music.

Accordingly, when changing music pieces, the audio data output controller 525 inserts very short white noise between two pieces of music, as shown in FIG. 49C, and then outputs the sound. This enables the user to recognize that the music has changed without having an unnatural feeling. In particular, as discussed below, when music data to be played back is changed by performing tuning, and the user feels as if radio tuning were performed since short noise is inserted between two pieces of music. The user can be naturally aware that the music data has been changed.

If it is determined in step S49 that the input operation has been performed for instructing a zoom-in operation, the process proceeds to step S56. In step S56, the client program 521 of the client 482 displays a music selection screen corresponding to a level lower than the "recommended music" station while the icon indicating the currently played-back music piece (i.e, the push distribution data) is being selected.

In step S57, the client program 521 of the client 482 determines whether an operation has been input from the user based on a signal input from the operation input unit 522.

If it is determined in step S57 that an operation has not been input from the user, the client program 521 of the client 482 determines in step S58 whether the playback operation of the current music piece has finished. If it is determined in step S58 that the playback operation of the current music piece has not finished, the process returns to step S57, and the corresponding step is repeated. If it is determined in step S58 that the playback operation of the current music piece has finished, the process proceeds to step S68.

If it is determined in step S57 that an operation has been input from the user, the client program 521 of the client 482 determines in step S59 whether the input operation has been performed for selecting a different music piece (push distribution data), i.e., whether the input operation is for giving an instruction to move the cursor line 552 described with reference to FIGS. 34 through 36.

If it is determined in step S59 that the input operation has been performed for selecting a different music piece, the process proceeds to step S60. In step S60, the client program 521 of the client 482 sends a request to send newly selected music data (push distribution data) to the server 481 via the communication unit 523.

Upon receiving the request from the client 482, the server 481 searches for the corresponding push distribution data and sends it to the client 482.

Accordingly, in step S61, the communication unit 523 receives the music data, and the client program 521 controls the audio data converter 524 and the audio data output controller 525 to play back the received music data. The process then returns to step S56, and step S56 and the subsequent steps are repeated.

If it is determined in step S59 that the input operation has not been performed for selecting a different music piece, the process proceeds to step S62. In step S62, the client program 521 of the client 482 determines whether the input operation has been performed for instructing a zoom-out operation based on the signal input from the operation input unit 522. If it is determined in step S62 that the input operation is for instructing a zoom-out operation, the process returns to step S45, and step S45 and the subsequent steps are repeated.

If it is determined in step S62 that the input operation has not been performed for instructing a zoom-out operation, the client program 521 of the client 482 determines in step S63 based on the signal input from the operation input unit 522 whether the input operation is for giving an instruction to purchase the music piece corresponding to the currently played-back push distribution data.

If it is determined in step S63 that the input operation is for giving an instruction to purchase the music piece corresponding to the currently played-back push distribution data, the process proceeds to step S64. In step S64, the client program 521 of the client 482 sends a request to purchase the currently played-back music data to the server 481 via the communication unit 523.

If it is determined in step S63 that the input operation has not been performed for purchasing the music piece associated with the currently played-back push distribution data, in step S65, the client program 521 of the client 482 determines whether the input operation has been performed for sending review information for the music data.

If it is determined in step S65 that the input operation has not been performed for sending music-data review information, it means that the input operation from the user is to change, for example, the volume or the tone. Then, in step S66, the client program 521 of the client 482 performs processing corresponding to the input operation, and the process returns to step S57, and step S57 and the subsequent steps are repeated.

If it is determined in step S65 that the input operation has been performed for sending music-piece review information, in step S67, the client program 521 of the client 482 sends the music-piece review information input by the user to the server 481 via the communication unit 523.

If it is determined in step S58 that the playback operation of the current music piece has finished, or after step S64 or S67, the process proceeds to step S68. In step S68, the client program 521 of the client 482 sends a request to send music data having the next highest priority in the "recommended music" station to the server 481 via the communication unit 523.

Upon receiving the request from the client 482, the server 481 searches for the corresponding push distribution data and sends it to the client 482.

Accordingly, in step S69, the communication unit 523 receives the music data, and the client program 521 controls the audio data converter 524 and the audio data output controller 525 to play back the received music data. The process then returns to step S56, and step S56 and the subsequent steps are repeated.

If it is determined in step S42 that a "recommended music" station is not provided, the process proceeds to step S70. In step S70, the client program 521 of the client 482 detects the station containing a piece of music that was most recently played back by referring to a log recorded in a built-in memory (not shown), and sends a request for music data having the highest priority in the station to the server 481 via the communication unit 523.

Upon receiving the request from the client 482, the server 481 searches for the corresponding music data and sends it. For example, if the station containing a music piece that was most recently played back by the client 482 is "user A's favorites", the server program 511 of the server 481 detects that the music piece ID of the music data having the currently highest priority is "ID0081" by referring to the ranking information database 517 shown in FIG. 29, and searches for the music data "ID0081" from the music database 515. The server program 511 then reads part of the music data, i.e., a so-called "melodious portion" or the most characteristic portion, and sends it to the client 482 via the communication unit 513.

In step S71, the communication unit 523 receives the music data, and the client program 521 controls the audio data converter 524 and the audio data output controller 525 to play back the received music data.

In step S72, the client program 521 controls the display controller 526 to output a station selection screen to the display panel 281 while the icon indicating the station containing the current music data is being selected, and displays the station selection screen on the display panel 281. For example, if the station containing the music piece that was most recently played back by the client 482 is "user A's favorites", the GUI screen shown in FIG. 30 is displayed on the display panel 281.

In step S73, the client program 521 determines whether an operation has been input from the user based on a signal input from the operation input unit 522.

If it is determined in step S73 that a user's operation has not been input, the client program 521 determines in step S74 whether the playback operation of the current music piece has finished, that is, whether the playback operation of the music data received in step S71 has finished.

If it is determined in step S74 that the playback operation performed on the current music piece has not finished, the process returns to step S73, and the subsequent processing is repeated.

If it is determined in step S74 that the playback operation has finished, in step S75, the client program 521 sends a request for music data having the next highest priority in the same station to the server 481 via the communication unit 523. The server program 511 of the server 481 then sends a so-called "melodious portion" or the most characteristic portion of the corresponding music data to the client 482 based on the received request. Thus, after step S75, the process returns to step S71, and the subsequent processing is repeated.

If it is determined in step S73 that an operation has been input from the user, the client program 521 determines in step S76 whether the operation input from the user in step S73 has been performed for selecting a different station, that is, whether the operation has been performed for moving the cursor line 532 in FIG. 30.

If it is determined in step S76 that the operation has been performed for selecting a different station, or if it is determined in step S48 that the operation has been performed for selecting a different station, in step S77, the client program 521 sends a request for music data having the highest priority of the selected station to the server 481 via the communication unit 523. The server program 511 of the server 481 then sends a so-called "melodious portion" or the most characteristic portion of the corresponding music data to the client 482 based on the received request. Accordingly, after step S77, the process returns to step S71, and the subsequent processing is repeated. If the newly selected station is, for example, "user B's favorites", in step S72, the GUI screen described with reference to FIG. 31 is displayed on the display panel 281.

If it is determined in step S76 that the operation from the user is not for selecting a different station, the client program 521 determines in step S78 whether the operation from the user has been performed for designating a zoom-in operation, i.e., whether the zoom-in button 334 shown in FIGS. 18A and 18B has been pressed. If it is determined in step S78 that the operation from the user has been performed for designating a zoom-in operation, the process proceeds to step S82.

If it is determined in step S78 that the operation from the user is not for designating a zoom-in operation, the client program 521 determines in step S79 whether the operation has been performed for giving an instruction to play back music from the beginning.

If it is determined in step S79 that the user's operation is not for giving an instruction to play back music from the beginning, it means that the operation is for changing the volume or the tone. Accordingly, in step S80, the client program 521 performs processing corresponding to the input operation. The process then returns to step S73, and the subsequent processing is repeated.

If it is determined in step S79 that the operation from the user has been performed for giving an instruction to play back music from the beginning, in step S81, the client program 521 sends a request to restart the music piece that is currently played back from the beginning to the server 481 via the communication unit 523. The server program 511 of the server 481 then sends the whole music data to the client 482 based on the received request. Accordingly, after step S81, the process returns to step S71, and the subsequent processing is repeated.

If it is determined in step S78 that the operation from the user has been performed for designating a zoom-in operation, the client program 521 determines in step S82 whether the zoom operation is to be performed on a hierarchical category level.

If it is determined in step S82 that the zoom operation is to be performed on a hierarchical category level, in step S83, the client program 521 displays the hierarchical category selection screen while the icon indicating the hierarchical category containing the music data that is currently played back is being selected. It is now assumed that the GUI screen shown in FIG. 31 is displayed on the display panel 281, and that an instruction to perform a zoom-in operation is input while the music piece indicated by "ID0077" having the highest priority of the station "user B's favorites" is being played back. Then, the icon 541-2 indicating the hierarchical category "melancholic songs" is selected on the display screen in step S83, as described with reference to FIG. 32, since the music piece indicated by "ID0077" is contained in the hierarchical category "melancholic songs".

Then, the client program 521 determines in step S84 whether a user's operation has been input based on a signal input from the operation input unit 522.

If it is determined in step S84 that a user's operation has not been input, the client program 521 determines in step S85 whether a playback operation on the music piece which is currently played back is finished.

If it is determined in step S85 that the playback operation is not finished, the process returns to step S84, and the subsequent processing is repeated.

If it is determined in step S85 that the playback operation is finished, in step S86, the client program 521 sends a request for music data having the next highest priority in the same hierarchical category to the server 481 via the communication unit 523. Then, the server program 511 of the server 481 sends a so-called "melodious portion" or the most characteristic portion of the corresponding music data to the client 482 based on the received request. Accordingly, after step S86, the process proceeds to step S93.

If it is determined in step S84 that a user's operation has been input, the client program 521 determines in step S87 whether the user's operation input in step S87 has been performed for selecting a different hierarchical category, that is, whether the user's operation has been performed for moving the cursor line 542 shown in FIG. 32.

If it is determined in step S87 that the user's operation has been performed for selecting a different hierarchical category, in step S88, the client program 521 sends a request for music data having the highest priority of the selected hierarchical category to the server. Then, the server program 511 of the server 481 sends a so-called "melodious portion" or the most characteristic portion of the corresponding music data to the client 482 based on the received request. Accordingly, after step S88, the process proceeds to step S93.

If it is determined in step S87 that the user's operation is not for selecting a different hierarchical category, the client program 521 determines in step S89 whether the user's operation has been performed for designating a zoom-out or zoom-in operation. If it is determined in step S89 that the user's operation has been performed for designating a zoom-out or zoom-in operation, the process returns to step S82, and the subsequent processing is repeated.

If it is determined in step S89 that the user's operation is not for designating a zoom-out or zoom-in operation, the client program 521 determines in step S90 whether the user's operation has been performed for giving an instruction to play back music from the beginning.

If it is determined in step S90 that the user's operation is not for giving an instruction to play back music from the beginning, it means that the user's operation is for changing, for example, the volume or the tone. Accordingly, in step S91, the client program 521 performs processing corresponding to the input operation. The process then returns to step S84, and the subsequent processing is repeated.

If it is determined in step S90 that the user's operation has been performed for giving an instruction to restart music that is currently played back from the beginning, in step S92, the client program 521 sends a request to restart music that is currently played back from the beginning to the server 481 via the communication unit 523. Then, the server program 511 of the server 481 sends the whole music data to the client 482 based on the received request.

In step S86, S88, or S92, music data is sent from the server 481. Accordingly, after step S86, S88, or S92, in step S93, the communication unit 523 receives the music data, and the client program 521 controls the audio data converter 524 and the audio data output controller 525 to play back the received music data. The process then returns to step S83, and the subsequent processing is repeated.

If it is determined in step S82 that the zoom operation is not to be performed on a hierarchical category level, the client program 521 determines in step S94 whether the zoom operation is to be performed on the bottommost level (music data). If it is determined in step S94 that the zoom operation is not to be performed on the bottommost level (music data), it means that the zoom operation is to be performed on the station level. Accordingly, the process returns to step S72, and the subsequent processing is repeated.

If it is determined in step S94 that the zoom operation is to be performed on the bottommost level (music data), in step S95, the client program 521 controls the display controller 526 to display the music selection screen shown in FIG. 36 (or FIG. 34 or 35) while the icon indicating the music data that is currently played back is being selected (or while the thumbnail is displayed).

In step S96, the client program 521 determines whether a user's operation has been input based on a signal input from the operation input unit 522.

If it is determined in step S96 that a user's operation has not been input, the client program 521 determines in step S97 whether the playback operation on the music piece which is currently played back is finished. If it is determined in step S97 that the playback operation is not finished, the process returns to step S96, and the subsequent processing is repeated.

If it is determined in step S97 that the playback operation is finished, in step S98, the client program 521 sends a request for music data having the next highest priority in the same hierarchical category (namely, among the music pieces displayed on the currently displayed music selection screen) to the server 481 via the communication unit 523. Then, the server program 511 of the server 481 sends a so-called "melodious portion" or the most characteristic portion of the corresponding music data to the client 482 based on the received request. Accordingly, the process proceeds to step S105.

If it is determined in step S96 that a user's operation has been input, the client program 521 determines in step S99 whether the user's operation has been performed for selecting a different piece of music, that is, whether the user's operation has been performed for changing the position of the cursor line 552 shown in FIG. 34.

If it is determined in step S99 that the user's operation has been performed for selecting a different piece of music, in step S100, the client program 521 sends a request for the selected music data to the server 481. Then, the server program 511 of the server 481 sends a so-called "melodious portion" or the most characteristic portion of the corresponding music data to the client 482 based on the received request. The process then proceeds to step S105.

If it is determined in step S99 that the user's operation is not for selecting a different piece of music, the client program 521 determines in step S101 whether the user's operation has been performed for designating a zoom-out operation. If it is determined in step S101 that the user's operation has been performed for designating a zoom-out operation, the process returns to step S82, and the subsequent processing is repeated.

If it is determined in step S101 that the user's operation is not for designating a zoom-out operation, the client program 521 determines in step S102 whether the user's operation has been performed for giving an instruction to play back music from the beginning.

If it is determined in step S102 that the user's operation is not for giving an instruction to play back music from the beginning, it means that the user's operation is for changing, for example, the volume or the tone. Accordingly, in step S103, the client program 521 performs processing corresponding to the input operation. The process then returns to step S96, and the subsequent processing is repeated.

If it is determined in step S102 that the user's operation has been performed for giving an instruction to play back music from the beginning, in step S104, the client program 521 sends a request to restart music that is currently played back from the beginning to the server 481 via the communication unit 523. Then, the server program 511 of the server 481 sends the whole music data to the client 482 based on the received request.

After step S98, S100, or S104, in step S105, the communication unit 523 receives music data sent from the server 481, and the client program 521 controls the audio data converter 524 and the audio data output controller 525 to play back the received music data.

In step S106, the client program 521 displays the music selection screen shown in FIG. 36 while the icon indicating the music data that is currently played back is being selected. Alternatively, the client program 521 displays the music selection screen shown in FIG. 34 or 35 while the thumbnail indicating the music data that is currently played back is displayed. Then, the process returns to step S96, and the subsequent processing is repeated.

According to the processing performed by the client 482 described with reference to FIGS. 44 through 48, the user is able to listen to various pieces of music recorded in the server 481 by performing a simple operation, such as vertically moving the cursor line or performing zoom-out or zoom-in operation, while referring to the GUI screens described with reference to FIGS. 30 through 36 or FIGS. 41 and 42. When the user changes the music piece to be played back by vertically moving the cursor line, white noise is inserted into the switching portion of two pieces of music, thereby enabling the user to be naturally aware that music is changed without having an unnatural feeling. Since music is played back, not from the beginning, but from a so-called "melodious portion" or the most characteristic portion, the user can immediately recognize a tune if the user knows it, and even if the user does not know the tune, the user can immediately decide whether the user likes it.

Accordingly, the user of the client 482 is able to listen to music pieces of a desired station or a desired hierarchical category by operating, for example, the remote commander 302 while referring to GUIs. If the remote commander 302 is not used, the user is able to listen to so-called "melodious portion" or the most characteristic portions of various pieces of music like BGM, as in, for example, a television or radio guide program for popular music. The user is also able to listen to music like BGM by randomly switching music pieces by operation of the remote commander 302.

If it is adapted that the users of a plurality of clients 482 receive and play back music data recorded in the same server 481, music pieces registered by another user may be played back. Thus, if the user happens to listen to an unknown tune and likes it, the user is able to restart the tune from the beginning.

Figure 50:
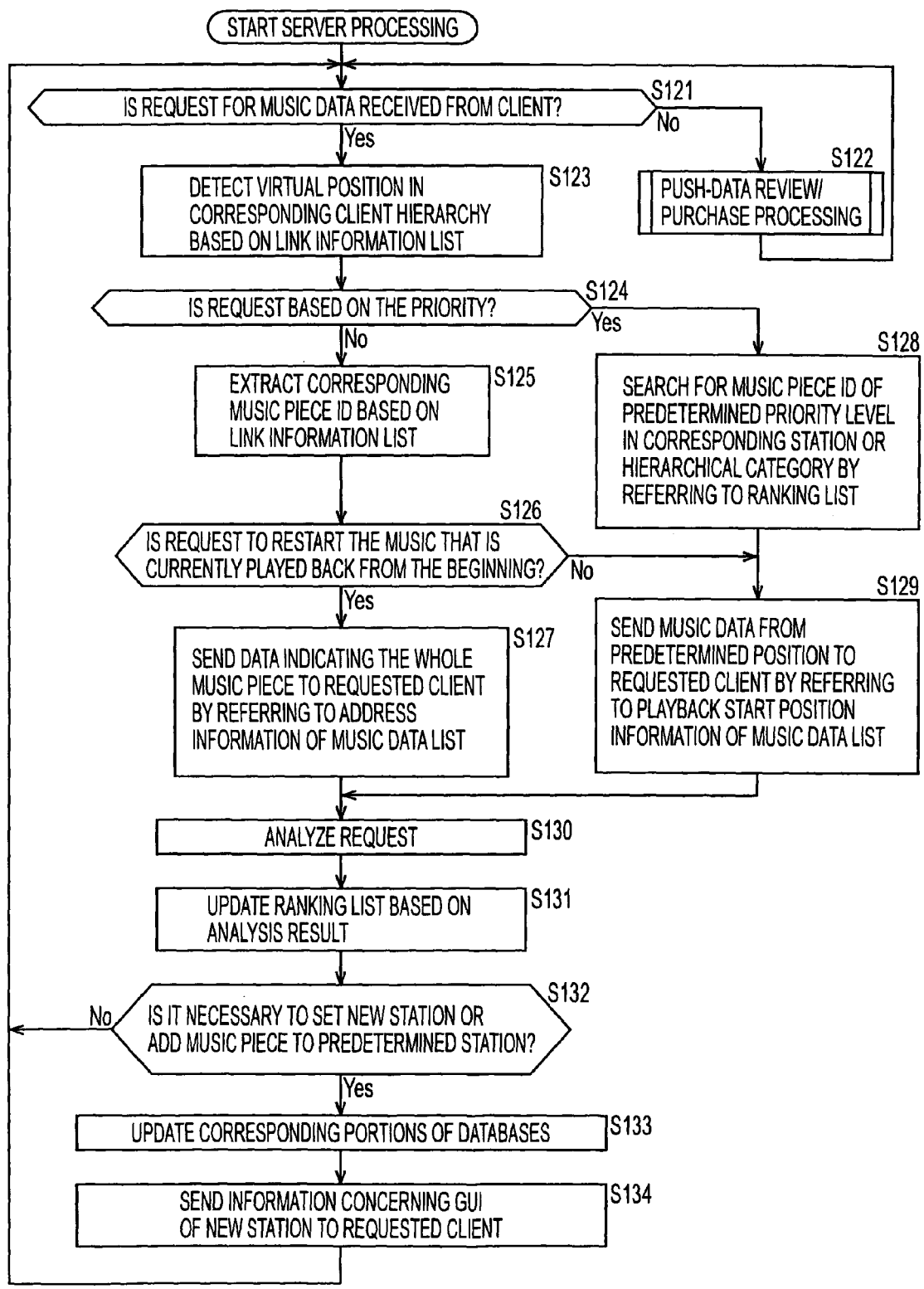
FIG. 50 is a flowchart illustrating the processing by a server.

A description is now given, with reference to the flowchart of FIG. 50, of the processing performed by the server 481, which is concurrently executed with the processing performed by the client 482 described with reference to FIGS. 44 through 48.

Before executing the processing of the server 481 described with reference to FIG. 50, which is concurrently executed with the processing of the client 482, the server program 511 of the server 481 has received the registration of music data, the settings of stations and hierarchical categories, and the setting conditions of new stations from the operation input unit 512.

That is, the server program 511 has registered information required for the music database 515, the link information database 516, and the ranking information database 517 based on an input from the operation input unit 512.

The server program 511 is also able to set new stations based on a request sent from the client 482. For example, if there are "requests for music pieces to be played back from the beginning three times or more from each client 482 during 7:00 to 9:00 in the morning" from the user, the server program 511 newly sets a "morning songs" station, and thereafter, music data satisfying the above condition are registered in the "morning songs" station.

In step S121, the server program 511 determines whether a request for music data has been received from the client 482 based on a signal input from the communication unit 513.

If it is determined in step S121 that a request for music data has not been received from the client 482, the signal sent from the client 482 is a signal for purchasing push distribution data which is currently played back, or a signal indicating a review. Accordingly, in step S122, push-distribution-data review/purchase processing described with reference to FIG. 43 is performed.

If it is determined in step S121 that a request for music data has been received from the client 482, in step S123, the server program 511 detects the virtual position of the corresponding music data in the hierarchy of the client 482 that has sent the request based on the request from the client 482 and the link information list registered in the link information database 516.

The server program 511 then determines in step S124 whether the input request has been made based on the priority, i.e., whether the input request has been made when power was supplied, or when the playback operation was finished, or when the station or the hierarchical category was moved.

If it is determined in step S124 that the input request has not been made based on the priority, it means that the request is for music data at the bottommost layer, or the request is for restarting a music piece that is currently played back from the beginning. In this case, in step S125, the server program 511 extracts the music piece ID corresponding to the request based on the link information list registered in the link information database 516.

In step S126, the server program 511 determines whether the input request is for restarting a music piece that is currently played back from the beginning.

If it is determined in step S126 that the input request is for restarting a music piece from the beginning, in step S127, the server program 511 extracts the whole music data based on the music piece ID extracted in step S125 by referring to the address information of the music data list registered in the music database, and sends the whole music data to the client 482 via the communication unit 513.

If it is determined in step S124 that the input request has been made based on the priority, in step S128, the server program 511 searches for the music piece ID having a predetermined priority level (specified in the request) in the corresponding station or the corresponding hierarchical category by referring to the ranking list registered in the ranking information database 517.

If it is determined in step S126 that the input request is not for restarting a music piece from the beginning, or after the processing of step S128, in step S129, the server program 511 extracts music data starting from a predetermined position based on the music piece ID specified in the request or the music piece ID searched in step S128 by referring to the playback start position information of the music data list, and sends the music data to the client 482 via the communication unit 513.

After processing of step S127 or S129, in step S130, the server program 511 analyzes the content of the request received from the client 482. More specifically, the server program 511 extracts information required for updating the link information database 516 or the ranking information database 517, such as the requested music piece ID, the time at which the request was made (or the day of the week or the date), or whether the request is for restarting the music piece from the beginning.

In step S131, the server program 511 updates the ranking list of the ranking information database 517 based on the analysis result obtained in step S130. More specifically, if the request from the client 482 is for restarting the music piece from the beginning, the server program 511 sets the rank of the music data to be a higher level in the ranking list of the ranking information database 517.

In this example, the ranking list is updated according to whether a request has been made for restarting music from the beginning. However, the ranking list may be updated based on another condition.

In step S132, the server program 511 determines whether it is necessary to set a new station or add a music piece to a predetermined station based on the analysis result obtained in step S130. That is, if there are "requests for music pieces to be played back from the beginning three times or more from each client 482 during 7:00 to 9:00 in the morning", the server program 511 newly sets a "morning songs" station, and thereafter, music data satisfying the above condition are registered in the "morning songs" station. Accordingly, the server program 511 determines whether the analysis result in step S130 satisfies a preset condition.

If it is determined in step S132 that it is not necessary to set a new station or add a music piece to a predetermined station, the process returns to step S121, and the subsequent processing is repeated.

If it is determined in step S132 that it is necessary to set a new station or add a music piece to a predetermined station, in step S133, the server program 511 updates the corresponding portions of the link information database 516 and the ranking information database 517.

In step S134, the server program 511 sends information concerning the GUIs of a new station to the corresponding client 482 via the communication unit 513 based on the updated content in step S133.

For example, for the client 482 that can display thumbnails 551-1 and 551-2 shown in FIGS. 34 and 35 (for example, the client 482 that can display relatively large GUIs, such as the PDA 11 or the desk-top playback device 13), information indicating which type of thumbnail of which hierarchical category of which station, or if necessary, image data corresponding to thumbnails, is sent according to the updating content of the databases.

For the client 482 that displays GUIs only by using icons without using thumbnails (for example, the client 482 that can display only relatively small GUIs, such as the cellular telephone 12, the portable playback device 14, or the simplified playback device 15), data indicating which type of icon in which hierarchical category of which station is sent according to the updating content of the databases.

If the display window 371, such as that shown in FIG. 23, is provided with the simplified playback device 15, it is not necessary to send information concerning GUIs to the corresponding client 482. In this manner, data corresponding to a display method for GUIs in the client 482 is sent from the server program 511.

Then, after processing of step S134, the process returns to step S121, and the subsequent processing is repeated.

According to the above-described processing, the server 481 is able to search for music data in response to a request signal from the client 482 and sends the music data. The server 481 is also able to update the link information database 516 and the ranking information database 517 by reflecting favorite information of the users of a plurality of clients 482.

As described above, instead of selecting music data by tracing a hierarchical structure to the bottommost layer (that is, to the level of music data) by performing a zoom-in operation, the user merely changes the station or the hierarchical category. In this case, based on the ranking, which is managed in the server 481, a request for music data is made to the server 481, and the music data is sent from the server 481 to the client 482 and is then played back. That is, while the client 482 is being operated, a certain music piece is always played back. The user is also able to casually listen to melodious portions or characteristic portions of various pieces of music without the need to specify the name of a certain piece, and if the user likes the tune, the user can restart the tune from the beginning. Additionally, by repeating random tuning, the user has an opportunity to listen to unknown pieces of music (for example, music pieces registered by the user of another client 482 for the same server 481).

In this embodiment, only part of music data (for example, a so-called "melodious portion") is distributed as push distribution data from the music-data distribution service provider 8-1, and when the user performs a purchase operation, the entire music data is distributed to the server 481. Alternatively, the music-data distribution service provider 8-1 may distribute, for example, the entire music data that can be played back only for a predetermined times, or the entire music data that can be played back only for a predetermined period, as the push distribution data.

In this case, in the message window 571 described with reference to FIG. 42, a message, such as "content can be played back for n times", "content can be played back by X (month) and Y (day)", or "content can be played back for m days", may be displayed.

The push distribution data distributed from the music-data distribution service provider 8-1 becomes useless when the user has purchased the corresponding music piece or when the user is not interested in the music piece, and thus, it may be automatically erased after the lapse of a predetermined period.

It has been described that the server 481 and the client 482 send and receive information by wireless communication. However, if the client 482 is placed near the server 481, it may send and receive information to and from the server 481 by wired connection.

It has been described that the client 482 is the PDA 11, the cellular telephone 12, the desk-top playback device 13, the portable playback device 14, or the simplified playback device 15. The client 482 may be any type of device as long as it can send and receive data to and from the server 481 by wired or wireless means and is provided with an operating portion that allows the user to perform tuning, a zoom-out or zoom-in operation, and to give an instruction to play back music data. For example, the client 482 may be a desk-top personal computer, a notebook computer similar to the personal computer 1, a PHS (Personal Handyphone System), or an audio playback device provided with the above-described functions.

In the server 481, a display screen similar to that of the client 482 may be displayed to play back music data stored in the server 481 (functions of the client 482 may be contained in the server 481).

Figure 51:
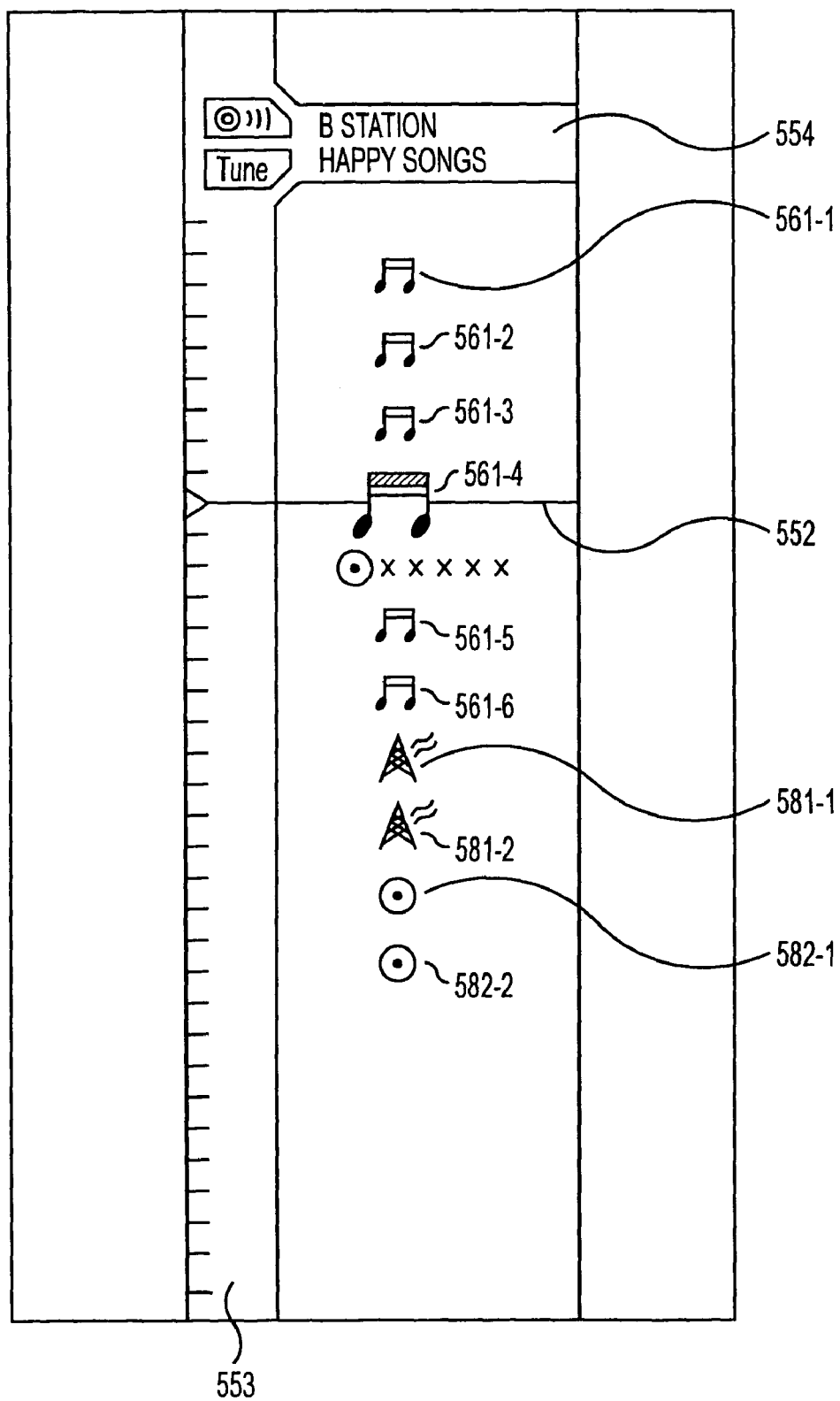
FIG. 51 is a GUI to be displayed.

In the GUI screens shown in FIGS. 30 through 36 or FIGS. 41 and 42, only icons or thumbnails in the same rank are displayed in the same level, thereby allowing the user to select one of them. However, as shown in FIG. 51, different icons in different ranks may be displayed in the same display screen.

More specifically, when a zoom-in operation is performed on a certain station to move up to the music data level, icons 581-1 and 581-2 indicating different stations or icons 582-1 and 582-2 indicating different hierarchical categories may be selected in the same level of the icons 561-1 through 561-6 corresponding to the music data.

If different icons in different ranks are displayed in the same GUI display screen, as described with reference to FIG. 51, the user feels as if it is possible to receive programs broadcasted by local radio broadcast stations after precisely performing tuning though the user can initially receive programs broadcasted only by national net radio broadcast stations. Thus, the concept of stations can be developed.

The above-described series of processing can be executed by software. In this case, a software program is installed from a recording medium into a computer built into dedicated hardware or a computer that can perform various functions by installing various programs, for example, a general-purpose computer.

Such a recording medium may include, as shown in FIG. 8, 12, 17, or 24, package media, which are distributed, separately from the computer, for providing the program to the user, and which are formed of the magnetic disk 121, 191, 321 or 421 (including floppy disks), the optical disc 122, 192, 322, or 422 (including CD-ROM (Compact Disk-Read Only Memory) and DVD (Digital Versatile Disk)), the magneto-optical disk 123, 193, 323, or 423 (including MD (Mini-Disk) (tradename)), or the semiconductor memory 124, 194, 324, or 424.

Steps forming the program recorded in a recording medium may be performed in a time-series manner in chronological order described in this specification. Alternatively, they may be performed concurrently or individually.

In the present specification, the system indicates an overall apparatus formed of a plurality of devices.

INDUSTRIAL APPLICABILITY

According to the first information processing apparatus, the first information processing method, and the first program of the present invention, information is sent and received to and from the first external information apparatus, and information is sent and received to and from the second external information processing apparatus. First content data, which is normal content data, and second content data, which is restricted content data, are recorded. Information required for selecting data to be sent to the first external information processing apparatus from the first content data and the second content data is recorded and updated. In response to a received request signal from the first external information processing apparatus, data to be sent to the first external information processing apparatus is selected from the first content data and the second content data based on the recorded information. Thus, the first information processing apparatus serves as a server that records sample data distributed via, for example, the Internet and sends the sample data to a client to play it back.

According to the second information processing apparatus, the second information processing method, and the second program of the present invention, an input of an operation from a user is received, and based on the input operation from the user, a request signal for requesting an first external information processing apparatus to send first content data, which is normal data, or second content data, which is restricted content data, is generated. The generated request signal is sent to the first external information processing apparatus. The first content data or the second content data is received from the first external information processing apparatus, and the received first content data or second content data is played back. Based on the operation input from the user, a purchase request signal for the first content data corresponding to the second content data is generated, and the generated purchase request signal is sent to the first external information processing apparatus. Thus, when a user receives sample data from a server storing the sample data distributed via, for example, the Internet, so as to play it back to purchase content corresponding to the sample data, a purchase request signal can be generated and sent.

According to the information processing system, in the first information processing apparatus, first content data, which is normal data, and second content data, which is restricted content data, are recorded. Information concerning a user administrating the second information processing apparatus is recorded, and information is sent and received to and from the second information processing apparatus. Based on the information concerning the user, data to be sent to the second information processing apparatus is selected from the second content data. Based on a purchase request signal for the first content data corresponding to the second content data, the first content data is selected. In the second information processing apparatus, information is sent and received to and from the first information processing apparatus, and information is sent and received to and from the third information processing apparatus. The first content data and the second content data are recorded. Information required for selecting data to be sent to the third information processing apparatus from the first content data and the second content data is recorded and updated. In response to a request signal from the third information processing apparatus, data to be sent to the third information processing apparatus is selected from the first content data and the second content data based on the recorded information. A purchase request signal is received from the third information processing apparatus, and is sent to the first information processing apparatus. The first content data is received from the first information processing apparatus, and the received first content data is recorded. In the third information processing apparatus, an input of an operation from a user is received. Based on the input operation from the user, a request signal for requesting the second information processing apparatus to send the first content data or the second content data is generated. The generated request signal is sent to the second information processing apparatus. The first content data or the second content data is received from the second information processing apparatus. The received first content data or the second content data is played back. Based on the operation from the user, a purchase request signal is generated and is sent to the second information processing apparatus. It is thus possible to construct a system that enables the user to efficiently listen to sample data sent from a content data distributor as push distribution data and encourages the user to purchase the corresponding content.

The invention claimed is:

1. An information processing apparatus comprising:
    first sending/receiving means for sending and receiving information to and from a first information processing apparatus;
    second sending/receiving means for sending and receiving information to and from a second information processing apparatus;
    first recording means for recording first content data, which is normal content data, and second content data, which is restricted content data received by said second sending/receiving means;
    second recording means for recording a list ranking content data from a highest priority to a lowest priority, wherein the highest priority content is the next to be pushed to the first information processing apparatus;
    updating means for updating the list ranking the content data from the highest priority to the lowest priority recorded by said second recording means; and
    selection means for selecting data to be sent to said first information processing apparatus from the first content data and the second content data recorded by said first recording means based on the list ranking the content data from the highest priority to the lowest priority recorded by said second recording means in response to a request signal from said first information processing apparatus received by said first sending/receiving means, said request signal indicating that the second content data having the highest priority rank in the list ranking the content data from the highest priority to the lowest priority is to be reproduced, wherein
    said first sending/receiving means receives a purchase request signal for first content data corresponding to the second content data that is reproduced from said first information processing apparatus;
    said second sending/receiving means sends the purchase request signal for the first content data to said second information processing apparatus and receives the first content data corresponding to the second content data that is reproduced from said second information processing apparatus; and
    said first recording means further records the first content data corresponding to the second content data that is received by said second sending/receiving means.

2. An information processing apparatus according to claim 1, wherein said updating means updates the list so that the second content data is preferentially selected by said selection means.

3. An information processing apparatus according to claim 1, wherein the second content data is data corresponding to part of normal content data.

4. An information processing apparatus according to claim 1, wherein the number of playback operations of the second content data in said first information processing apparatus is restricted.

5. An information processing apparatus according to claim 1, wherein:
- said first sending/receiving means receives review information concerning the second content data that is reproduced from said first information processing apparatus; and
- said second sending/receiving means sends the review information received by said first information receiving means to said second information processing apparatus.

6. An information processing method implemented by an information processing system comprising:
- controlling a first information processing apparatus to send and receive information;
- controlling a second information processing apparatus to send and receive information;
- recording, with a recording unit in the second information processing apparatus, first content data, which is normal content data, and second content data, which is restricted content data received from the second information processing apparatus;
- recording, with a recording unit in the first information processing apparatus, a list ranking content data from a highest priority to a lowest priority, wherein the highest priority content is the next to be pushed to the first information processing apparatus
- updating, with an updating unit in the first information processing apparatus, said list ranking the content data from the highest priority to the lowest priority;
- selecting data, with a data selecting unit in the second information processing apparatus, to be sent to said first information processing apparatus from the first content data and second content data based on the list ranking the content data from the highest priority to the lowest priority recorded from said recorded information required for selecting data to be sent to said first information processing apparatus, in response to a request signal from said first information processing apparatus, said request signal indicating that the second content data having the highest rank in the list is to be reproduced;
- receiving a purchase request signal for first content data corresponding to the second content data that is reproduced from said first information processing apparatus;
- sending the purchase request signal for the first content data to said second information processing apparatus;
- receiving the first content data corresponding to the second content data that is reproduced from said second information processing apparatus; and
- recording the first content data corresponding to the second content data that is received in the receiving.

7. A computer readable storage medium encoded with instructions, which when executed by an information processing system causes the information processing system to implement a method comprising:
- controlling a first information processing apparatus to send and receive information;
- controlling a second information processing apparatus to send and receive information;
- recording, with a recording unit in the second information processing apparatus, first content data, which is normal content data, and second content data, which is restricted content data received from the second information processing apparatus;
- recording, with a recording unit in the first information processing apparatus, a list ranking content data from a highest priority to a lowest priority, wherein the highest priority content is the next to be pushed to the first information processing apparatus;
- updating, with an updating unit in the first information processing apparatus, said list ranking the content data from the highest priority to the lowest priority;
- selecting data, with a data selecting unit in the second information processing apparatus, to be sent to said first information processing apparatus from the first content data and second content data based on the list ranking the content data from the highest priority to the lowest priority recorded from said recorded information required for selecting data to be sent to said first information processing apparatus, in response to a request signal from said first information processing apparatus, said request signal indicating that the second content data having highest rank in the list is to be reproduced;
- receiving a purchase request signal for first content data corresponding to the second content data that is reproduced from said first information processing apparatus;
- sending the purchase request signal for the first content data to said second information processing apparatus;
- receiving the first content data corresponding to the second content data that is reproduced from said second information processing apparatus; and
- recording the first content data corresponding to the second content data that is received in the receiving.

8. An information processing apparatus comprising:
- input means for receiving an input of an operation from a user;
- first generating means for generating a request signal for requesting a first information processing apparatus to send first content data, which is normal content data, or second content data, which is restricted content data, based on the operation input into said input means by the user;
- first sending means for sending the request signal generated by said first generating means to said first information processing apparatus;
- receiving means for receiving the second content data from said first information processing apparatus;
- playback means for playing back the second content data received by said receiving means;
- second generating means for generating a purchase request signal for purchasing the first content data corresponding to the second content data, which is the restricted content data played back by the playback means, based on the operation input into said input means by the user; and
- second sending means for sending the purchase request signal generated by said second generating means to said first information processing apparatus.

9. An information processing apparatus according to claim 8, further comprising display control means for controlling the display of a display screen for assisting the user to input the operation, wherein said display control means controls the display of the display screen so that the user inputs the operation to preferentially play back the second content data by said playback means.

10. An information processing apparatus according to claim 8, wherein the second content data is data corresponding to part of normal content data.

11. An information processing apparatus according to claim 8, wherein the number of playback operations of the second content data by said playback means is restricted.

12. An information processing apparatus according to claim 8, further comprising:

third generating means for generating review information concerning the second content data based on the operation input into said input means by the user; and third sending means for sending the review information generated by said third generating means to said first information processing apparatus.

13. An information processing method implemented by a second information processing apparatus communicatively coupled to a first information processing apparatus, the method comprising:

receiving user input, with a user input unit in the second information processing apparatus, from a user;

generating a request signal, with a first signaling unit in the second information processing apparatus, for requesting the first information processing apparatus to send first content data, which is normal content data, or second content data, which is restricted content data, based on the user input;

sending the request signal, with a second signaling unit in the second information processing apparatus, to said first information processing apparatus;

receiving, with a data receiving unit in the second information processing apparatus, the second content data from said first information processing apparatus;

playing back, with a playback unit in the second information processing apparatus, the second content data;

generating a purchase request signal, with a third signaling unit in the second information processing apparatus, for purchasing the first content data corresponding to the second content, which is the restricted content data played back by the playback unit, data based on the user input; and sending the purchase request signal, with a fourth signaling unit in the second information processing apparatus, to said first information processing apparatus.

14. A computer readable storage medium encoded with instructions, which when executed by a second information processing apparatus communicatively coupled to a first information processing apparatus, causes the second information processing apparatus to implement a method comprising:

receiving user input, with a user input unit in the second information processing apparatus, from a user;

generating a request signal, with a first signaling unit in the second information processing apparatus, for requesting the first information processing apparatus to send first content data, which is normal content data, or second content data, which is restricted content data, based on the user input;

sending the request signal, with a second signaling unit in the second information processing apparatus, to said first information processing apparatus;

receiving, with a data receiving unit in the second information processing apparatus, the second content data from said first information processing apparatus;

playing back, with a playback unit in the second information processing apparatus, the second content data;

generating a purchase request signal, with a third signaling unit in the second information processing apparatus, for purchasing the first content data corresponding to the second content, which is the restricted content data played back by the playback unit, data based on the user input; and sending the purchase request signal, with a fourth signaling unit in the second information processing apparatus, to said first information processing apparatus.

15. An information processing system comprising:

a first information processing apparatus for distributing content;

a second information processing apparatus for recording the content distributed from said first information processing apparatus; and a third information processing apparatus for receiving the content from said second information processing apparatus and playing back the content, said first information processing apparatus comprising:

first recording means for recording first content data, which is normal content data, and second content data, which is restricted content data;

second recording means for recording information concerning a user administrating said second information processing apparatus;

first sending/receiving means for sending and receiving information to and from said second information processing apparatus;

first selection means for selecting data to be sent to said second information processing apparatus from the second content data recorded by said first recording means based on the information concerning the user recorded by said second recording means; and second selection means for selecting the first content data recorded by said first recording means based on a purchase request signal for the first content data corresponding to the second content data received by said first receiving means, said second information processing apparatus comprising:

second sending/receiving means for sending and receiving information to and from said first information processing apparatus;

third sending/receiving means for sending and receiving information to and from said third information processing apparatus;

third recording means for recording the first content data and the second content data received by said second sending/receiving means;

fourth recording means for recording a list ranking content data from a highest priority to a lowest priority, wherein the highest priority content is the next to be pushed to the third information processing apparatus;

updating means for updating the list ranking the content data from the highest priority to the lowest priority recorded by said fourth recording means; and third selection means for selecting data to be sent to said third information processing apparatus from the first content data and the second content data recorded by said third recording means based on the list ranking the content data from the highest priority to the lowest priority recorded by said fourth recording means in response to a request signal from said third information processing apparatus received by said third sending/receiving means, said request signal indicating that the second content data having the highest priority rank in the list is to be reproduced, wherein: said third sending/receiving means receives the purchase request signal from said third information processing apparatus;

said second sending/receiving means sends the purchase request signal to said first information processing apparatus and receives the first content data from said first information processing apparatus; and said third recording means further records the first content data received by said second sending/receiving means, said third information processing apparatus comprising:
- input means for receiving an input of an operation from a user;
- first generating means for generating the request signal;
- first sending means for sending the request signal generated by said first generating means to said second information processing apparatus;
- receiving means for receiving the second content data from said second information processing apparatus;
- playback means for playing back the second content data received by said receiving means;
- second generating means for generating a purchase request signal, with a third signaling unit in the second information processing apparatus, for purchasing the first content data corresponding to the second content, which is the restricted content data played back by the playback unit, data based on the user input; and
- second sending means for sending the purchase request signal generated by said second generating means to said second information processing apparatus.

16. An information processing apparatus according to claim 1, wherein
the updating means updates a priority of the content data in the list based on an amount of requests received to reproduce the content data.

17. An information processing apparatus comprising:
- a first sending/receiving unit to send and receive information to and from a first information processing apparatus;
- a second sending/receiving unit to send and receive information to and from a second information processing apparatus;
- a first memory to store first content data, which is normal content data, and second content data, which is restricted content data received by said second sending/receiving means;
- a second memory to store a list ranking content data from a highest priority to a lowest priority, wherein the highest priority content is the next to be pushed to the first information processing apparatus; and
- a processor to update the list ranking the content data from the highest priority to the lowest priority, and to select data to be sent to said first information processing apparatus from the first content data and the second content data stored by said first memory based on the list ranking the content data from the highest priority to the lowest priority stored by said second memory in response to a request signal from said first information processing apparatus received by said first sending/receiving unit, said request signal indicating that the second content data having the highest priority rank in the list ranking the content data from the highest priority to the lowest priority is to be reproduced, wherein said first sending/receiving unit receives a purchase request signal for first content data corresponding to the second content data that is reproduced from said first information processing apparatus;

said second sending/receiving unit sends the purchase request signal for the first content data to said second information processing apparatus and receives the first content data corresponding to the second content data that is reproduced from said second information processing apparatus; and said first memory further stores the first content data corresponding to the second content data that is received by said second sending/receiving unit.

* * * * *